(12) United States Patent
Minotani et al.

(10) Patent No.: US 7,069,062 B2
(45) Date of Patent: Jun. 27, 2006

(54) TRANSCEIVER CAPABLE OF CAUSING SERIES RESONANCE WITH PARASITIC CAPACITANCE

(75) Inventors: Tadashi Minotani, Atsugi (JP); Ai-ichiro Sasaki, Atsugi (JP); Nobutaro Shibata, Atsugi (JP); Mitsuru Shinagawa, Isehara (JP)

(73) Assignee: Nippon Telegraph & Telephone Corp., Tokyo (JP)

( * ) Notice: Subject to any disclaimer, the term of this patent is extended or adjusted under 35 U.S.C. 154(b) by 181 days.

(21) Appl. No.: 10/699,516

(22) Filed: Oct. 31, 2003

(65) Prior Publication Data

US 2004/0092296 A1 May 13, 2004

(30) Foreign Application Priority Data

| Oct. 31, 2002 | (JP) | ............................ P2002-318741 |
| Jun. 25, 2003 | (JP) | ............................ P2003-181540 |
| Jun. 25, 2003 | (JP) | ............................ P2003-181555 |
| Jun. 25, 2003 | (JP) | ............................ P2003-181562 |

(51) Int. Cl.
*H04B 1/38* (2006.01)

(52) U.S. Cl. ...................... 455/575.6; 455/557; 455/73; 375/219; 375/220

(58) Field of Classification Search ............ 455/575.6, 455/73, 556.1, 557; 375/219, 220
See application file for complete search history.

(56) References Cited

U.S. PATENT DOCUMENTS

| 5,859,572 | A | * | 1/1999 | Hill ............................. 331/56 |
| 6,211,799 | B1 | * | 4/2001 | Post et al. ..................... 341/33 |
| 6,223,018 | B1 | | 4/2001 | Fukumoto et al. |
| 6,567,703 | B1 | * | 5/2003 | Thompson et al. ........... 607/60 |
| 6,696,885 | B1 | * | 2/2004 | Christensen ................. 327/552 |
| 2002/0188216 | A1 | * | 12/2002 | Kayyali et al. ............. 600/544 |

FOREIGN PATENT DOCUMENTS

| EP | 0 824 889 A | 2/1998 |
| EP | 1 043 850 A2 | 10/2000 |
| JP | 2001-77735 | 3/2001 |
| JP | 2001-298425 | 10/2001 |
| JP | 2001-352298 | 12/2001 |
| JP | 2001-352299 | 12/2001 |
| JP | 2002152145 A * | 5/2002 |

OTHER PUBLICATIONS

T.G. Zimmermann, "Personal Area Networks: Near-field intrabody communication", IBM Systems Journal, vol. 35, No. 3 & 4, 1996, pp. 609-617, XP000635090.

Post et al, "Intrabody Buses for Data and Power", International Symposium on Wearable Computers, Digest of Papers, Oct. 13, 1997, pp. 52-55, XP-002129145.

Babak Nivi, "Passive Wearable Electrostatic Tags", Sep. 1997, Massachusetts Institute of Technology, XP002358813.

* cited by examiner

*Primary Examiner*—CongVan Tran
(74) *Attorney, Agent, or Firm*—Kilpatrick Stockton LLP

(57) ABSTRACT

A transceiver for inducing electric fields according to data to be transmitted in an electric field propagating medium, and carrying out at least data transmission by using induced electric fields, is formed by a transmission unit configured to modulate the data to be transmitted by generating alternating current signals having a prescribed frequency, and transmit modulated signals obtained by modulating the data to be transmitted, and a resonance causing unit configured to cause a series resonance with a parasitic capacitance appearing between a ground for the transmission unit and an Earth ground and a parasitic capacitance appearing between the electric field propagating medium and the Earth Ground.

49 Claims, 42 Drawing Sheets

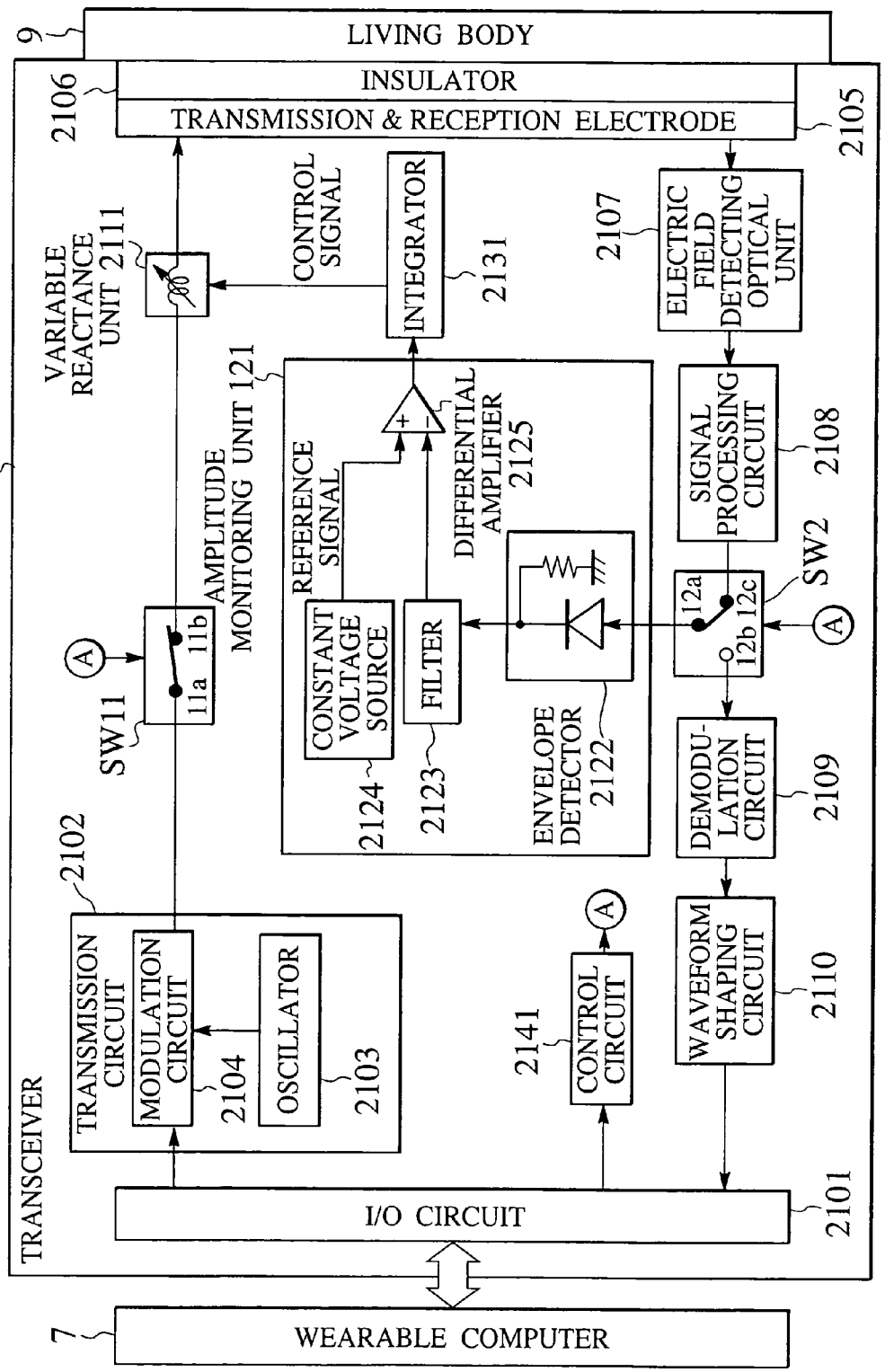

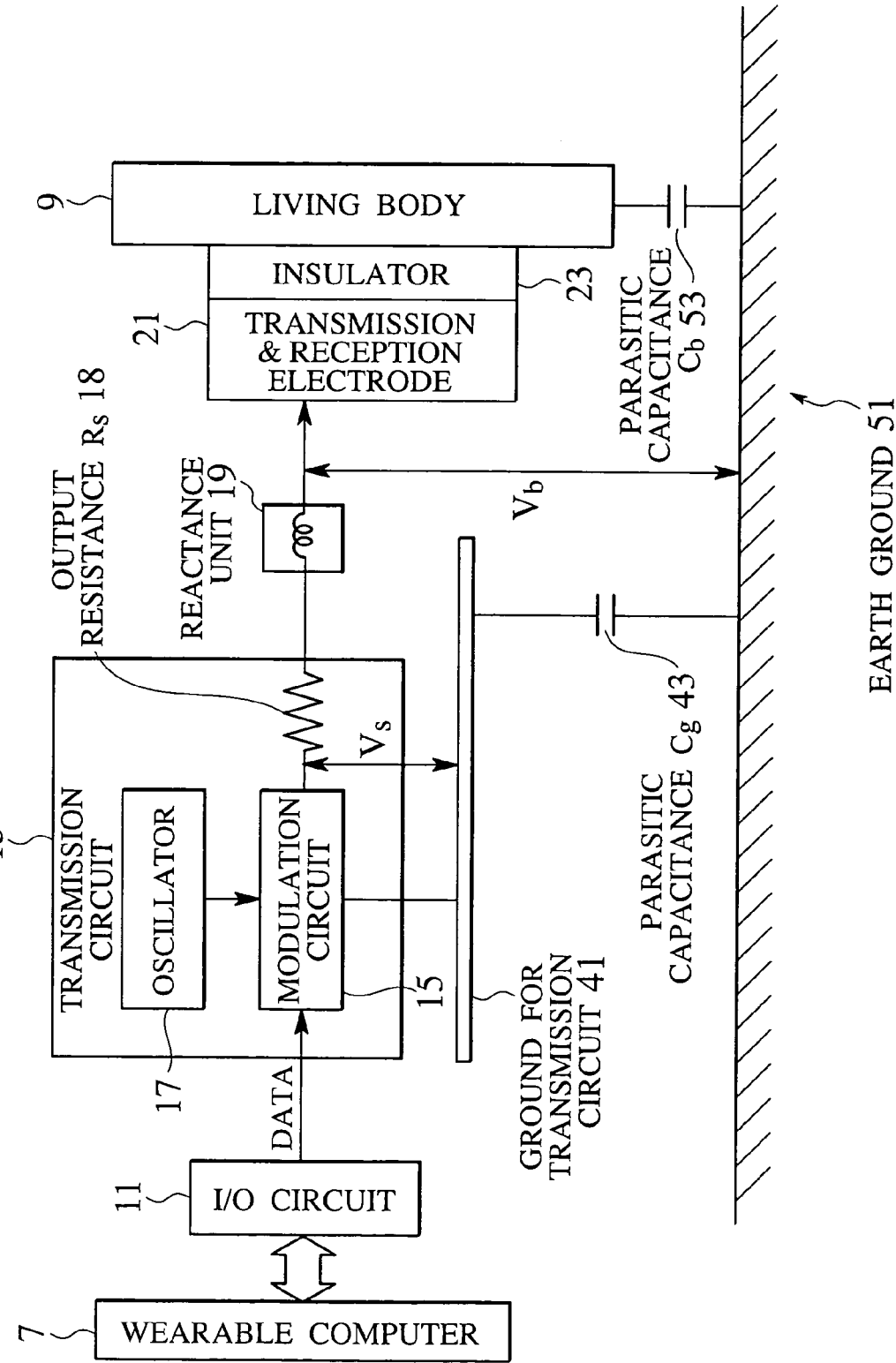

TRANSCEIVER CAPABLE OF CAUSING SERIES RESONANCE WITH PARASITIC CAPACITANCE

BACKGROUND OF THE INVENTION

1. Field of the Invention

The present invention relates to a transceiver for carrying out transmission and reception of data by using electric fields induced in an electric field propagating medium, and more particularly to a transceiver to be used for data communications using wearable computers that can be worn on human bodies.

2. Description of the Related Art

Due to the progress in reducing size and improving performance of portable terminals, the wearable computers that can be worn on the living bodies are attracting attentions.

Conventionally, in order to realize the data communications between such wearable computers, there has been proposition to carry out data transmission and reception by connecting transceivers to computers and propagating electric fields induced by these transceivers inside the living bodies which are electric field propagating media (see Japanese Patent Application Laid Open No. 2001-352298, for example).

FIG. 1 shows a configuration of a conventional transceiver. A transceiver 5 shown in FIG. 1 is connected to a wearable computer 7 through an I/O circuit 501 for carrying out signal input and output, and has a transmission and reception electrode 511 provided in proximity to a living body 9 through an insulator 513. The data transmitted from the wearable computer 7 modulates alternating current signals generated by an oscillator 507 as carriers in a modulator 505. The modulated signals induce electric fields in the living body 9 from the transmission and reception electrode 511 through the insulator 513, and these electric fields are propagated inside the living body 9, to propagate the data transmitted from the wearable computer 7 to a transceiver 5 provided at the other portion of the living body 9 or a transceiver 5 that is electrically connected by a contact with the living body 9.

When another transceiver 5 receives the electric fields so propagated through the transceiver 5, the electric fields received by the transmission and reception electrode 511 through the insulator 513 are converted into electric signals by an electric field detecting optical unit 515, and the electric signals are supplied to a signal processing circuit 517. The signal processing circuit 517 applies a signal processing such as filtering and amplification to the electric signals from the electric field detecting optical unit 515. After the signal processing, the demodulation and the waveform shaping of the data are carried out by a demodulation circuit 523 and a waveform shaping circuit 525 respectively, and the signals applied with these series of processings are transmitted from the I/O circuit 501 as the received data of the wearable computer 7.

In this way, the transceiver 5 to be used for the data communications between the wearable computers 7 induces the electric fields based on data to be transmitted in the living body 9 which is an electric field propagating medium and carries out the transmission of the data by using these induced electric fields, while receiving signals by using the electric fields induced in the living body 9 at a time of receiving the data.

FIG. 2 shows an exemplary case of using such wearable computers by wearing them on a human body which is an example of the living body 9. As shown in FIG. 2, the wearable computers 7a, 7b and 7c are put on arms, shoulders, torso, etc., of the human body through respectively connected transceivers 5a, 5b and 5c to carry out mutual data transmission and reception. In addition, when tip ends of a hand and a leg are in contact with transceivers 5a' and 5b' that are connected to an external terminal 80 through a cable 90, it is possible to carry out data transmission and reception between the wearable computers 7a, 7b and 7c and the external terminal 80.

As shown in FIG. 3, the transmission circuit 503 that is driven without using an AC power source in the above described transceiver 5 is separated from an Earth ground 51, so that a parasitic capacitance 43 appears between a ground for transmission circuit 41 and the Earth ground 51. Also, a parasitic capacitance 53 exists between the living body 9 and the Earth ground 51, and (virtual capacitors having) these two parasitic capacitances appear to be connected in series from a viewpoint of the modulation circuit 505.

For this reason, a voltage Vs between the transmission circuit 503 and the ground for transmission circuit 41 is applied in division over these two parasitic capacitances 43 and 53. Here, by denoting values of the parasitic capacitances 43 and 53 as Cg and Cb respectively, a voltage Vb applied to the living body 9 can be expressed by the following equation (1):

$$Vb = Vs \cdot \frac{\frac{1}{j\omega Cb}}{\frac{1}{j\omega Cb} + \frac{1}{j\omega Cg}} = Vs \cdot \frac{Cg}{Cb + Cg} \qquad (1)$$

where j is an imaginary unit $(-1)^{1/2}$ and $\omega$ is an angular frequency of the applied voltage.

In the case of utilizing the AC power source, the parasitic capacitance 43 can be regarded as infinite, so that it becomes Vb=Vs as apparent from the equation (1) and the signals will be applied to the living body 9 without any attenuation. On the other hand, in the case of not utilizing the AC power source, it becomes Vb<Vs according to the equation (1) so that there has been a problem that signals applied to the living body 9 will be attenuated.

BRIEF SUMMARY OF THE INVENTION

It is therefore an object of the present invention to provide a transceiver capable of improving the communication quality by preventing the decrease of the voltage applied to the electric field propagating medium.

According to one aspect of the present invention there is provided a transceiver for inducing electric fields according to data to be transmitted in an electric field propagating medium, and carrying out at least data transmission by using induced electric fields, comprising: a transmission unit configured to modulate the data to be transmitted by generating alternating current signals having a prescribed frequency, and transmit modulated signals obtained by modulating the data to be transmitted; and a resonance causing unit configured to cause a series resonance with a parasitic capacitance appearing between a ground for the transmission unit and an Earth ground and a parasitic capacitance appearing between the electric field propagating medium and the Earth Ground.

Other features and advantages of the present invention will become apparent from the following description taken in conjunction with the accompanying drawings.

BRIEF DESCRIPTION OF THE DRAWINGS

FIG. 23 is a block diagram showing a first specific configuration of a transceiver according to the third embodiment of the present invention at a data transmission time.

FIG. 31 is a schematic block diagram showing a basic configuration of a transceiver according to the fourth embodiment of the present invention.

DETAILED DESCRIPTION OF THE INVENTION

Referring now to FIG. 4 to FIG. 16, the first embodiment of a transceiver according to the present invention will be described in detail.

In the following description, the case where the wearable computer transmits data by inducing electric fields in the living body through a transceiver will be referred to as "data transmission time", and the case where the wearable computer receives data detected from electric fields induced in the living body through a transceiver will be referred to as "data reception time".

Figure 4:
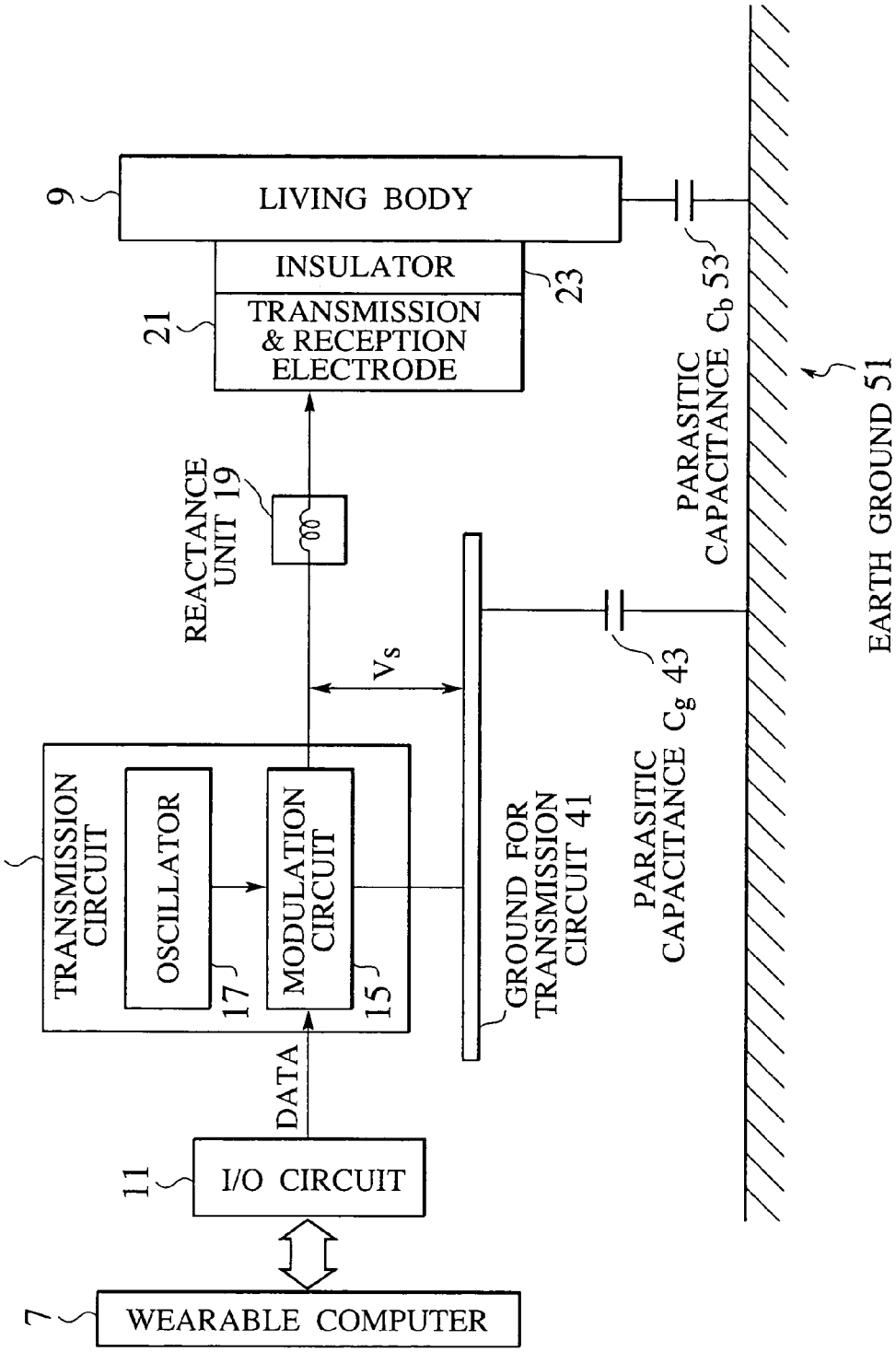
FIG. 4 is a schematic block diagram showing a basic configuration of a transceiver according to the first embodiment of the present invention.

FIG. 4 shows a configuration of a main part of a transceiver according to the first embodiment. Note that FIG. 4 only shows a configuration common to all implementations of the transceiver according to the first embodiment, and further detailed configurations of the entire transceiver in various implementations will be described below.

The transceiver shown in FIG. 4 has at least an I/O circuit 11 for outputting data received from the wearable computer 7 while receiving received signals, a transmission circuit 13 for transmitting signals by modulating signals, a transmission and reception electrode 21 formed by a conductive material for inducing electric fields in the living body 9 which is an electric field propagating medium, and an insulator 23 provided between the transmission and reception electrode 21 and the living body 9 for preventing currents to flow through the living body 9 and eliminating a possibility of the metal allergy by the living body 9 due to the transmission and reception electrode 21.

Here, the transmission circuit 13 comprises an oscillator 17 for generating alternate current signals of a prescribed frequency, and a modulation circuit 15 for modulating signals from the I/O circuit 11 by using the alternate current signals generated by the oscillator 17 as carriers.

The feature of the transceiver according to this embodiment is that a reactance unit 19 which causes resonance is inserted between the transmission circuit 13 and the transmission and reception electrode 21. Note that the "reactance unit" here indicates a circuit network formed by connecting a plurality of circuit elements such as inductors (coils), capacitors and so on. This reactance unit 19 is connected in series from a viewpoint of the modulation circuit 15, so that a series resonance circuit is formed by this reactance unit 19 and the parasitic capacitance 43 appearing between the ground for transmission circuit 41 and the Earth ground 51 such that it becomes possible to prevent the attenuation of the voltage applied to the living body 9 due to the change of the parasitic capacitance 43.

Next, the operation of the transceiver according to this embodiment will be described. The data transmitted from the wearable computer 7 and outputted from the I/O circuit 11 modulates the alternating current signals generated by the oscillator 17 as carriers in the modulation circuit 15 and supplied to the transmission and reception electrode 21 through the reactance unit 19, and propagated as the electric fields induced in the living body 9 through the insulator 23.

Since the reactance unit 19, the parasitic capacitance 43 and the parasitic capacitance 53 appearing between the living body 9 and the Earth ground 51 are connected in series from a viewpoint of the modulation circuit 15, by denoting values of the parasitic capacitances 43 and 53 as Cg and Cb respectively, an output voltage of the modulation circuit 15 as Vs, and a reactance of the reactance unit 19 which is an imaginary component of the impedance of the reactance unit 19 as X, a voltage Vb applied to the living body 9 can be expressed by the following equation (2):

$$Vb = Vs \cdot \frac{\frac{1}{j\omega Cb}}{\frac{1}{j\omega Cb} + \frac{1}{j\omega Cg} + jX} \quad (2)$$

$$= Vs \cdot \frac{\frac{Cg}{Cb}}{\frac{Cg}{Cb} + 1 - \omega X Cg}$$

$$= Vs \cdot \frac{\frac{1}{Cb}}{\frac{1}{Cb} + \frac{1}{Cg} - \omega X}$$

where j is an imaginary unit $(-1)^{1/2}$ and ω is an angular frequency of the applied voltage.

From this equation (2), it follows that it becomes Vb=Vs when the reactance X of the reactance unit 19 satisfies the following equation (3):

$$X = \frac{1}{\omega Cg} = \frac{1}{2\pi f Cg} \quad (3)$$

where f is an oscillation frequency of the oscillator 17 and π is a circumferential ratio, such that the signals will be applied to the living body 9 without any attenuation.

Note that it is also possible to form the reactance unit 19 from an inductor alone. In such a case, by denoting the inductance (reactance) of the inductor as L, the voltage Vb applied to the living body 9 can be expressed by the following equation (4).

$$Vb = Vs \cdot \frac{\frac{1}{j\omega Cb}}{\frac{1}{j\omega Cb} + \frac{1}{j\omega Cg} + j\omega L} \quad (4)$$

$$= Vs \cdot \frac{\frac{Cg}{Cb}}{\frac{Cg}{Cb} + 1 - \omega^2 LCg}$$

$$= Vs \cdot \frac{\frac{1}{Cb}}{\frac{1}{Cb} + \frac{1}{Cg} - \omega^2 L}$$

From this equation (4), it follows that it becomes Vb=Vs when the inductance L of the reactance unit 19 satisfies the following equation (5):

$$X = \frac{1}{\omega^2 Cg} = \frac{1}{(2\pi f)^2 Cg} \quad (5)$$

such that the signals will be applied to the living body 9 without any attenuation.

Figure 5:
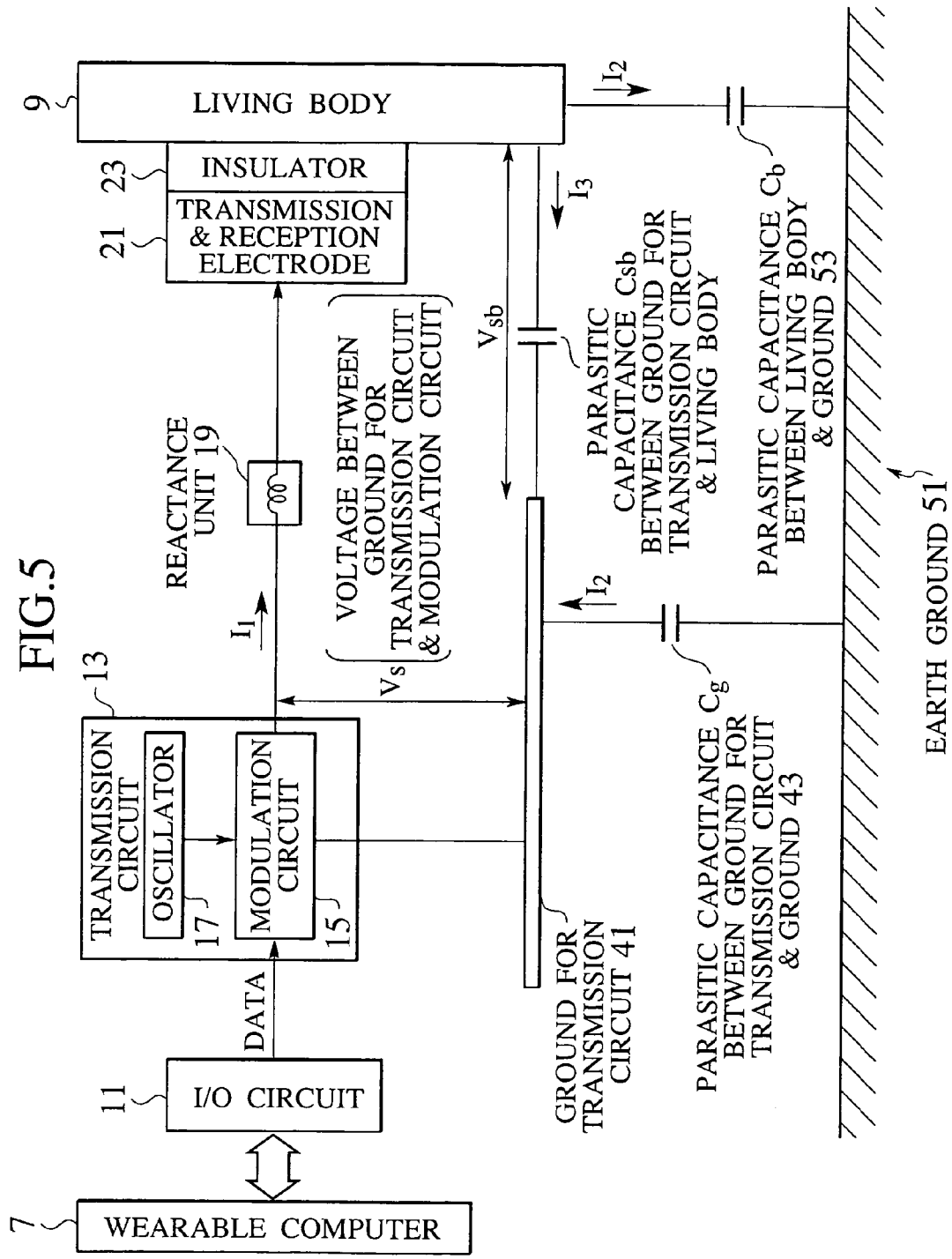
FIG. 5 is a schematic block diagram showing a basic configuration of a transceiver according to the first embodiment of the present invention in further detail.

In further detail, as shown in FIG. 5, since the reactance unit 19, the parasitic capacitance 43 and the parasitic capacitance 53 appearing between the living body 9 and the Earth ground 51 are connected in series from a viewpoint of the modulation circuit 15, by denoting a voltage applied to the living body 9 as Vb, values of the parasitic capacitances 43 and 53 as Cg and Cb respectively, an output voltage of the modulation circuit 15 as Vs, a reactance of the reactance unit 19 which is an imaginary component of the impedance of the reactance unit 19 as X, a current flowing through the reactance unit 19 as I1 and a current flowing through the parasitic capacitance 53 as I2, the relationship of the following equation (6) holds.

$$Vs = jXI1 + Vb + \frac{1}{j\omega Cg}I2 \quad (6)$$

Because the current I2=jωCbVb, by substituting it into the equation (6), the relationship of the following equation (7) can be obtained.

$$Vs = jXI1 + Vb + \frac{j\omega Cb}{j\omega Cg}Vb = jXI1 + \left(1 + \frac{Cb}{Cg}\right)Vb \quad (7)$$

Also, because the total voltage applied to the parasitic capacitance 43 and the parasitic capacitance 53 is equal to the voltage applied to the parasitic capacitance Csb 33 between the ground for transmission circuit 41 and the living body 9, by denoting a current flowing through the parasitic capacitance 33 as I3, the relationship of the following equations (8) and (9) can be obtained.

$$\frac{1}{j\omega Csb}I3 = \left(\frac{1}{j\omega Cb} + \frac{1}{j\omega Cg}\right)I2 \quad (8)$$

$$\frac{1}{Csb}I3 = \left(\frac{1}{Cb} + \frac{1}{Cg}\right)I2 \quad (9)$$

Also, because the current I1 is equal to the total of the currents I2 and I3, the current I1 can be expressed by the following equation (10).

$$I1 = I2 + I3 = I2 + Csb\left(\frac{1}{Cb} + \frac{1}{Cg}\right)I2 \quad (10)$$

$$= j\omega CbVb\left(1 + Csb\left(\frac{1}{Cb} + \frac{1}{Cg}\right)\right)$$

By substituting the equation (10) into the equation (7), the relationship of the following equation (11) can be obtained.

$$Vs = -X\omega CbVb\left(1 + Csb\left(\frac{1}{Cb} + \frac{1}{Cg}\right)\right) + \left(1 + \frac{Cb}{Cg}\right)Vb \quad (11)$$

From this equation (11), the voltage Vb applied to the living body 9 can be expressed by the following equation (12).

$$Vb = \frac{1}{1 + \frac{Cb}{Cg} - \omega XCb\left(1 + Csb\left(\frac{1}{Cb} + \frac{1}{Cg}\right)\right)} Vs = \quad (12)$$

$$\frac{\frac{Cg}{Cb}}{\frac{Cg}{Cb} + 1 - \omega XCg\left(1 + Csb\left(\frac{1}{Cb} + \frac{1}{Cg}\right)\right)} Vs$$

From this equation (12), it follows that it becomes Vb=Vs when the reactance X of the reactance unit 19 satisfies the following equation (13):

$$X = \frac{1}{\omega Cg\left(1 + Csb\left(\frac{1}{Cb} + \frac{1}{Cg}\right)\right)} = \frac{1}{2\pi fCg\left(1 + Csb\left(\frac{1}{Cb} + \frac{1}{Cg}\right)\right)} \quad (13)$$

such that the signals will be applied to the living body 9 without any attenuation.

In the case where the reactance unit 19 is formed from an inductor alone, by denoting the inductance (reactance) of the inductor as L, the voltage Vb applied to the living body 9 can be expressed by the following equation (14).

$$Vb = \frac{1}{1 + \frac{Cb}{Cg} - \omega^2 LCb\left(1 + Csb\left(\frac{1}{Cb} + \frac{1}{Cg}\right)\right)} Vs = \quad (14)$$

$$\frac{\frac{Cg}{Cb}}{\frac{Cg}{Cb} + 1 - \omega^2 LCg\left(1 + Csb\left(\frac{1}{Cb} + \frac{1}{Cg}\right)\right)} Vs$$

From this equation (14), it follows that it becomes Vb=Vs when the inductance L of the reactance unit 19 satisfies the following equation (15):

$$X = \frac{1}{\omega^2 Cg\left(1 + Csb\left(\frac{1}{Cb} + \frac{1}{Cg}\right)\right)} = \frac{1}{(2\pi f)^2 Cg\left(1 + Csb\left(\frac{1}{Cb} + \frac{1}{Cg}\right)\right)} \quad (15)$$

such that the signals will be applied to the living body 9 without any attenuation.

By making the oscillation frequency f or the reactance X variable in the basic configuration according to this embodiment as described above, it becomes possible to carry out the appropriate control such that the series resonance is caused by the reactance unit 19 and the parasitic capacitance 43, and thereby improve the communication quality by preventing the decrease of the voltage applied to the living body 9.

Next, the first specific configuration of the transceiver according to the first embodiment will be described.

Figure 6:
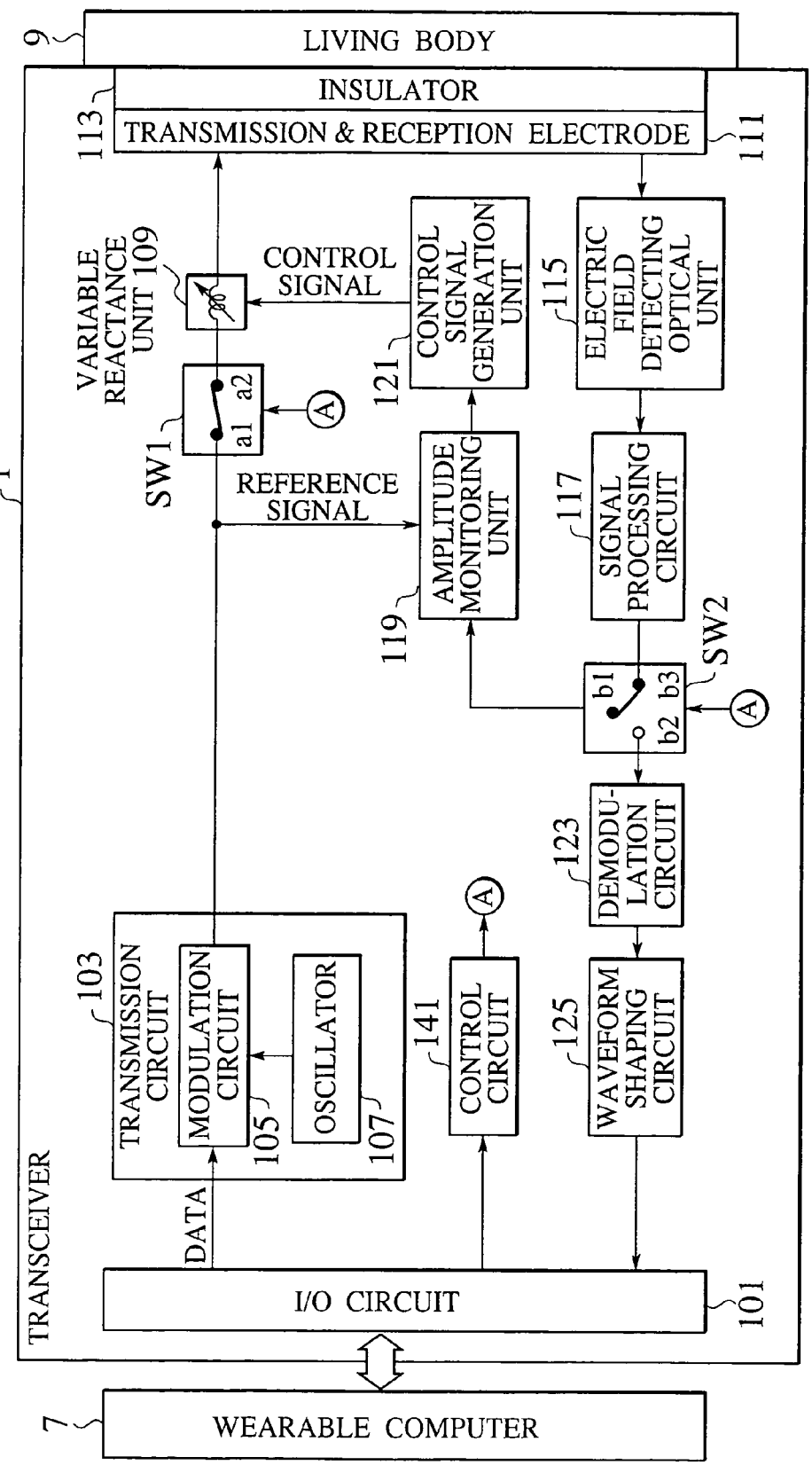
FIG. 6 is a block diagram showing a first specific configuration of a transceiver according to the first embodiment of the present invention at a data transmission time.

FIG. 6 shows the first specific configuration of the transceiver according to the first embodiment. In the transceiver 1 of FIG. 6, the I/O circuit 101, the transmission circuit 103, the modulation circuit 105, the oscillator 107, the transmission and reception electrode 111 and the insulator 113 have the same functions as the corresponding elements described above with reference to FIG. 4. The same remark also applies to all the specific configurations to be described below. Note that it is also possible to divide the transmission and reception electrode 111 into a transmission electrode and a reception electrode. In such a case, two insulators will be provided in correspondence to the respective electrodes. Also, the frequency of the alternating current signals generated from the oscillator 107 is expected to take a value in a range of about 10 kHz to 100 MHz, and it is more preferable to take a value of about 10 MHz, where 1 kHz=$10^3$ Hz and 1 MHz=$10^6$ Hz.

The reactance unit for causing resonance that is provided in the transceiver 1 is a variable reactance unit 109 which can change the reactance in order to maintain the resonance. Between this variable reactance unit 109 and the transmission circuit 103, a switch SW1 for preventing the introduction of signals to the transmission side circuits at a time of the data reception through the living body 9, In FIG. 6, the switch SW1 has two terminals a1 and a2 connected together so that the switch is closed, which is a state at a time of the data transmission from the wearable computer 7.

In addition, the transceiver 1 has an electric field detecting optical unit 115 for receiving the electric fields induced in the living body 9, optically detecting these electric fields, and converting them into electric signals, and a signal processing circuit 117 for carrying out processing such as a low noise amplification, a noise reduction, and a waveform shaping. These units constitute an electric field detection unit.

The electric field detecting optical unit 115 detects the electric fields by the electro-optic method using the laser lights and the electro-optic crystal, and at least has a laser diode (not shown) that constitutes a laser light source and an electro-optic element (not shown) formed by the electro-optic crystal such as $LiNbO_3$, $LiTaO_3$, etc. This electro-optic element can be such that it has a sensitivity only for the electric field component in a direction perpendicular to a propagation direction of the laser light emitted from the laser diode, and it has its optical characteristics, i.e. its birefringence, changed by the electric field strength such that the polarization of the laser light is changed by the change of the birefringence. The polarization change may also contain the polarization change due to the inverse piezo-electric effect by which the electro-optic crystal of the electro-optic element is distorted by the electric fields, in some cases.

The laser light with its polarization changed as it passes through such an electro-optic element is subjected to an adjustment of the polarization state by using a wave plate, and then injected into a polarization beam splitter such that it is separated into P wave and S wave such that it is converted into the light intensity change. The separated laser lights are collimated by a collimator (condenser lens), and then supplied to two photo-diodes respectively provided in order to convert lights into electric signals. Then, a difference between them is amplified by a differential amplifier and outputted as an electric signal related to the received electric field, for example.

Note that the configuration and the operation of the electric field detecting optical unit 115 described above are only an example, and it is not necessary true that the electric field detecting optical unit used in the transceiver 1 according to this embodiment can have the special effects only in this exemplary case. The same remark also applies to the other specific configurations to be described below.

The signal outputted from the signal processing circuit 117 are sent to different circuits according to the connection state of a switch SW2 which is provided next to the signal processing circuit 117. In the case of the data transmission time shown in FIG. 6, a terminal b1 and a terminal b3 among three terminals of the switch SW2 are connected together, so that the output signal from the signal processing circuit 117 are sent to an amplitude monitoring unit 119 for monitoring the output signal from the signal processing circuit 117. At the amplitude monitoring unit 119, a difference between the output signal of the signal processing circuit 117 and a reference signal transmitted from the transmission circuit 103 is extracted, and its extraction result is sent to a control signal generation unit 121. The control signal generation unit 121 generates a control signal for controlling the reactance of the variable reactance unit 109, according to the output signal of the amplitude monitoring unit 119. In this way, at the data transmission time, a negative feedback circuit is formed by using the amplitude monitoring unit 119 and the control signal generation unit 121.

On the other hand, at the data reception time, a terminal b2 and a terminal b3 are connected in the switch SW2. In this case, the output signal from the signal processing circuit 117 is demodulated at a demodulation circuit 123, and applied with the waveform shaping at a waveform shaping circuit 125. Then it reaches to the I/O circuit 101 from which the data is sent to the wearable computer 7. At this data reception time, the connection between terminals a1 and a2 in the switch SW1 is disconnected, so as to prevent the introduction of the data into the transmission circuit 103.

Note that, at the data transmission time and the data reception time described above, the connections between terminals in the switches SW1 and SW2 are switched in coordination. FIG. 6 shows a configuration in which a control circuit 141 for controlling this switching is connected to the I/O circuit 101 such that the control signal is sent to each switch. In FIG. 6, positions indicated by encircled A are connected together by wirings. The control signal for the switching issued from the control circuit 141 may be transmitted from the wearable computer 7 or may be transmitted from an input unit provided at the transceiver 1, but it should be noted that the configuration of the switches and the control circuit is not necessarily limited to that described here.

Figure 7:
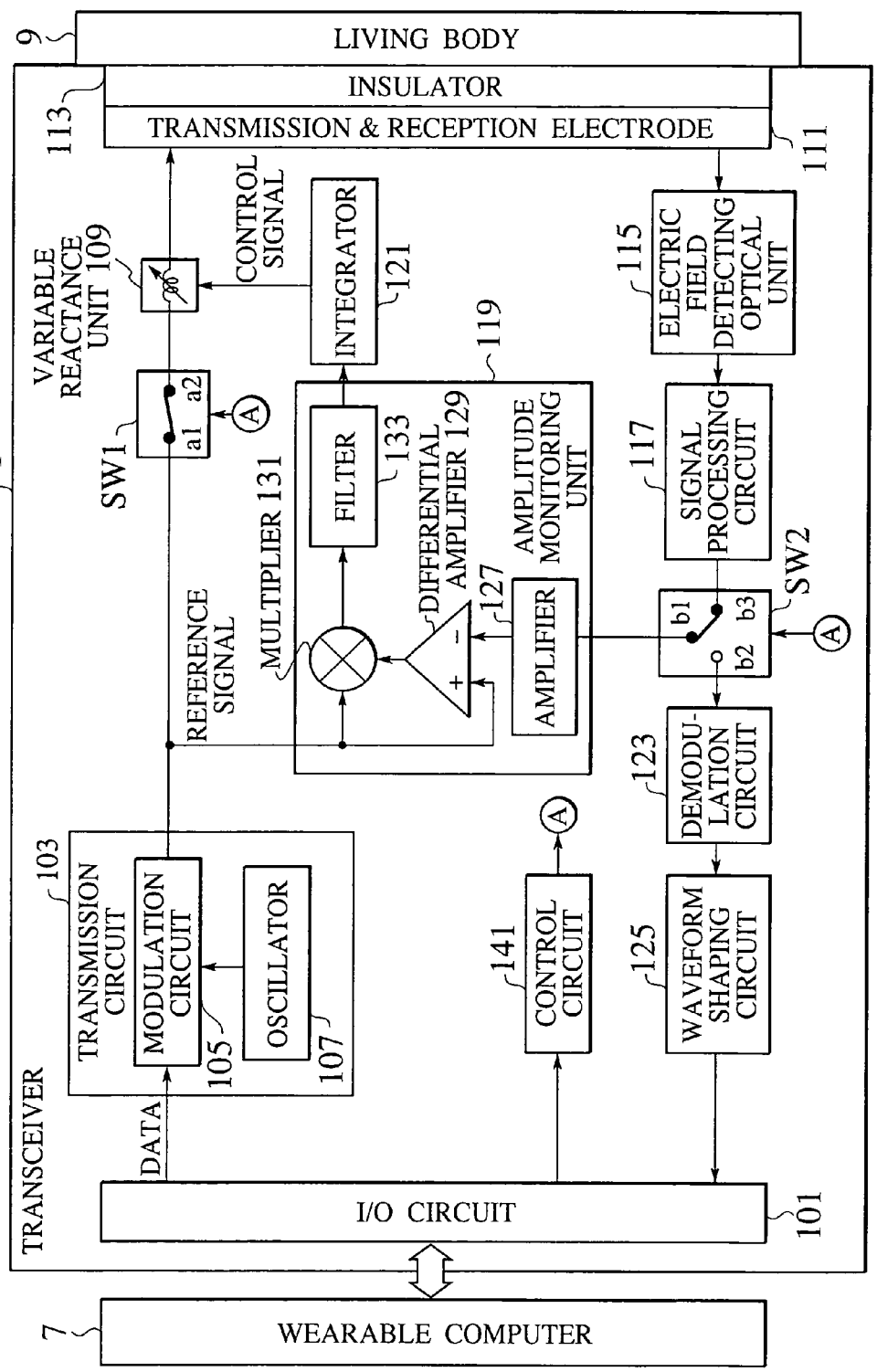
FIG. 7 is a block diagram showing a further detail configuration of the transceiver of FIG. 6.

FIG. 7 shows an exemplary detailed configuration of the amplitude monitoring unit 119 of FIG. 6. The transceiver 1 of FIG. 7 has the same configuration as that of FIG. 6 except that a detailed configuration of the amplitude monitoring unit 119 is included and an integrator 121 is used as the control signal generation unit. Consequently, the transceiver 1 shown in FIG. 7 shows the connection state at a time of the data transmission from the wearable computer 7.

The amplitude monitoring unit 119 comprises an amplifier 127 for amplifying and outputting the output signal of the signal processing circuit 117 at the data transmission time, a differential amplifier 129 for extracting and outputting a difference between the reference signal generated from the transmission circuit 103 and the output signal of the amplifier 127, a multiplier 131 for multiplying the output signal of the differential amplifier 129 with the reference signal and outputting the multiplication result, and a filter 133 for eliminating higher harmonic components from the output signal of the multiplier 131.

The output signal from the filter 133 after eliminating the higher harmonic components is inputted into the integrator 121 provided as the control signal generation unit. At the integrator 121, the output signal of the filter 133 is integrated and the control signal is outputted to the variable reactance unit 109. More specifically, the series resonance state of the reactance X and the parasitic capacitance Cg 43 appearing between the ground for transmission circuit 41 and the Earth ground 51 at the oscillation frequency f is maintained by compensating a part that has changed in conjunction with the change of the parasitic capacitance Cg 43 by the control signal to the variable reactance unit 109.

Thus, these amplitude monitoring unit 119 and control signal generation unit (integrator) 121 constitute a control mechanism for controlling the reactance as a characteristic possessed by the variable reactance unit 109.

Next, the operation of the transceiver 1 with the configuration as described above will be described in detail. The data outputted from the I/O circuit 101 is modulated at the modulation circuit 105, and applied to the living body 9 through the variable reactance unit 109 and the transmission and reception electrode 111. From a viewpoint of the modulation circuit 105, the variable reactance unit 109 and the parasitic capacitances 43 and 53 are connected in series, so that the voltage Vb applied to the living body 9 is expressed by the equation (2) in terms of the output voltage Vs of the modulation circuit 105 and the reactance X of the variable reactance unit 109. Therefore, the control signal for adjusting the reactance X of the variable reactance unit 109 (see the equation (3)) is sent such that a relationship of Vb=Vs holds according to the equation (2).

Figure 14A:
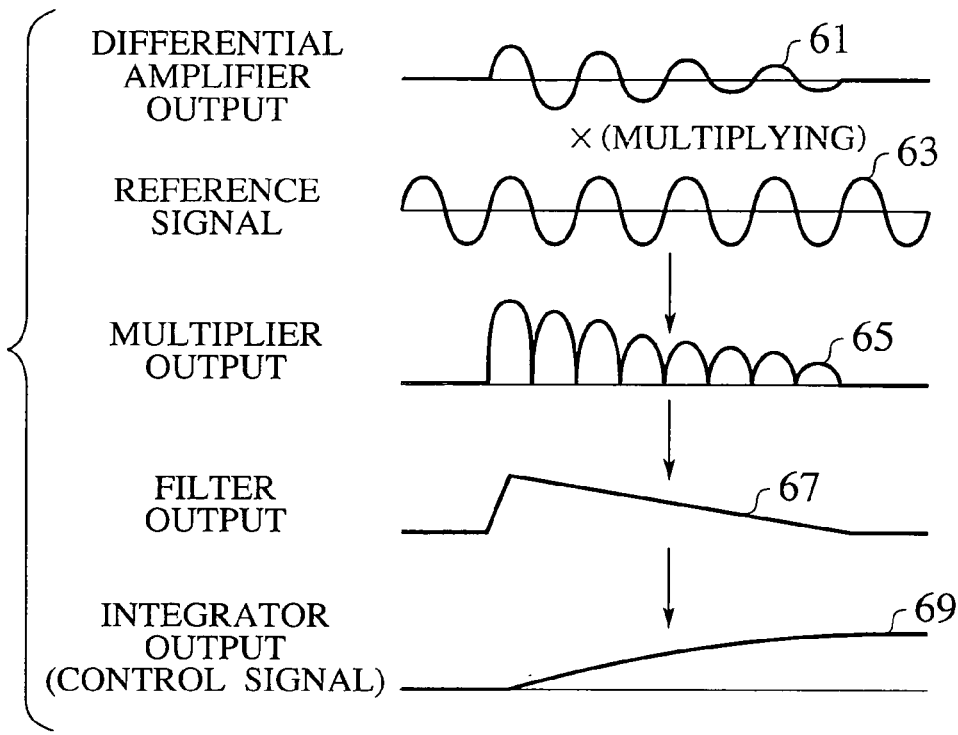
FIGS. 14A and 14B are diagrams showing signal waveforms of signals outputted from individual constituent units of an amplitude monitoring unit and a control signal generation unit in a transceiver according to the first embodiment of the present invention at a gain adjustment time.
Figure 14B:
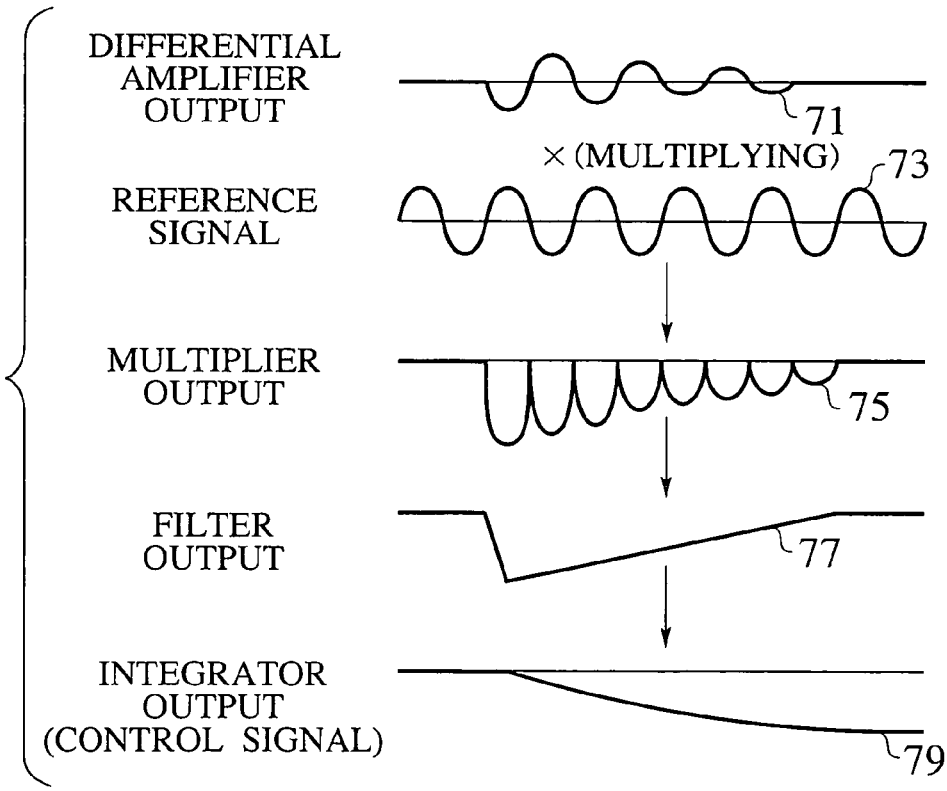

FIGS. 14A and 14B show exemplary signal waveforms outputted from each one of individual constituent units of the amplitude monitoring unit 119 and the integrator 121, until the control signal is generated at the data transmission time.

FIG. 14A shows a change of the signal waveform when the parasitic capacitance 43 between the transmission circuit and the Earth ground is decreased. The voltage Vb applied to the living body 9 is also decreased according to the equation (2), so that the output signal 61 of the differential amplifier 129 is in phase with the reference signal 63 transmitted from the transmission circuit 103. Thus, the output signal 65 of the multiplier 131 that is obtained by multiplying them together has a waveform with values only on a positive direction. The signal 67 is obtained from this output signal 65 by eliminating the higher harmonic components by the filter 133. The signal 67 outputted from the filter 133 is integrated by the integrator 121, and as should be apparent from the equation (3), the control signal 69 for increasing the reactance X of the variable reactance unit 109 such that it becomes Vb=Vs is outputted from the integrator 121 to the variable reactance unit 109, and as a result, the state of Vb=Vs is maintained.

FIG. 14B shows a change of the signal waveform when the parasitic capacitance 43 is increased. Here, the voltage Vb applied to the living body 9 is also increased in conjunction with the increase of the parasitic capacitance 43, so that the output signal 71 of the differential amplifier 129 is out of phase with the reference signal 73. Thus, the output signal 75 of the multiplier 131 that is obtained by multiplying them together has a waveform with values only in a negative direction. The signal 77 is obtained from this output signal 75 by eliminating the higher harmonic components by the filter 133. The signal 77 outputted from the filter 133 is integrated by the integrator 121, and the control signal 79 for decreasing the reactance X of the variable reactance unit 109 such that it becomes Vb=Vs is outputted from the integrator 121 to the variable reactance unit 109.

Note that, in this first specific configuration, it is assumed that the gain of the amplifier 127 is adjusted in advance such that the output of the amplifier 127 becomes Vs when it is Vb=Vs.

According to the first specific configuration described above, a difference between the output signal outputted from the signal processing circuit 117 and amplified by the amplifier 127 and the reference signal from the transmission circuit 103 is obtained, and the control signal for controlling the reactance of the variable reactance unit 109 is transmitted according to this difference, and a negative feedback circuit which maintains the series resonance is formed by the amplitude monitoring unit 119 and the control signal generation unit 121, such that it becomes possible to prevent the decrease of the voltage applied to the living body 9 and thereby improve the communication quality.

Figure 1:
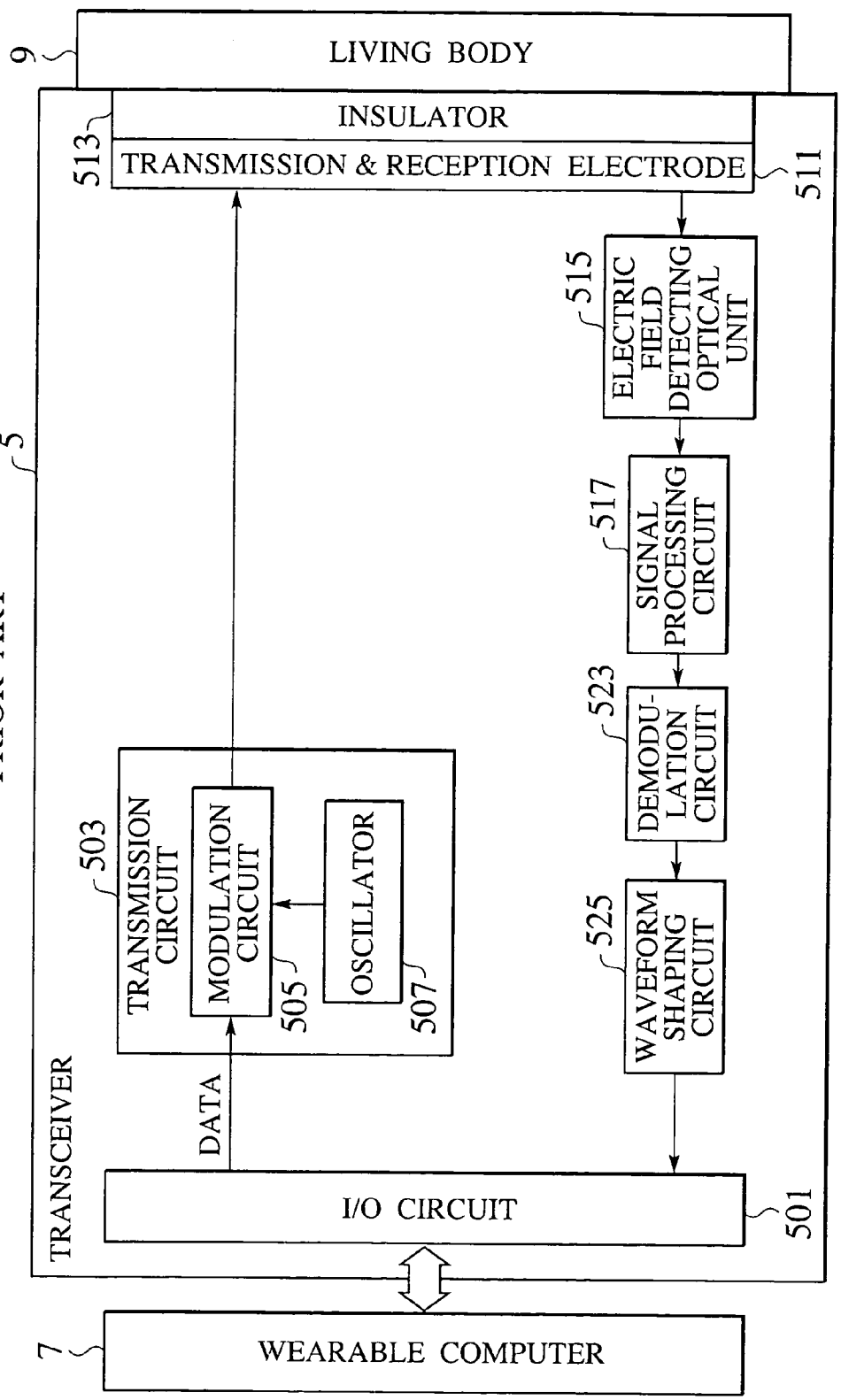
FIG. 1 is a block diagram showing a configuration of a conventional transceiver.
Figure 2:
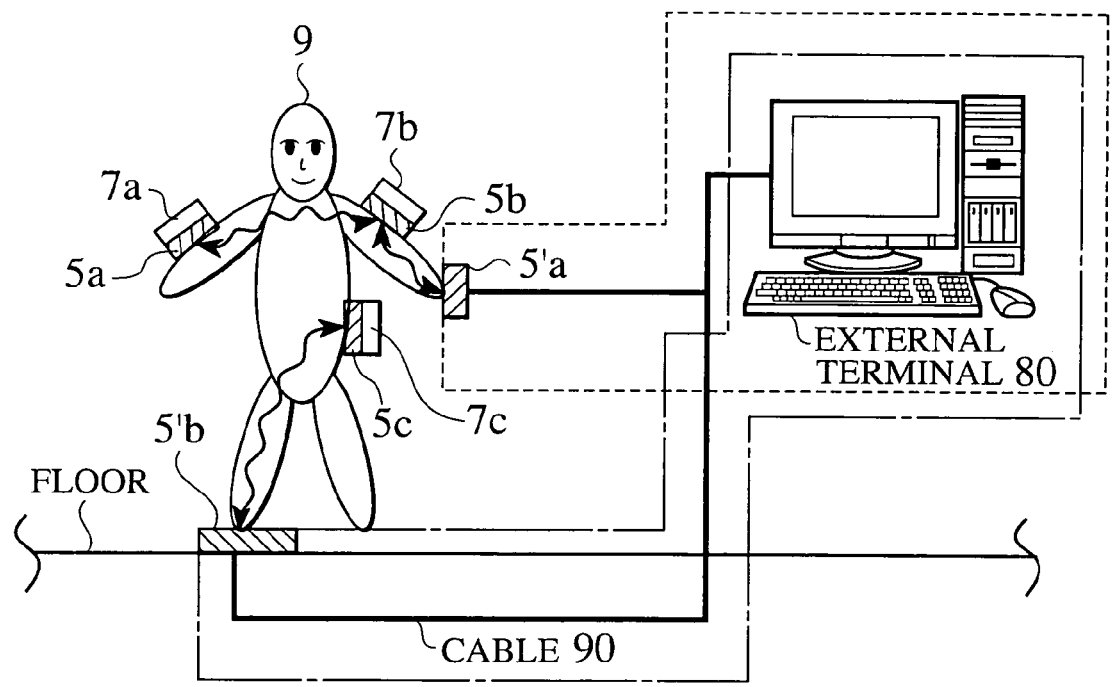
FIG. 2 is a diagram showing an exemplary way of using wearable computers worn by a human being through transceivers.
Figure 3:
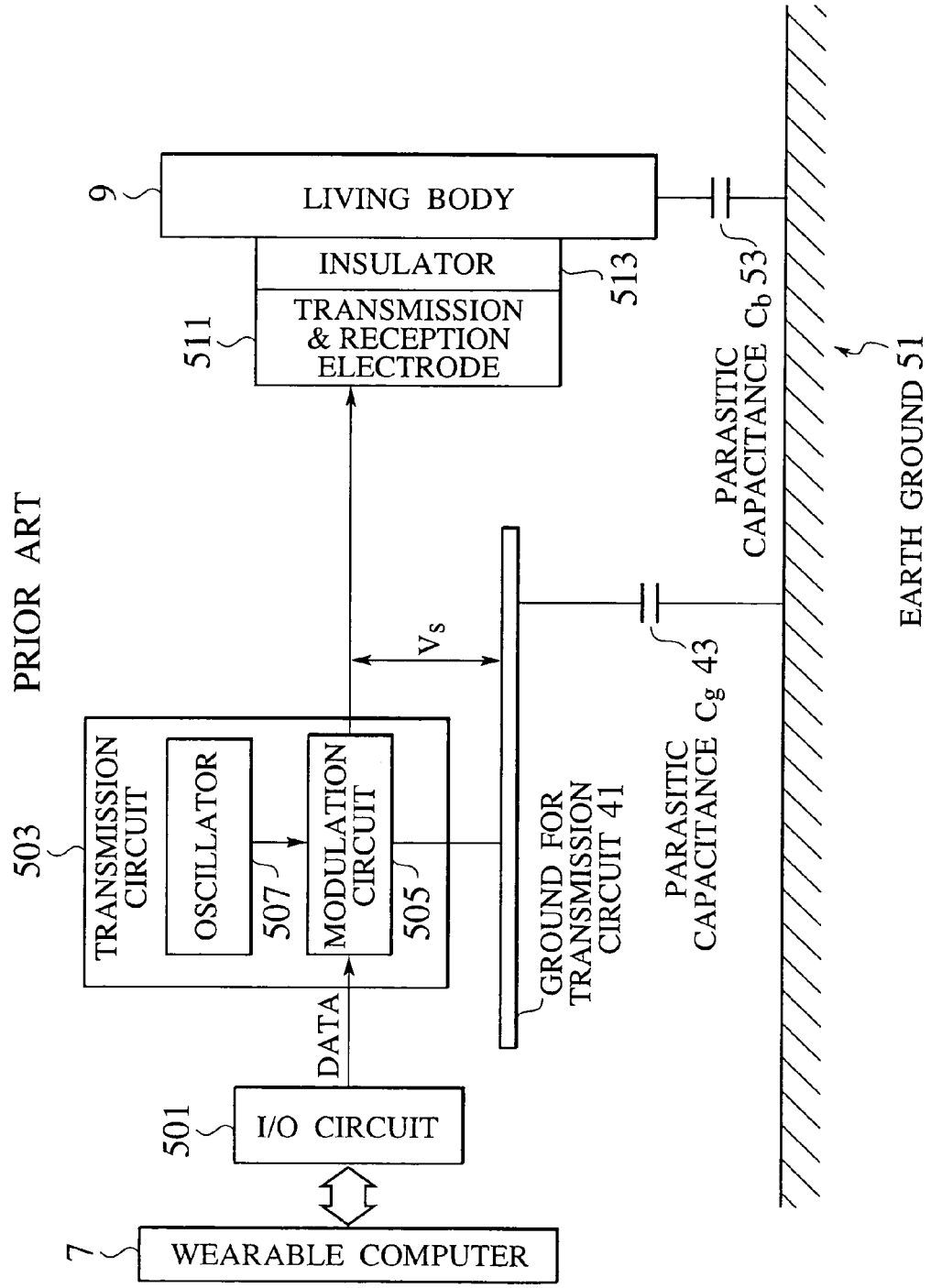
FIG. 3 is a schematic block diagram showing a conventional transceiver, for explaining a voltage applied to a living body.

It should be obvious that the transceiver 1 according to this embodiment can be utilized in practice, in a similar way as the conventional transceiver described above with reference to FIG. 2.

Next, the second specific configuration of the transceiver according to the first embodiment will be described.

In the first specific configuration described above, it is assumed that the gain of the amplifier 127 provided in the transceiver 1 is already adjusted in advance. However, it is also possible to make the gain of this amplifier 127 variable and provide a function for automatically controlling the gain.

Figure 8:
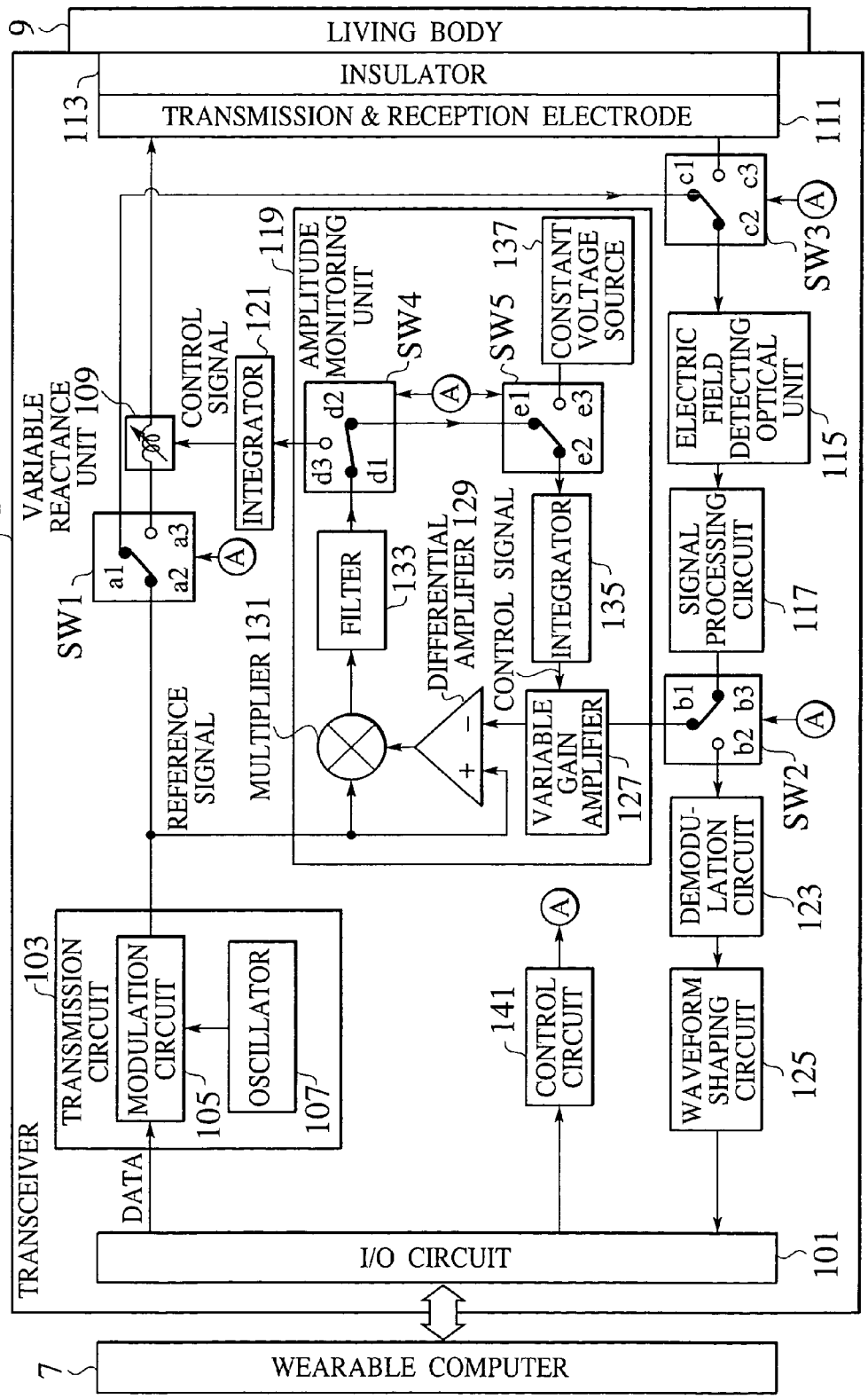
FIG. 8 is a block diagram showing a second specific configuration of a transceiver according to the first embodiment of the present invention at a gain adjustment time.

FIG. 8 shows the second specific configuration of the transceiver according to the first embodiment at a time of adjusting the gain, which is a modification of the first specific configuration. The transceiver 1 of FIG. 8 is similar to that of FIG. 7 except that a detailed configuration of the amplitude monitoring unit 119 is modified, that a wiring for directly connecting the modulation circuit 105 and the electric field detecting optical unit 115 without passing through the variable reactance unit 109 at a time of the gain adjustment is provided, and that a new switch SW3 is provided on this wiring. Namely, at a time of the gain adjustment, a terminal c1 and a terminal c2 of the switch SW3 are connected such that the modulation circuit 105 and the electric field detecting optical unit 115 are directly connected without passing through the variable reactance unit 109, such that the output voltage Vs of the modulation circuit 105 can be applied to the electric field detecting optical unit. 115 without any attenuation. In this case, it should be obvious that terminals a1 and a2 are connected in the switch SW1.

The amplitude monitoring unit 119 additionally has a variable gain amplifier 127, an integrator 135 for outputting a control signal for controlling the gain to this variable gain amplifier 127, and a constant voltage source 137 for outputting a signal that makes the output of the integrator 135 constant in order to maintain the constant gain at the data transmission or reception time after the gain adjustment. The constant voltage source 137 normally outputs a zero signal. The differential amplifier 129, the multiplier 131 and the filter 133 have the same functions as in FIG. 7.

The amplitude monitoring unit 119 is also provided with two new switches SW4 and SW5, which constitute the fourth connection. At a time of the gain adjustment shown in FIG. 8, terminals d1 and d2 are connected in the switch SW4 and terminals e1 and e2 are connected in the switch SW5. As a result, the signal obtained by multiplying the reference signal and the output signal of the differential amplifier 129 at the multiplier 131 and eliminating the higher harmonic components at the filter 133 is integrated at the integrator 135 to generate the control signal for the variable gain amplifier 127 so that the gain can be changed, The gain at this point is adjusted such that the output of the variable gain amplifier 127 becomes Vs when the voltage Vs is applied to the electric field detecting optical unit 115. Note that the data signal is set to be constant so that the signal from the oscillator 107 will not be modulated at a time of the gain adjustment.

Next, the operation at a time of the gain adjustment will be described with references to FIGS. 14A and 14B. In the case where the gain is small, the reference signal and the output signal of the differential amplifier 129 are in phase, so that as a result of integrating the signal outputted from the multiplier 131 and from which the higher harmonic components are eliminated by the filter 133, the control signal (gain control signal) for increasing the gain at the variable gain amplifier 127 is outputted from the integrator 135. Consequently, in this case, the output waveforms of constituent units of the amplitude monitoring unit 119 are essentially similar to those shown in FIG. 14A. The control signal 69 here is a signal for increasing the gain until the output signal outputted from the differential amplifier 129 (a difference between the reference signal 63 and the output signal of the variable gain amplifier 127) becomes zero.

On the other hand, signal waveforms shown in FIG. 14B correspond to the signal waveforms to be outputted from the constituent units of the amplitude monitoring unit 119 in the case where the gain is large. In this case, the reference signal 73 and the output signal 71 of the differential amplifier 129 are out of phase, so that the control signal 79 for decreasing the gain until the output signal from the differential amplifier 129 becomes zero is outputted from the integrator 135.

Next, the connection states of the switches at the data transmission or reception time after the gain adjustment will be described.

Figure 9:
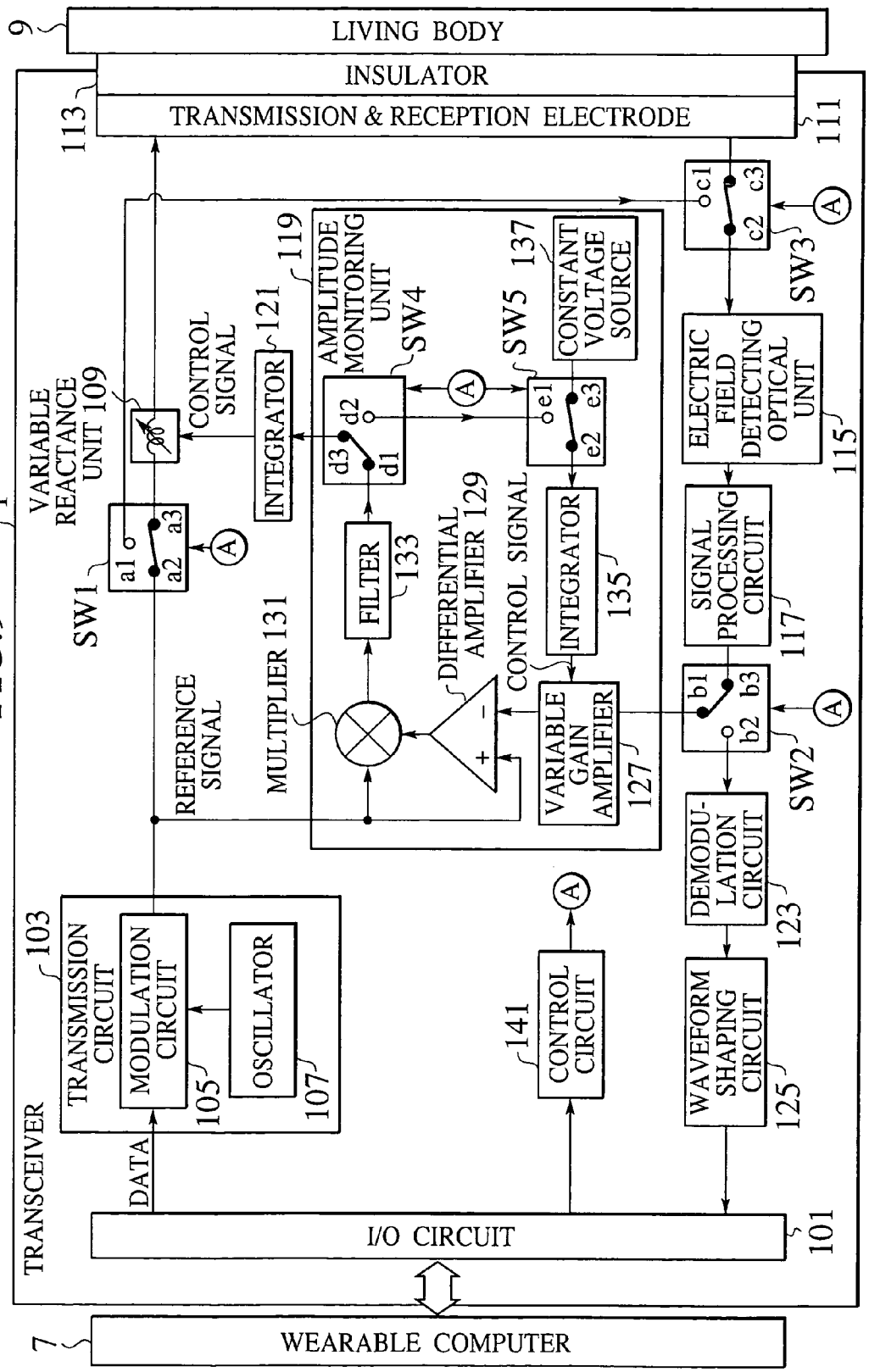
FIG. 9 is a block diagram showing a configuration of the transceiver of FIG. 8 at a data transmission time.

FIG. 9 shows the connection states of the switches at the data transmission time. In the switch SW1, terminals a2 and a3 are connected such that the output from the transmission circuit 103 is applied to the living body 9 through the variable reactance unit 109, similarly as in the first specific configuration described above. The switch SW2 is connected to the variable gain amplifier 127 side by connecting terminals b1 and b3, similarly as the gain adjustment time, to form a negative feedback circuit. The switch SW3 is connected to the transmission and reception electrode 111 side by connecting terminals c2 and c3 in order to receive signals from the living body 9. The switch SW4 is connected to the integrator 121 side by connecting terminals d1 and d3 in order to control the reactance of the variable reactance unit 109 by integrating the signal from the filter 133. The switch SW5 connects the integrator 135 and the constant voltage source 137 by connecting terminals e2 and e3.

Figure 10:
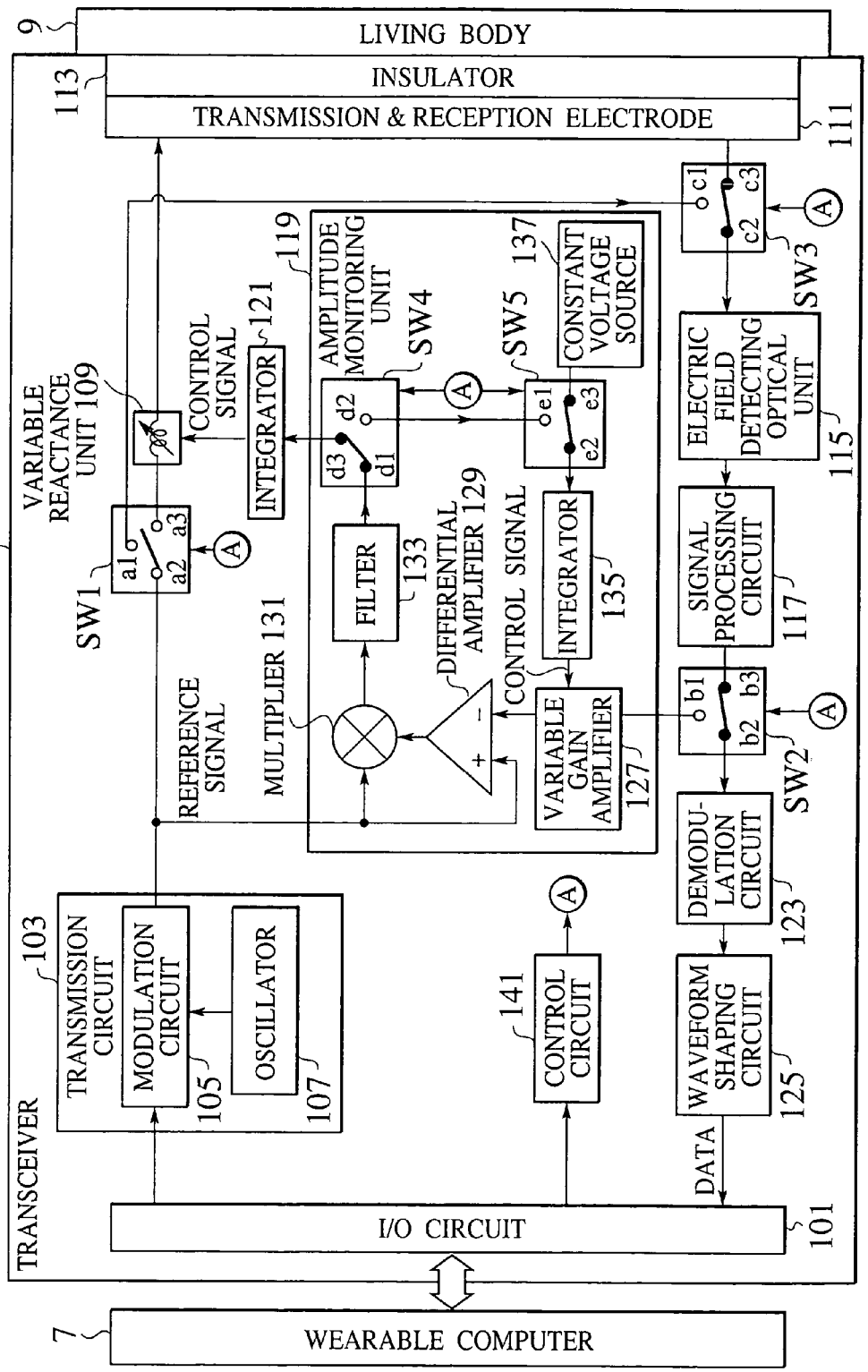
FIG. 10 is a block diagram showing a configuration of the transceiver of FIG. 8 at a data reception time.

On the other hand, FIG. 10 shows the connection states of the switches at the data reception time. As shown in FIG. 10, the switch SWI is disconnected in order to prevent the back flow to the transmission circuit 103 at the data reception time, similarly as in the first specific configuration. In the switch SW2, terminals b2 and b3 are connected such that the signal outputted from the signal processing circuit 117 is transmitted to the demodulation circuit 123. The connections of the other switches SW3, SW4 and SW5 are the same as in the data transmission time described above.

Note that the connections of the switches are switched in coordination by the switching control signal from the control circuit 141 depending on whether it is the gain adjustment time, the data transmission time or the data reception time, similarly as in the first specific configuration.

It should be obvious that the transceiver 1 with the gain adjustment function according to this second specific configuration described above have the same effects as the transceiver 1 of the first specific configuration. In addition, according to this second specific configuration, the optimum gain according to the situation is set by automatically adjusting the gain of the variable gain amplifier 127 provided in the amplitude monitoring unit 119, so that it is possible to carry out the more stable application of the voltage to the living body 9.

Next, the third specific configuration of the transceiver according to the first embodiment will be described.

The third specific configuration of the transceiver prevents the decrease of the voltage applied to the living body 9 by making the oscillation frequency f of the oscillator variable, instead of making the reactance of the reactance unit provided between the transmission circuit and the transmission and reception electrode variable.

As should be apparent from the equation (2), the voltage Vb applied to the living body 9 that changes according to the change of the parasitic capacitance Cg 43 can also be set equal to the output voltage Vs from the transmission circuit by changing the oscillation frequency f of the oscillator, instead of making the reactance X of the reactance unit variable as in the first specific configuration described above.

Figure 11:
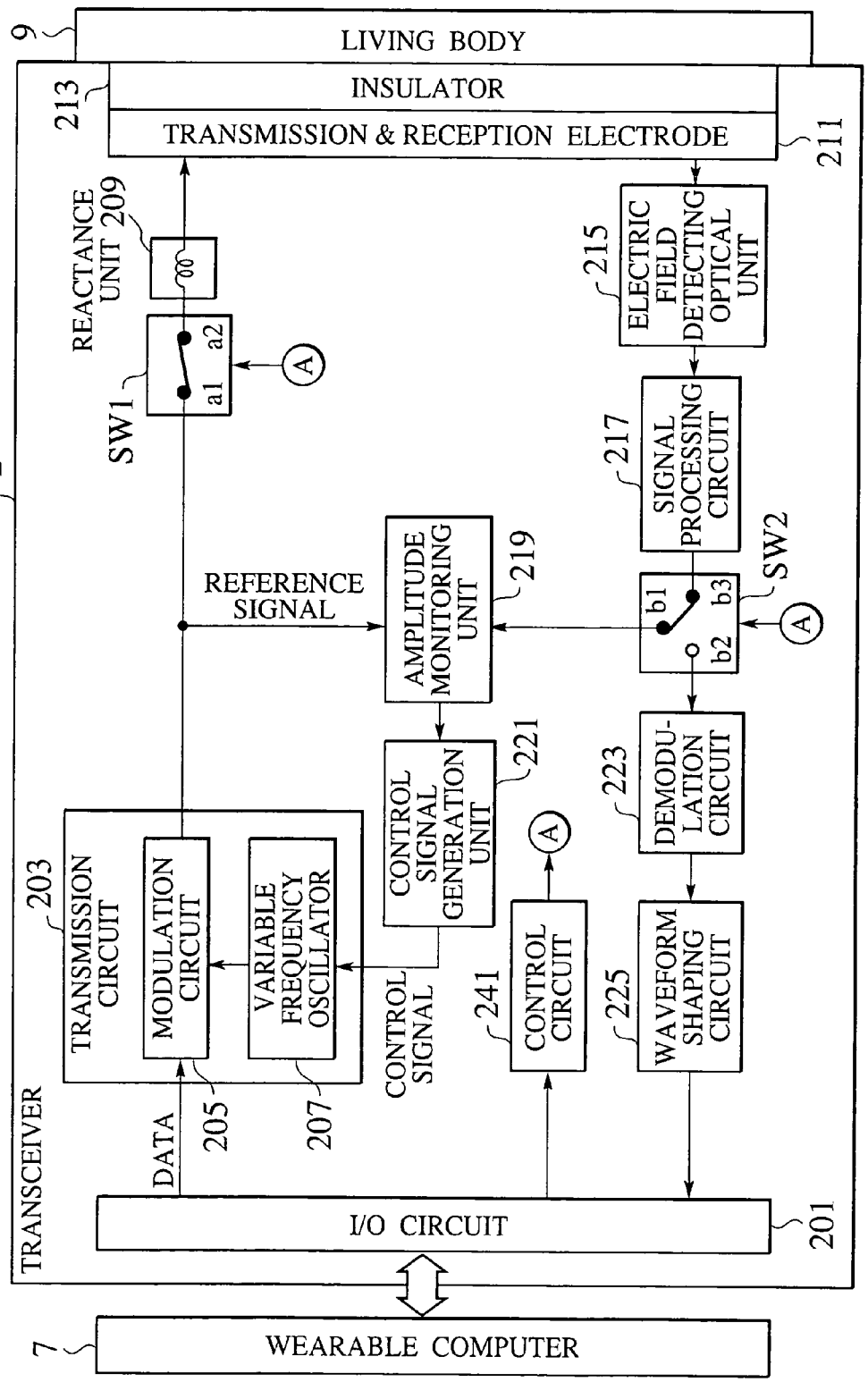
FIG. 11 is a block diagram showing a third specific configuration of a transceiver according to the first embodiment of the present invention at a data transmission time.

FIG. 11 shows the third specific configuration of the transceiver according to the first embodiment. In the transceiver 2 of FIG. 11, a reactance-unit 209 having a constant reactance is provided between the transmission circuit 203 and the transmission and reception electrode 211, while a variable frequency oscillator 207 capable of changing the frequency of the alternating current signals to be generated is provided in the transmission circuit 203. In conjunction with these, a control signal generation unit 211 for generating the control signal according to the signal outputted from the amplitude monitoring unit 219 is connected to the variable frequency oscillator 207. Namely, the control signal here is for controlling the frequency of the variable frequency oscillator 207. The functional configuration of the remaining portion is the same as the corresponding portion in the first specific configuration described above.

FIG. 11 shows the connection state of the switches in the transceiver 2 at the data transmission time. In FIG. 11, the signal outputted from the signal processing circuit 217 is transmitted to the control signal generation unit 221 through the amplitude monitoring unit 219, and the control signal according to this signal is sent to the variable frequency oscillator 207, such that the voltage Vb applied to the living body 9 is controlled to be equal to the output voltage Vs of the transmission circuit 203. More specifically, the connection states of the switches are such that terminals a1 and a2 are connected in the switch SW1 and terminals b1 and b3 are connected in the switch SW2.

Although not shown in the figure, the connection states of the switches at the data reception time are such that the connection between terminals a1 and a2 is disconnected in the switch SW1 while the connection in the switch SW2 is switched to the connection between terminals b2 and b3, similarly as in the first specific configuration. The switching of these two switches is carried out through the switching control signal from the control circuit 241, also similarly as in the first specific configuration.

The detailed configuration of the amplitude monitoring unit 219 is the same as the configuration of the amplitude monitoring unit 119 of FIG. 7. Namely, the output signal from the signal processing circuit 217 is outputted to the amplifier 227 provided in the amplitude monitoring unit 219, and the output signal from the amplifier 227 and the reference signal from the modulation circuit 205 are differentially amplified and multiplied together at the multiplier 231, and the multiplied signal from which the higher harmonic components are eliminated at the filter 233 is integrated by the integrator 221 which is the control signal generation unit, such that the control signal for controlling the frequency of the variable frequency oscillator 207 is generated.

Figure 12:
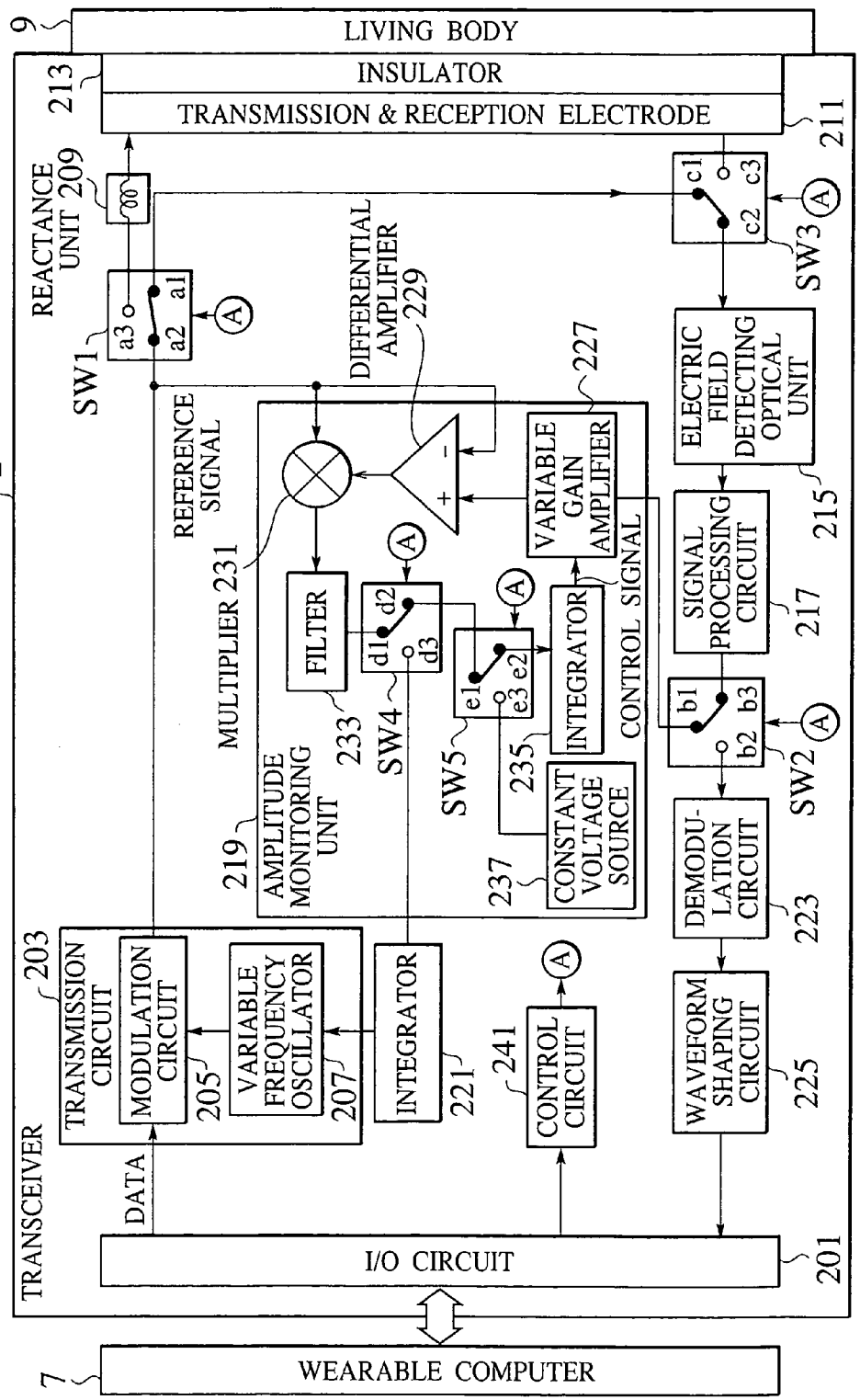
FIG. 12 is a block diagram showing a further detail configuration of the transceiver of FIG. 11.

Here it is also assumed that the gain of the amplifier 227 is already adjusted in advance, but it is also possible to use a configuration in which the amplifier 227 is made to be a variable gain amplifier with a function for automatically adjusting the gain. FIG. 12 shows the detailed configuration of the amplitude monitoring unit 219 and the connection states of switches at a time of the gain adjustment, which uses the variable gain amplifier 227 with a function for adjusting the gain.

The constituent units constituting the amplitude monitoring unit 219 and a wiring for directly connecting the transmission circuit 203 and the electric field detecting optical unit 215 without passing through the reactance unit 209 are the same as in the second specific configuration of FIG. 8. Also, symbols attached to terminals in each of the switches SW1, SW2, SW3, SW4 and SW5 are the same as those used in the second specific configuration. More specifically, in order to transmit the output signal from the transmission circuit 203 directly to the electric field detecting optical unit 215 without passing through the reactance unit 209, terminals a1 and a2 are connected in the switch SW1, and terminals c1 and c2 are connected in the switch SW3, In the switch SW2, terminals b1 and b3 are connected in order to send the output from the signal processing circuit 217 to the variable gain amplifier 227. In the switches SW4 and SW5, terminals d1 and d2 are connected while terminal e1 and e2 are connected, in order to transmit the output from the filter 233 in which the higher harmonic components are eliminated to the integrator 235.

As a result, the signal waveforms outputted from constituent units are similar to those shown in FIGS. 14A and 14B. It should be obvious here, however, that the control signal from the integrator 221 which is the control signal generation unit is outputted to the variable frequency oscillator 207 such that the frequency is changed to that in which the series resonance with the reactance unit 209 occurs, in this third specific configuration.

Figure 13:
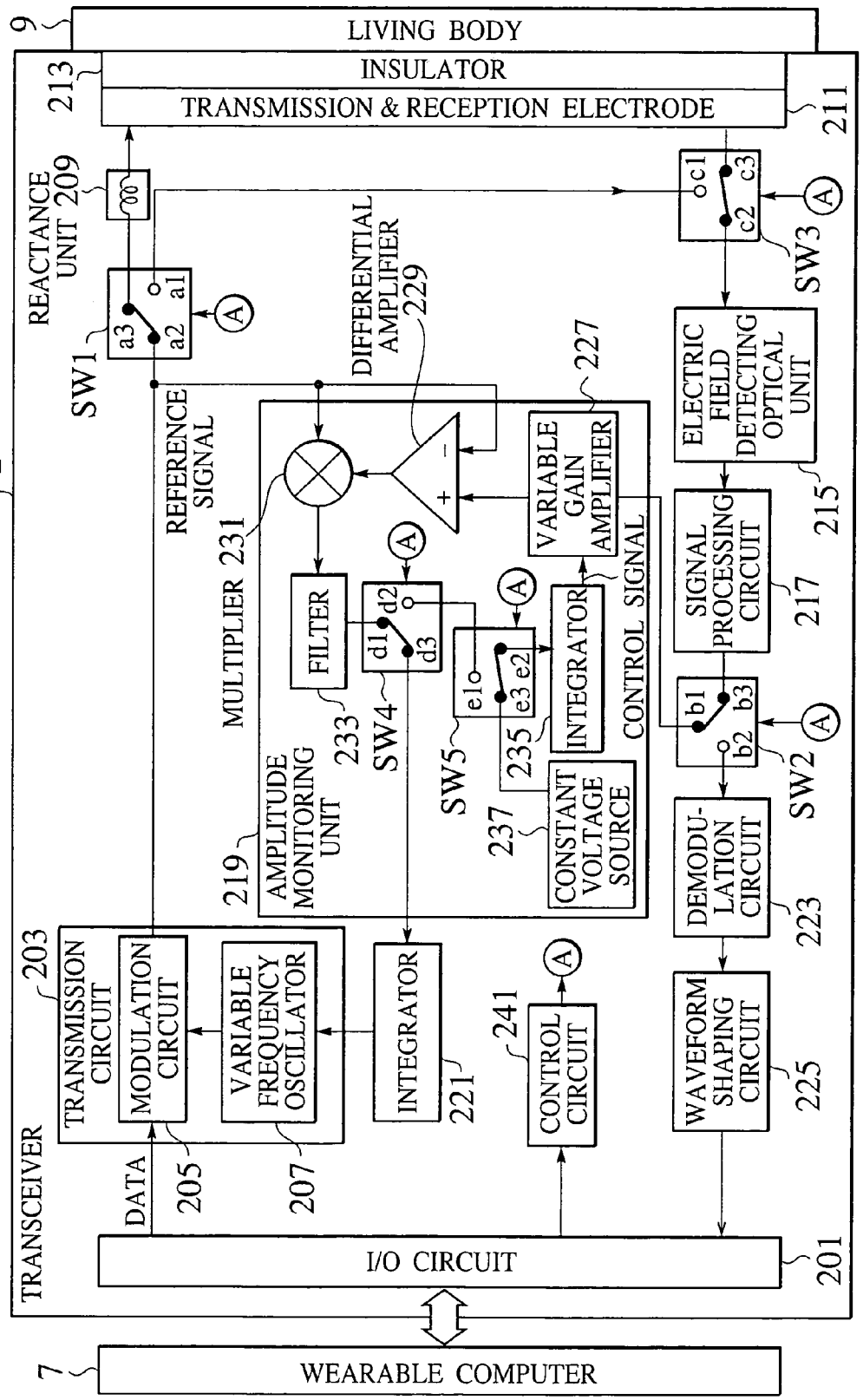
FIG. 13 is a block diagram showing a configuration of the transceiver of FIG. 12 at a data transmission time.

FIG. 13 shows the connection states of the switches in the transceiver 2 at the data transmission time. In the switch SW1, terminals a2 and a3 are connected in order to transmit the output from the transmission circuit 203 to the reactance unit 209. In the switch SW3, terminals c2 and c3 are connected in order to receive signals from the transmission and reception electrode 211. The switch SW2 is the same as in the gain adjustment time. In the switch SW4, terminals d1 and d3 are connected in order to send the output from the filter 233 to the integrator 221. In the switch SW5, terminals e2 and e3 are connected in order to send signal from the constant voltage source 237 to the integrator 235 in order to maintain the constant gain at the variable gain amplifier 227 after the gain adjustment.

Although not shown in the figure, at the data reception time, the connection between terminals in the switch SW1 is disconnected in order to prevent the back flow. In the switches SW2 and SW3, terminals b2 and b3 are connected while terminals c2 and c3 are connected in order to transmit the electric signals converted from the electric fields induced in the living body 9 to the wearable computer 7 as the received data. The switches SW4 and SW5 are the same as in the data transmission time.

According to the third specific configuration described above, the same effects as the first specific configuration can be obtained by making the frequency of the oscillator variable, instead of making the reactance of the reactance unit variable as in the first specific configuration.

It is also obvious that the same effects as the second specific configuration can be obtained in the case where the variable gain amplifier is used and the gain adjustment function is added.

Next, the fourth specific configuration of the transceiver according to the first embodiment will be described.

Figure 15:
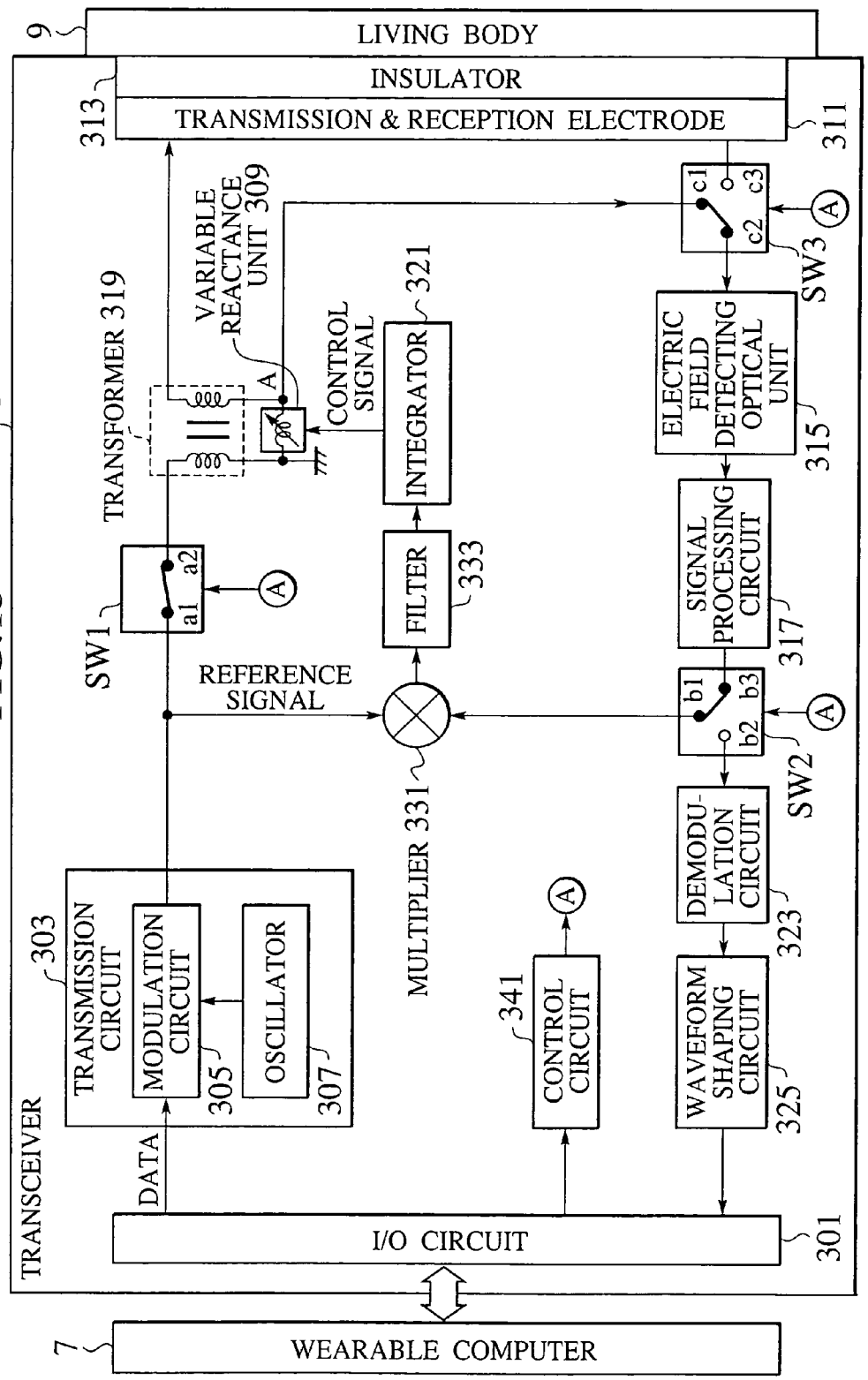
FIG. 15 is a block diagram showing a fourth specific configuration of a transceiver according to the first embodiment of the present invention at a data transmission time.

FIG. 15 shows the fourth specific configuration of the transceiver according to the first embodiment. In the transceiver 3 of FIG. 15, a transformer 319 is connected in series between the modulation circuit 305 and the transmission and reception electrode 311, and a variable reactance unit 309 is connected in parallel to this transformer 319. One end of this variable reactance unit 309 is connected to the Earth ground 51. For this reason, in the case where the reactance value is $X=1/(\omega Cg)=1/(2\pi f Cg)$, it becomes Vb=Vs so that the potential at a node A becomes zero. By monitoring this node A and changing the reactance X to form a negative feedback circuit for keeping the potential at the node A to be zero, it is possible to maintain the state of Vb=Vs. Note that, by providing the transformer 319, it is also possible to obtain the effect of increasing the electric field strength induced in the living body 9 at a time of transmission.

Next, the connection states of three switches provided in the transceiver 3 will be described. At the data transmission time shown in FIG. 15, terminals a1 and a2 are connected in the switch SW1. The switch SW2 is connected to the multiplier 331 side by connecting terminals b1 and b3 in order to form a negative feedback circuit. In the switch SW3, terminals c1 and c2 are connected in order to directly connect the transformer 319 and the electric field detecting optical unit 315.

On the other hand, although not shown in the figure, at the data reception time, the connection between terminals in the switch SW1 is disconnected in order to prevent the back flow from the living body 9. The switch SW3 is connected to the transmission and reception electrode 311 by connecting terminals c2 and c3 in order to receive signals from the living body 9, and the switch SW2 is connected to the demodulation circuit 323 side by connecting terminals b2 and b3 in order to receive signals from the electric field detecting optical unit 315 through the signal processing circuit 317 are received at the wearable computer 7 as the received data.

The signal waveforms outputted from the constituent units up to the control signal generation are essentially the same as those shown in FIGS. 14A and 14B, except that the output signals 61 and 71 that indicate the differential amplifier output are regarded as the output waveforms from the signal processing circuit 317. Namely, the case shown in FIG. 14A is the case in which the parasitic capacitance Cg 43 between the transmission circuit and the Earth ground 51 is decreased. In this case, it becomes Vb<Vs according to the equation (2), and the potential at the node A becomes lower than zero. As a result, the output signal 61 from the transformer 319 through the electric field detecting optical unit 315 and the signal processing circuit 317 that is inputted into the multiplier 331 causes the damped oscillation in phase with the reference signal 63. Consequently, the output of the multiplier 331 becomes positive. The higher harmonic components of the output signal 65 are eliminated at the filter 333, and the signal 67 outputted from the filter 67 is integrated by the integrator 321, such that the control signal (signal for increasing the reactance X) for making the reactance X to satisfy Vb=Vs in the variable reactance unit 309 is generated, and transmitted to the variable reactance unit 309.

FIG. 14B shows signal waveforms outputted from the constituent units up to the control signal generation in the case where the parasitic capacitance 43 is increased. In the case of FIG. 14B, the situation is reversed from the case of FIG. 14A. Namely, the output signal 71 from the transformer 319 through the electric field detecting optical unit 315 and the signal processing circuit 317 that is inputted into the multiplier 331 causes the damped oscillation out of phase with the reference signal 73. As a result, the output signal 75, the signal 77, and the control signal 79 outputted from the subsequent constituent units will have the opposite signs from those shown in FIG. 14A. The control signal 79 outputted from the integrator 321 is a signal for making the reactance X to satisfy Vb=Vs in the variable reactance unit 309 (signal for decreasing the reactance X).

In this way, in the fourth specific configuration, the role of the differential amplifier in the first to third specific configurations is substantially played by the transformer. Also, the gain adjustment to make the output of the differential amplifier zero in the first to third specific configurations corresponds to the monitoring of the potential at the node A and the adjustment of the reactance X to make that potential zero. Consequently, the Vb=Vs is satisfied as the potential at the node A becomes zero, there is no need to adjust the gain of the amplifier to be compared with the reference signal as in the case of using the differential amplifier.

It should be obvious that the functions of the remaining portion of the transceiver 3 are basically the same as the corresponding portion in the first to third specific configurations described above, so that their description will be omitted here.

According to the fourth specific configuration according to the first embodiment described above, the same effects as in the first to third specific configurations can be obtained, and in addition, it becomes possible to simplify the circuits inside the transceiver compared with the first to third specific configurations.

Also, according to the fourth specific configuration, there is no need for the gain adjustment, so that a preparatory operation at a time of utilizing the transceiver becomes unnecessary, so that it is also possible to obtain the effect that the transceiver becomes more convenient to use.

Next, the fifth specific configuration of the transceiver according to the first embodiment will be described.

Figure 16:
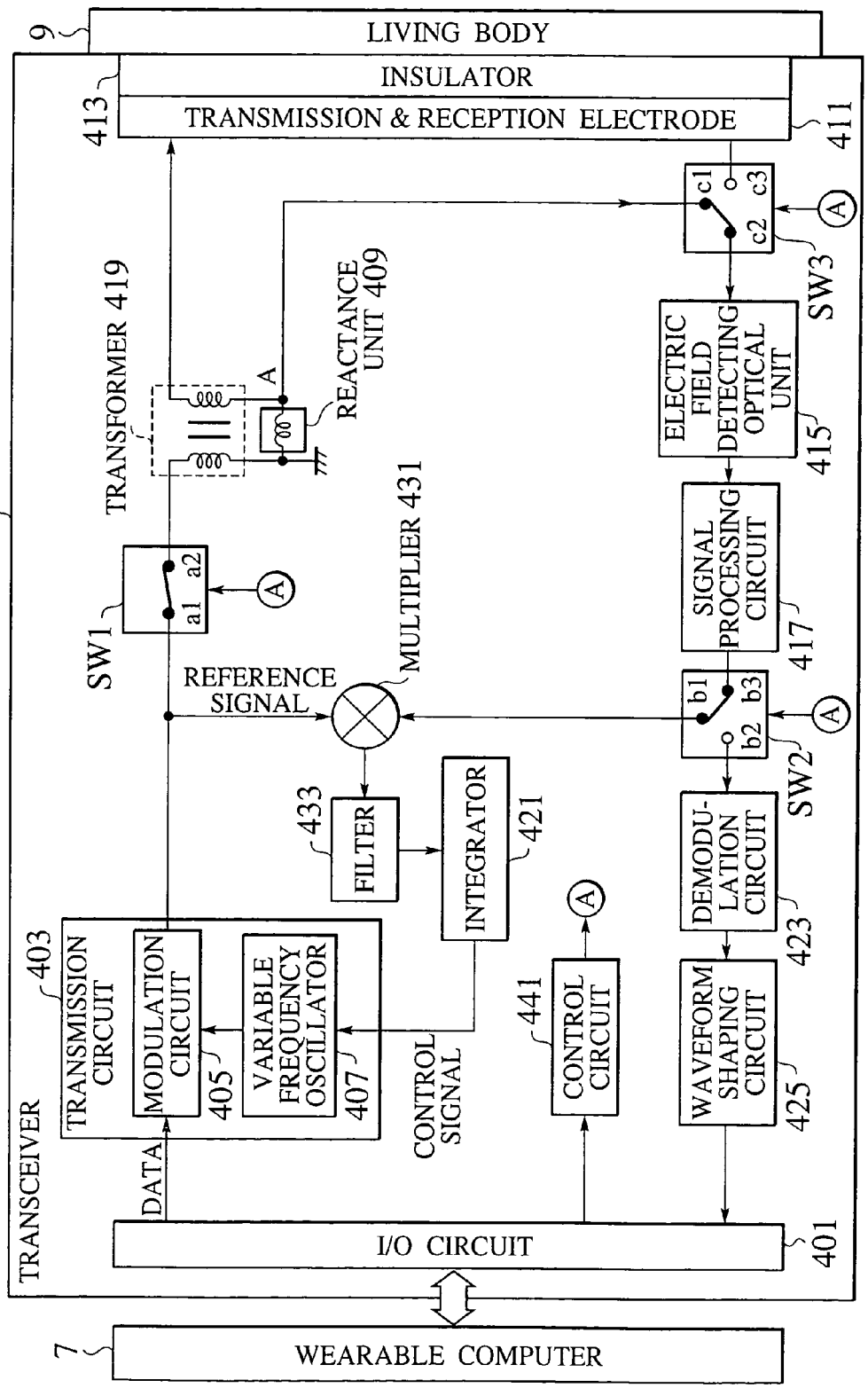
FIG. 16 is a block diagram showing a fifth specific configuration of a transceiver according to the first embodiment of the present invention at a data transmission time.

FIG. 16 shows the fifth specific configuration of the transceiver according to the first embodiment. In the transceiver 4 of FIG. 16, a transformer 16 is connected in series between the transmission circuit 403 and the transmission and reception electrode 411, and a reactance unit 409 with a constant reactance is connected in parallel to this transformer 419, while a variable frequency oscillator 407 capable of varying the frequency of carries (alternating current signals) for carrying the data from the wearable computer 7 is provided as an oscillator in the transmission circuit 403. For this reason, in order to generate the control signal for controlling the frequency of the variable frequency oscillator 407, the multiplier 431 for multiplying the reference signal and the signal outputted from the signal processing circuit 417, the filter 433 for eliminating the higher harmonic components of the output signal of the multiplier 431, and the integrator 421 for integrating the output signal of the filter 433 to generate the control signal are connected to the variable frequency oscillator 407. The remaining configuration of the transceiver 4 is the same as in the fourth specific configuration.

The operation of the transceiver 4 of the fifth specific configuration is essentially the same as the transceiver 3 of the fourth specific configuration. Namely, by adjusting the frequency of the alternating current signals that are the carriers such that the potential at the node A in the reactance unit 409 becomes zero, the control signal for controlling the frequency such that the voltage Vb applied to the living body 9 becomes equal to the output voltage Vs of the modulation circuit 405 is generated by the integrator 421. Consequently, the waveforms of the output signals of the constituent units are the same as in the fourth specific configuration, except that the actual control signal is outputted to the variable frequency oscillator 407 to change the frequency to the frequency in which the series resonance occurs.

Note that the connection states of three switches SW1<SW2 and SW3 are the same as in the fourth specific configuration, both at the data transmission time and the data reception time. Namely, terminals a1 and a2 are connected in the switch SW1, terminals b1 and b3 are connected in the switch SW2, and terminals c1 and c2 are connected in the switch SW3 at the data transmission time shown in FIG. 16. Also, although not shown in the figure, at the data reception time, the connection between terminals in the switch SW1 is disconnected, terminals b2 and b3 are connected in the switch SW2, and terminals c2 and c3 are connected in the switch SW3, such that the electric fields induced in the living body 9 are detected and data are sent to the wearable computer 7.

It should be obvious that the fifth specific configuration has the same effects as the fourth specific configuration.

Note that the first embodiment has been described above for an exemplary case of using the living body as the electric field propagating medium, but the electric field propagating medium for generating and propagating the electric fields according to the data at a time of the transmission or the reception by the transceiver according to the first embodiment is not necessarily limited to the living body.

According to the first embodiment described above, it is possible to provide a transceiver capable of preventing the decrease of the voltage applied to the electric field propagating medium and thereby improving the communication quality.

As a consequence, this transceiver can make the realization of the wearable computer more plausible.

Referring now to FIG. 17 to FIGS. 22A and 22B, the second embodiment of a transceiver according to the present invention will be described in detail.

The transceiver of the first embodiment assumes that the phase of the reference signal outputted from the transmission circuit coincides with the phase of the output signal of the signal processing circuit. However, in the case where the delay caused by the electric field detecting optical unit or the signal processing circuit becomes unignorable compared with the period of the carriers, there is a possibility of causing a phase difference between the reference signal and the output signal of the signal processing circuit. In fact, there is a possibility for this phase difference problem to become noticeable as in the case where the frequency of the carriers becomes high and give rise to unignorable influences.

For this reason, this second embodiment provides a transceiver capable of preventing the decrease of the voltage applied to the electric field propagating medium and thereby maintaining the good communication quality, even in the case of using carriers with a high frequency.

Figure 17:
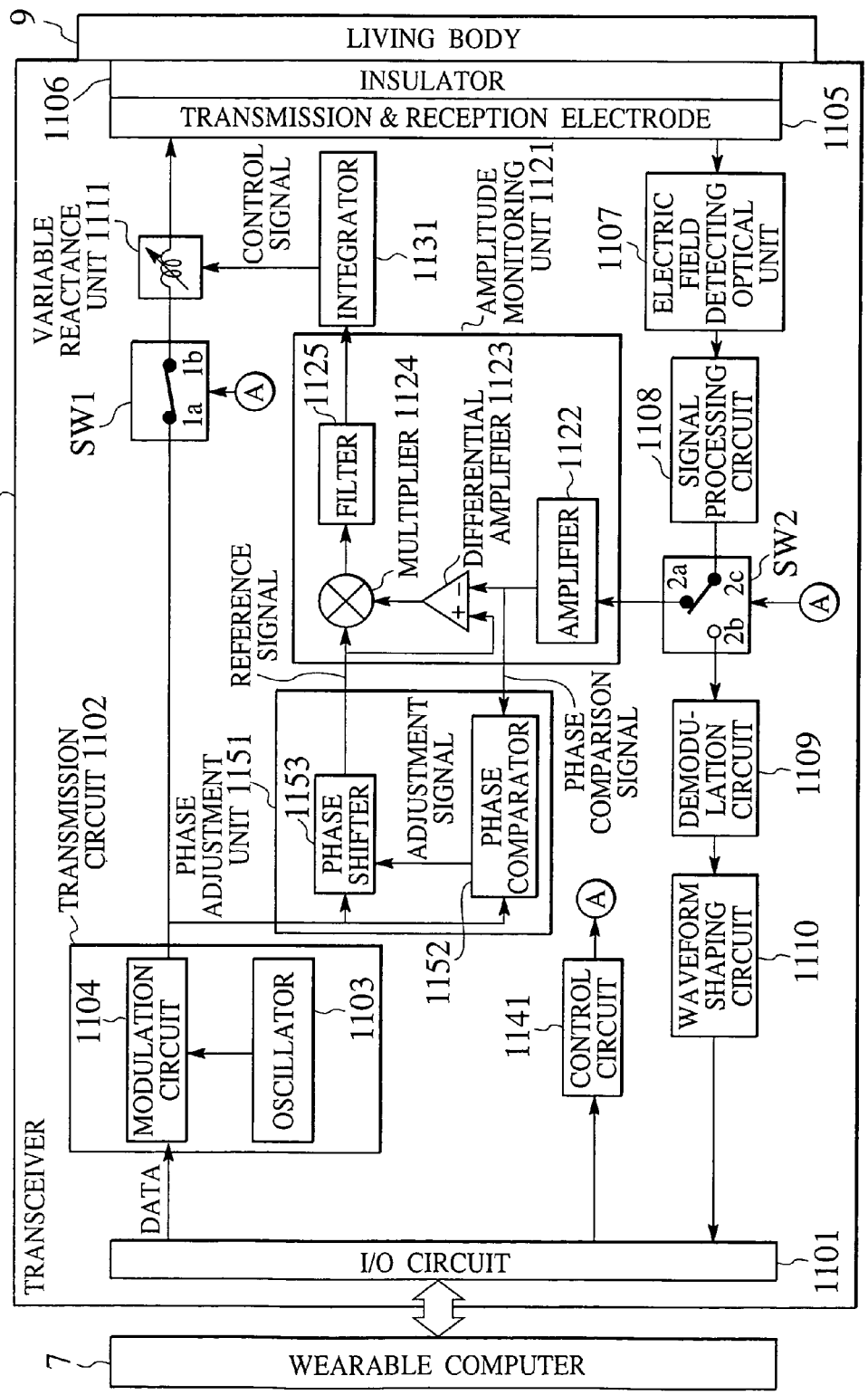
FIG. 17 is a block diagram showing a first specific configuration of a transceiver according to the second embodiment of the present invention at a data transmission time.

FIG. 17 shows a first specific configuration of a transceiver 1001 according to the second embodiment. The transceiver 1001 shown in FIG. 17 has an I/O circuit 1101 for outputting data received from the wearable computer 7 and receiving signals through the living body 9 which is the electric field propagating medium, a transmission circuit 1102 for transmitting signals by modulating data outputted from the I/O circuit 1101, a transmission and reception electrode 1105 formed by a conductive material for inducing electric fields in the living body 9 which is an electric field propagating medium, and an insulator 1106 provided between the transmission and reception electrode 1105 and the living body 9 for preventing currents to flow through the living body 9 and eliminating a possibility of the metal allergy by the living body 9 due to the transmission and reception electrode 1105.

Here, the transmission circuit 1102 comprises an oscillator 1103 for generating alternate current signals of a prescribed frequency, and a modulation circuit 1104 for modulating signals from the I/O circuit 1101 by using the alternate current signals generated by the oscillator 1103 as carriers.

A variable reactance unit 1111 which causes resonance is provided between the transmission circuit 1102 and the transmission and reception electrode 1105. Here the variable reactance unit 1111 is a circuit network formed by connecting a plurality of circuit elements such as inductors (coils), capacitors and so on, which is designed to maintain the series resonance of the parasitic capacitance Cg and the reactance X at the oscillation frequency f even when the parasitic capacitance Cg changes.

A switch SW1 is provided between the variable reactance unit 1111 and the transmission circuit 1102, and a connection state between terminals is changed at the data transmission time and the data reception time. More specifically, two terminals 1a and 1b are connected at the data transmission time shown in FIG. 17, whereas the connection between terminals is disconnected at the data reception time in order to prevent the signals from the living body 9 to be introduced into the transmission circuit 1102.

Note that it is also possible to divide the transmission and reception electrode 1105 into a transmission electrode and a reception electrode. In such a case, two insulators will be provided in correspondence to the respective electrodes.

In addition, the transceiver 1001 has an electric field detecting optical unit 1107 for optically detecting the electric fields received from the living body 9 through the insulator 1106 and the transmission and reception electrode 1105, and converting them into electric signals, and a signal processing circuit 1108 for carrying out processing such as a low noise amplification, a noise reduction, and a waveform shaping. These units constitute an electric field detection unit. This point that the electric field detection unit is formed by the electric field detecting optical unit and the signal processing circuit also applies to the other specific configurations to be described below.

The electric field detecting optical unit 1107 detects the electric fields by the electro-optic method using the laser lights and the electro-optic crystal, for example. In this case, the electric field detecting optical unit 1107 is formed by a laser diode that constitutes a laser light source, an electro-optic crystal such as $LiNbO_3$, $LiTaO_3$, etc., and it can be formed by using at leas an electro-optic element whose birefringence changes according to the received electric field strength, a wave plate for adjusting the polarization state of the laser light whose polarization state is changed as it passed through the electro-optic element, and a photo-diode for converting the intensity of the laser light that passed through the wave plate into the electric signal.

The signal processing circuit 1108 is connected to the electric field detecting optical unit 1107 on one side, and to the switch SW2 on the other side. In this switch SW2, terminals 2b and 2c are connected at the data reception time. In this case, the signal outputted from the signal processing circuit 1108 is demodulated at the demodulation circuit 1109, and applied with the waveform shaping at the waveform shaping circuit 1110. Then it reaches to the I/O circuit 1101 from which the data is sent to the wearable computer 7. On the other hand, at the data transmission time, terminals 2a and 2c are connected in the switch SW2 as shown in FIG. 17.

In addition, the transceiver 1001 in the first specific configuration also has a phase adjustment unit 1115 for comparing phases of the reference signal outputted from the transmission circuit 1102 and the signal outputted from the signal processing circuit 1108 and adjusting a phase difference between two signals, an amplitude monitoring unit 1121 for extracting a difference between two signals (the reference signal outputted from the transmission circuit 1102 and the signal outputted from the signal processing circuit 1108) with their phase difference adjusted by the phase adjustment unit 1151, an integrator 1131 as a control signal generation unit for generating the control signal for controlling the reactance X of the variable reactance unit 1111 according to the output signal from the amplitude monitoring unit 1121.

The phase adjustment unit 1151 has a phase comparator 1152 for comparing the phases of the reference signal transmitted from the transmission circuit 1102 and a phase comparison signal outputted from the amplitude monitoring unit 1121, and generating an adjustment signal for aligning the phases when the phases of these two signals are different (when there is a phase difference), and a phase shifter 1153 for actually adjusting the phase of the reference signal such that it aligns with the phase of the phase comparison signal according to the adjustment signal from the phase comparator 1152, and outputting the reference signal to the amplitude monitoring unit 1121.

The amplitude monitoring unit 1121 comprises an amplifier 1122 for amplifying the signal from the signal processing circuit 1108, a differential amplifier 1123 for obtaining a difference between the reference signal inputted through the phase adjustment unit 1151 from the transmission circuit 1102 and the output signal amplified by the amplifier 1122, and amplifying this difference, a multiplier 1124 for multiplying the output signal of the differential amplifier 1123 with the reference signal, and a filter 1125 for smoothing the output signal of the multiplier 1124 by eliminating higher harmonic components from the output signal of the multiplier 1124.

Here, it is assumed that the amplification (gain) of the amplifier 1122 is adjusted in advance such that the output of the amplifier 1122 becomes equal to the output voltage of the transmission circuit 1102 when the voltage applied to the living body 9 is equal to the output voltage of the transmission circuit 1102.

The integrator 1131 generates the control signal for controlling the reactance X of the variable reactance unit 1111 by integrating the output signal from the filter 1125 of the amplitude monitoring unit 1121. More specifically, as a changed part due to the change of the parasitic capacitance Cg 43 appearing between the ground for transmission circuit 41 and the Earth ground 51 is compensated by the control signal to the variable reactance unit 1111, it is possible to maintain the series resonance of the reactance X and the parasitic capacitance Cg 43 appearing between the ground for transmission circuit 41 and the Earth ground 51 at the oscillation frequency f.

By using a configuration in which these amplitude monitoring unit 1121 and integrator 1131 form a negative feedback circuit at the data transmission time, there is provided a mechanism for controlling a value of the reactance X which is the characteristic possessed by the variable reactance unit 1111.

Note that the detailed configuration of the amplitude monitoring unit 1121 and the phase adjustment unit 1151 described above is only an example, and it can be modified appropriately within a range of not digressing from the essence of the present invention.

Note that the connections between terminals in the switches SW1 and SW2 are switched in coordination. FIG. 17 shows a configuration in which a control circuit 1141 for controlling this switching is connected to the I/O circuit 1101 such that the control signal is sent to each switch. In FIG. 17, positions indicated by encircled A are connected together by wirings. The control signal for the switching issued from the control circuit 1141 may be transmitted from the wearable computer 7 or may be transmitted from an input unit provided at the transceiver 1001, but it should be noted that the configuration of the switches and the control circuit is not necessarily limited to that described here.

Next, the operation of the transceiver 1001 having the configuration as described above will be described.

First, the phase difference adjustment processing carried out by the phase adjustment unit 1151 will be described. Here, in order to focus the description to the processing for adjusting the phase difference, it is assumed that the voltage Vb applied to the living body 9 does not change.

The signal outputted from the transmission circuit 1102 and the signal outputted from the amplifier 1122 are both inputted into the phase comparator 1152, and phases of these two signals are compared. As a result of this comparison, when there is a phase difference between them, the adjustment signal for aligning their phases by cancelling that phase difference is outputted to the phase shifter 1153.

At the phase shifter 1153, the phase of the output signal from the transmission circuit 1102 is aligned with the phase of the output signal from the amplifier 1122 according to the adjustment signal, and this phase adjusted signal is outputted to the amplitude monitoring unit 1121 as the reference signal.

Note that the phase difference adjustment processing described above is carried out regularly.

Figure 21A:
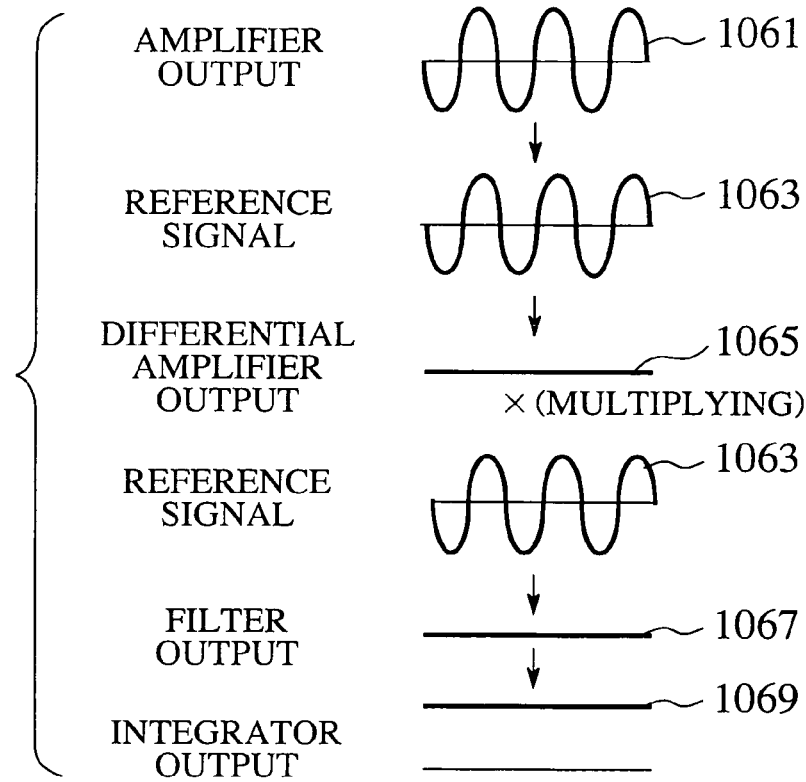
FIGS. 21A and 21B are diagrams showing signal waveforms of signals outputted from individual constituent units of an amplitude monitoring unit in a transceiver according to the second embodiment of the present invention for a case of carrying out a phase adjustment and a case of not carrying out a phase adjustment.

FIG. 21A shows waveforms of the output signals outputted from individual constituent units of the amplitude monitoring unit 1121 and the integrator 1131 when the phase adjustment is carried out. In FIG. 21A, it is also assumed that the voltage applied to the living body 9 is equal to the output voltage of the transmission circuit 1102 (Vb=Vs).

In this case, the phases of the output signal 1061 of the amplifier 1122 and the reference signal 1063 are aligned, so that the output signal 1065 from the differential amplifier 1123 becomes zero. Consequently, the output signal 1067 of the filter 1125 obtained by multiplying the output signal 1065 with the reference signal 1063 and smoothing the multiplication result also becomes zero. Thus, only the output signal 1069 of a constant value is generated from the integrator 1131 and the control signal for changing the reactance X will not be generated.

Figure 21B:
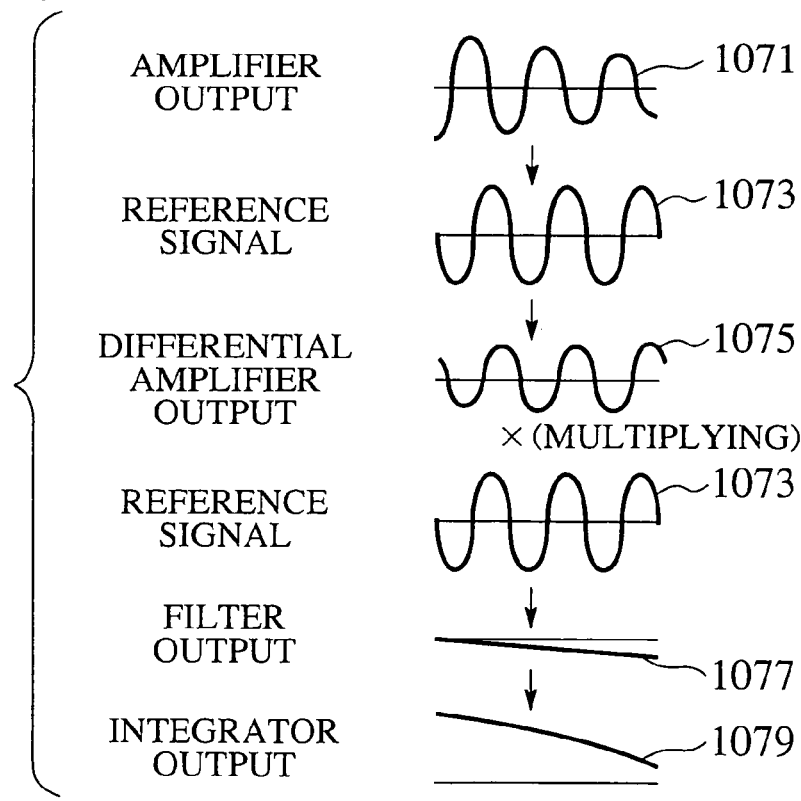

In contrast, FIG. 21B shows waveforms of the output signals outputted from individual constituent units of the amplitude monitoring unit 1121 and the integrator 1131 when the phase adjustment is not carried out. In this case, the phase difference between the output signal 1071 of the amplifier 1122 and the reference signal 1073 is not cancelled so that the output signal 1075 of the differential amplifier will not become zero, and the output signal 1077 of the filter 1125 obtained by smoothing the multiplication result of the output signal 1075 and the reference signal 1073 also will not become zero. Consequently, the output signal 1079 from the integrator 1131 also will not become zero, and the control signal for changing the reactance X will be outputted. As a result, in the case of not carrying out the phase adjustment, there arises a need to carry out the control even when there is no change in the parasitic capacitance 43.

As should be apparent from the above description, in this embodiment, because the phase adjustment by the phase adjustment unit 1151 provided in the transceiver 1001 is carried out, the reactance X of the variable reactance unit 1111 becomes constant and it is possible to realize the normal control, as long as the voltage applied to the living body 9 is equal to the output voltage of the transmission circuit 1102.

Next, the control of the amplitude monitoring unit 1121 and the integrator 1131 in the transceiver 1001 when the voltage Vb applied to the living body 9 changes. Here, it is assumed that the reference signal inputted into the differential amplifier 1123 and the multiplier 1124 has the phase aligned with the phase of the output signal of the amplifier 1122 as a result of having its phase adjusted by the phase difference adjustment processing at the phase adjustment unit 1151.

Figure 22A:
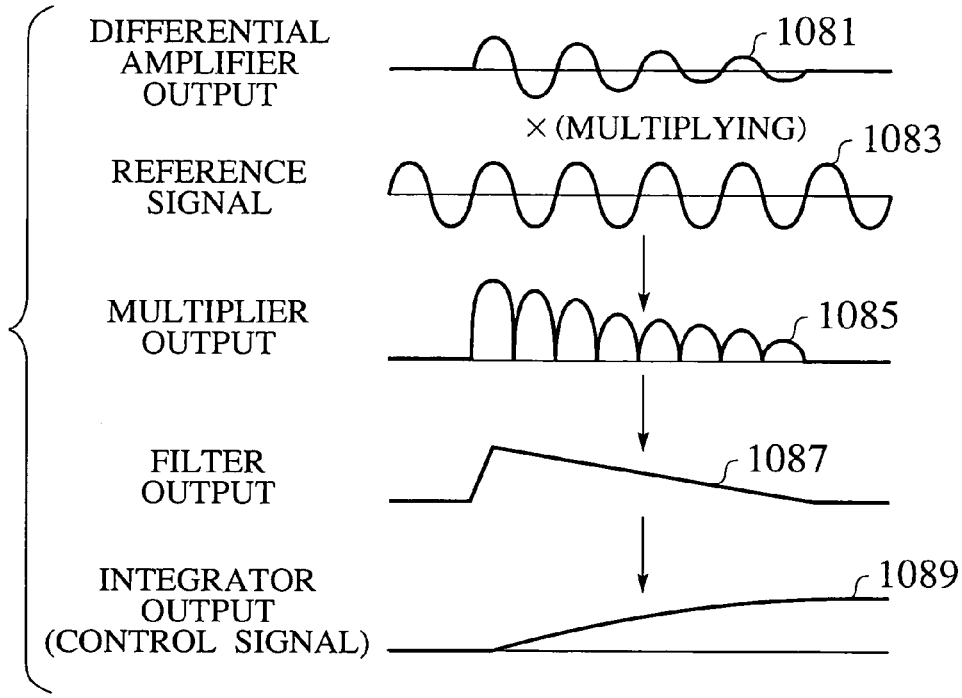
FIGS. 22A and 22B are diagrams showing signal waveforms of signals outputted from individual constituent units of an amplitude monitoring unit and an integrator in a transceiver according to the second embodiment of the present invention at a data transmission time.
Figure 22B:
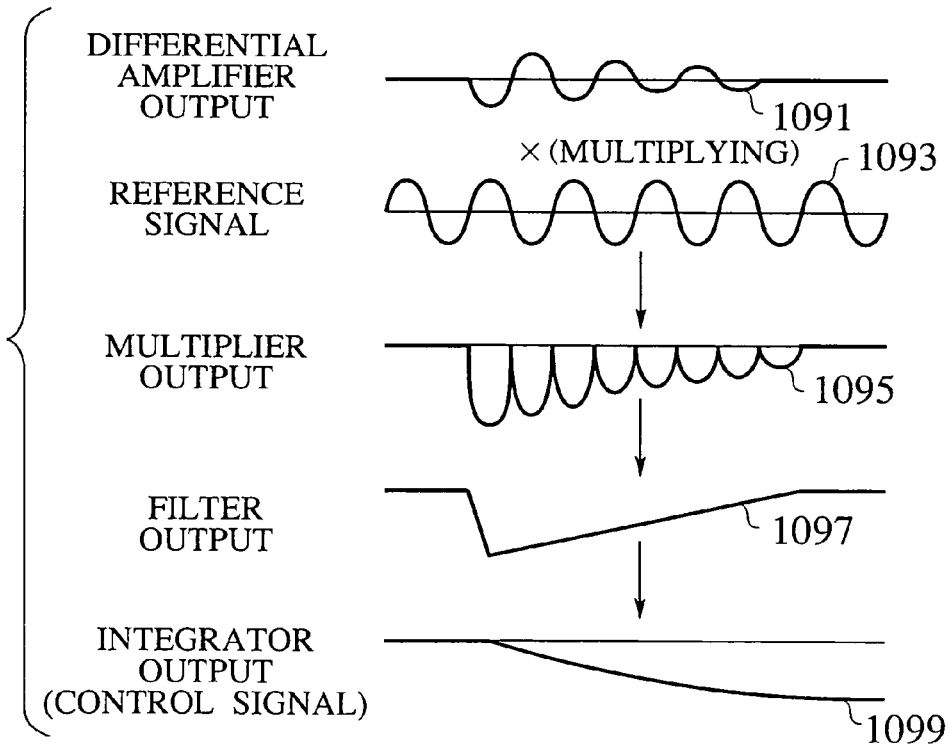

FIGS. 22A and 22B show exemplary signal waveforms outputted from each one of individual constituent units of the amplitude monitoring unit 1121 and the integrator 1131, until the control signal is generated at the data transmission time.

FIG. 22A shows a change of the signal waveform when the parasitic capacitance 43 between the transmission circuit and the Earth ground is decreased. In this case, the voltage Vb applied to the living body 9 is also decreased according to the equation (2), so that the output signal 1081 of the differential amplifier 11123 is in phase with the reference signal 1083 transmitted from the transmission circuit 1102. For this reason, the output signal 1085 of the multiplier 1124 that is obtained by multiplying them together has a waveform with values only on a positive direction. The signal 1087 is obtained from this output signal 1085 by eliminating the higher harmonic components by the filter 1125. The signal 1087 outputted from the filter 1125 is integrated by the integrator 1131, and the control signal 1089 for increasing the reactance X of the variable reactance unit 1111 such that it becomes Vb=Vs is outputted from the integrator 1131 to the variable reactance unit 1111, and as a result, the state of Vb=Vs is maintained.

FIG. 22B shows a change of the signal waveform when the parasitic capacitance 43 is increased. In this case, the voltage Vb applied to the living body 9 is also increased in conjunction with the increase of the parasitic capacitance 43, so that the output signal 1091 of the differential amplifier 1123 is out of phase with the reference signal 1093. For this reason, the output signal 1095 of the multiplier 1124 that is obtained by multiplying them together has a waveform with values only in a negative direction. The signal 1097 is obtained from this output signal 1095 by eliminating the higher harmonic components by the filter 1125. The signal 1097 outputted from the filter 1125 is integrated by the integrator 1131, and the control signal 1099 for decreasing the reactance X of the variable reactance unit 1111 such that it becomes Vb=Vs is outputted from the integrator 1131 to the variable reactance unit 1111.

By carrying out such a control, it becomes possible to prevent the decrease of the voltage Vb applied to the living body 9 due to the change of the parasitic capacitance 43.

According to the first specific configuration described above, the phase difference that occurs in the case where the delay at the electric field detecting optical unit or the signal processing circuit is unignorable with respect to the period of the carriers is adjusted by carrying out the phase adjustment, so that it is possible to induce the strong electric fields in the living body even when the carriers of a high frequency is used, and therefore it is possible to maintain the good communication quality.

Note that the high frequency bandwidth in which the phase difference adjustment function of this embodiment is expected to have a particularly noticeable effect is the frequency bandwidth higher than about 100 MHz (1 MHz=$10^6$ Hz). This point commonly applies to all the specific configurations of this embodiment.

It should be obvious that the transceiver 1001 according to this embodiment can be utilized in practice, in a similar way as the conventional transceiver described above with reference to FIG. 2. This point also commonly applies to all the specific configurations of this embodiment.

Next, the second specific configuration of the transceiver according to the second embodiment will be described.

The transceiver in the second specific configuration has a feature that the phases of the output signal of the signal processing circuit and the reference signal are set to coincide by adjusting the phase of the signal outputted from the signal processing circuit.

Figure 18:
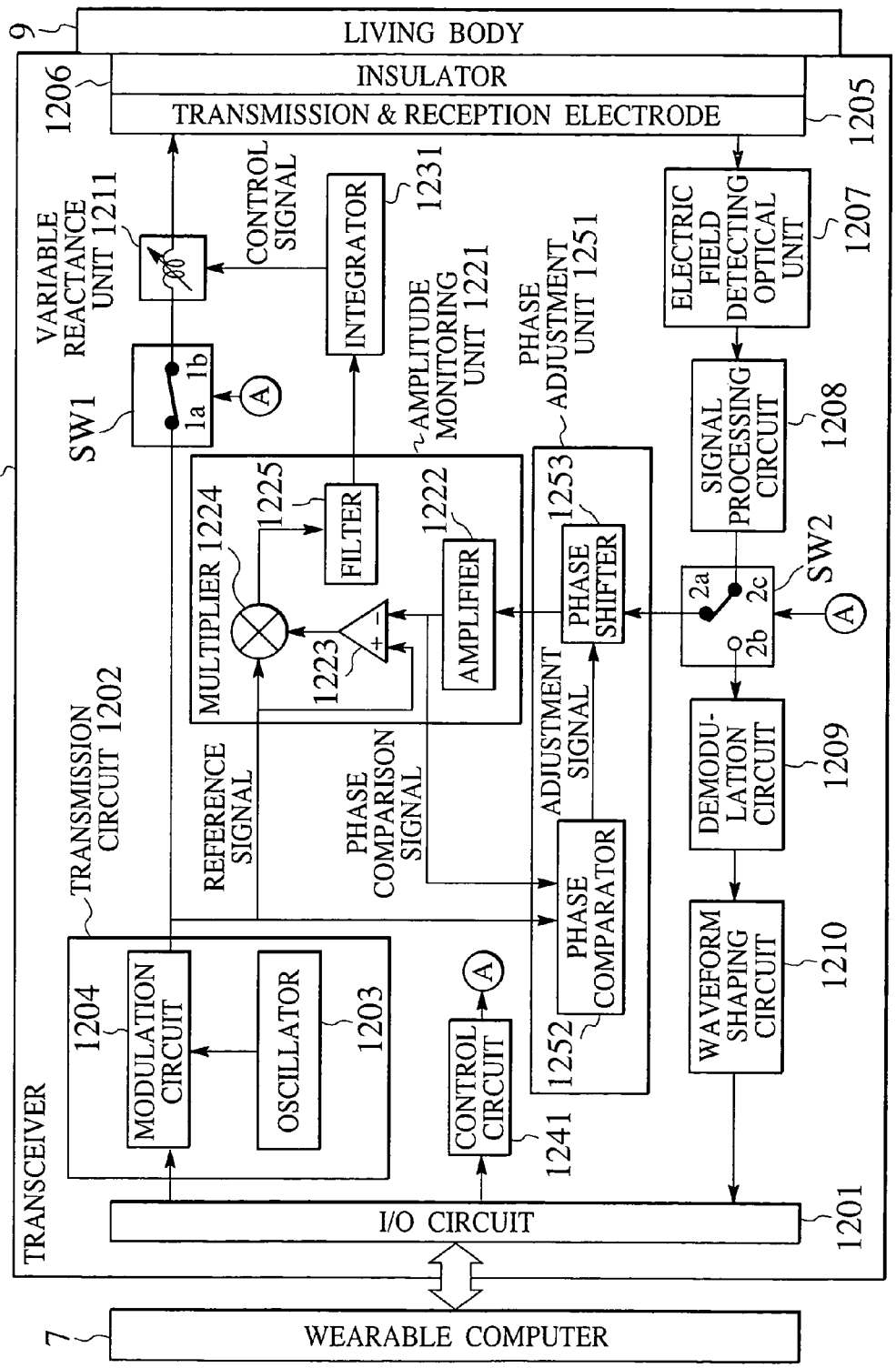
FIG. 18 is a block diagram showing a second specific configuration of a transceiver according to the second embodiment of the present invention at a data transmission time.

FIG. 18 shows the second specific configuration of the transceiver 1002 according to the second embodiment at the data transmission time. In the transceiver 1002 of FIG. 18, the phase adjustment unit 1251 is provided between the switch SW2 and the amplitude monitoring unit 1221.

In this case, the adjustment signal from the phase comparator 1252 is outputted to the phase shifter 1253 for adjusting the phase of the output signal of the signal processing circuit 1208, such that the phase of this output signal is adjusted to coincide with the phase of the reference signal outputted from the transmission circuit 1202. Namely, unlike the first specific configuration described above, the phase adjustment is not applied to the reference signal.

The output signal of the phase shifter 1253 is outputted to the amplifier 1222 of the amplitude monitoring unit 1221. The signal outputted from the amplifier 1222 is sent to the differential amplifier 1223, and outputted to the phase comparator 1252 as the phase comparison signal.

In addition to the output signal of the amplifier 1222, the reference signal sent from the transmission circuit 1202 is inputted into the differential amplifier 1223, and after a difference between these signals is extracted, this difference extraction result and the reference signal are multiplied together at the multiplier 1224 and then smoothed at the filter 1225, and outputted to the integrator 1231. This integrator 1231 generates the control signal for controlling the reactance X of the variable reactance unit 1211. In this sense, the integrator 1231 and the amplitude monitoring unit 1221 constitute a control mechanism similarly as in the first specific configuration.

The configuration and the operation of the remaining portion of the transceiver 1002 are the same as the corresponding portion in the first specific configuration.

The signal waveforms outputted from individual constituent units are the same as those shown in FIG. 21A (for the case where there is no change in the voltage applied to the living body 9 due to the change of the parasitic capacitance 43) and FIGS. 22A and 22B (for the case of generating the control signal when the voltage applied to the living body 9 changes after the phase adjustment).

It should be obvious that this second specific configuration has the same effects as the first specific configuration described above.

Next, the third specific configuration of the transceiver according to the second embodiment will be described.

The transceiver in the third specific configuration has a feature that the decrease of the voltage applied to the living body 9 is prevented by making the oscillation frequency f of the oscillator variable, while making the reactance X of the reactance unit provided between the transmission circuit and the transmission and reception electrode constant.

As should be apparent from the equation (2), the voltage Vb applied to the living body 9 that changes according to the change of the parasitic capacitance Cg 43 can also be set equal to the output voltage Vs from the transmission circuit by changing the oscillation frequency f of the oscillator that generates the alternating current signals, instead of making the reactance X of the reactance unit variable as in the first and second specific configurations described above.

Figure 19:
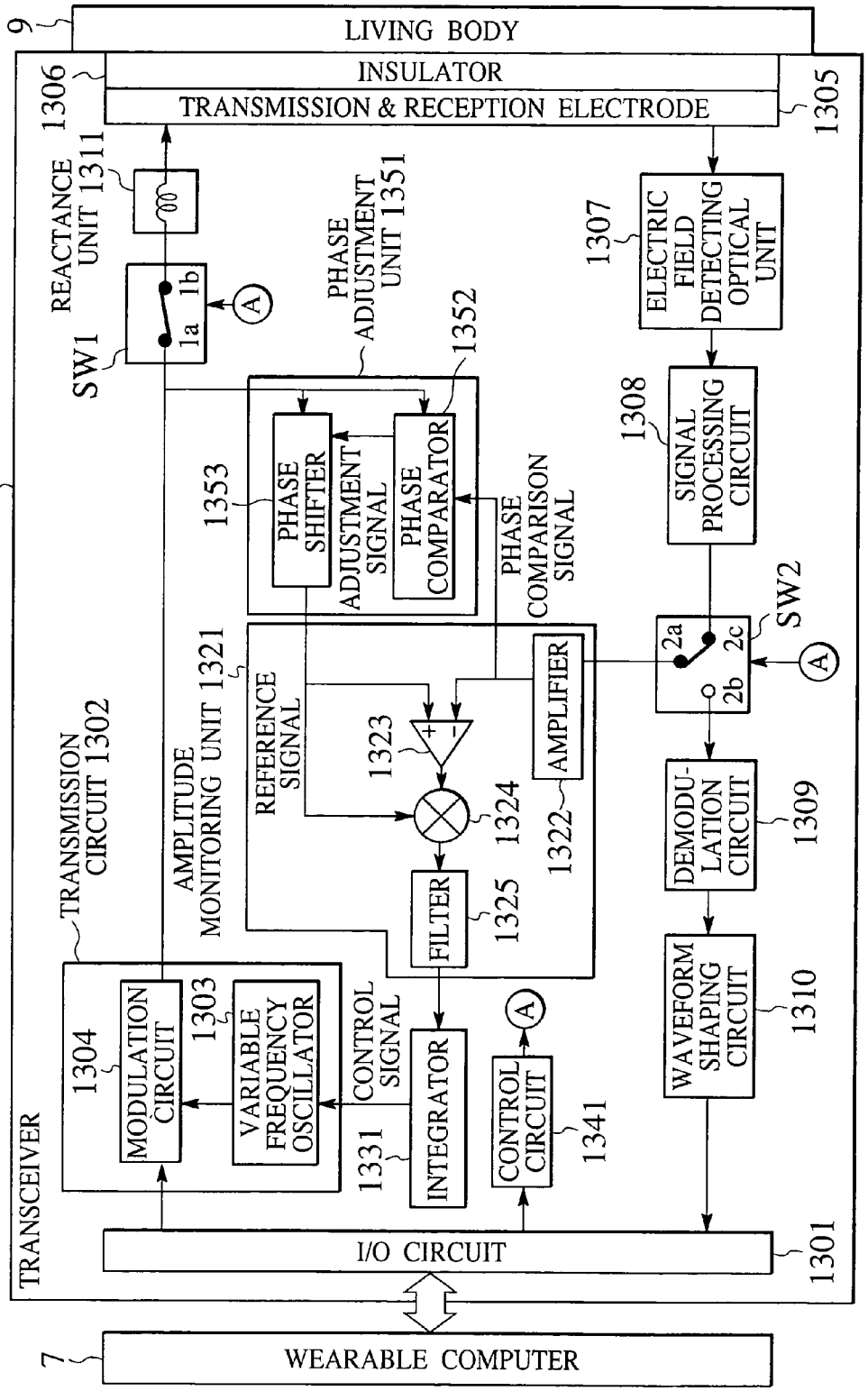
FIG. 19 is a block diagram showing a third specific configuration of a transceiver according to the second embodiment of the present invention at a data transmission time.

FIG. 19 shows the third specific configuration of the transceiver 1003 according to the second embodiment. In the transceiver 1003 of FIG. 19, a reactance unit 1311 having a constant reactance X is provided between the transmission circuit 1302 and the transmission and reception electrode 1305, while a variable frequency oscillator 1303 capable of changing the frequency of the alternating current signals to be generated is connected to the modulation circuit 1304.

In conjunction with these, an integrator 1331 for generating the control signal according to the signal outputted from the amplitude monitoring unit 1321 is connected to the variable frequency oscillator 1303. Namely, the control signal here is for controlling the frequency of the variable frequency oscillator 1303.

The signal outputted from the signal processing circuit 1308 is transmitted to the integrator 1331 through the amplitude monitoring unit 1321, and the control signal according to this signal is sent to the variable frequency oscillator 1303, such that the voltage Vb applied to the living body 9 is controlled to be equal to the output voltage Vs of the transmission circuit 1302. More specifically, the connection states of the switches at the data transmission time are such that terminals 1a and 1b are connected in the switch SW1 and terminals 2a and 2c are connected in the switch SW2.

Although not shown in the figure, the connection states at the data reception time are such that the connection between terminals 1a and 1b is disconnected in the switch SW1 while the connection in the switch SW2 is switched to the connection between terminals 2b and 2c. The switching of these two switches is carried out through the switching control signal from the control circuit 1341, similarly as in the first and second specific configurations described above.

The detailed configuration of the phase adjustment unit 1351 and the amplitude monitoring unit 1321 is the same as the configuration of the phase adjustment unit 1151 and the amplitude monitoring unit 1121 of FIG. 17, but it is not necessarily limited to this configuration.

The operation of the phase adjustment unit 1351 and the amplitude monitoring unit 1321 in the above described configuration at a time of the phase adjustment is the same as in the first specific configuration. Namely, the output signal from the signal processing circuit 1308 is outputted to the amplifier 1322 provided in the amplitude monitoring unit 1321, amplified there and then sent to the differential amplifier 1323 as well as the phase comparator 1352 in the phase adjustment unit 1351.

The phase comparator 1352 compares phases of the signal received from the amplifier 1322 and the signal received from the modulation circuit 1304, and outputs the adjustment signal for aligning the phases of these signals to the phase shifter 1353. The phase shifter 1353 adjusts the phase of the signal received from the modulation circuit 1304 and outputs it to the amplitude monitoring unit 1321.

The amplitude monitoring unit 1321 carries out the similar processing as in the first specific configuration, using the phase adjusted signal received from the phase adjustment unit 1351 as the reference signal, and outputs the signal to the integrator 1331. Here, it is also assumed that the amplification of the amplifier 1322 provided in the amplitude monitoring unit 1321 is adjusted in advance.

The integrator 1331 generates the control signal for controlling the frequency of the alternating current signals that are to be used as carriers to the variable frequency oscillator 1303, by integrating the output signal of the amplitude monitoring unit 1321.

As a result, the signal waveforms outputted from individual constituent units of the amplitude monitoring unit 1321 and the integrator 1331 which constitute the control mechanism as a whole are the same as those shown in FIG. 21A (for the case where there is no change in the voltage applied to the living body 9 due to the change of the parasitic capacitance 43) and FIGS. 22A and 22B (for the case of generating the control signal when the voltage applied to the living body 9 changes after the phase adjustment). In this third specific configuration, however, the control signal generated by the integrator 1331 is outputted to the variable frequency oscillator 1303 such that a frequency is changed to the frequency f in which the series resonance with the reactance unit 1311 occurs.

The configuration and the operation of the remaining portion of the transceiver 1003 are the same as the corresponding portion in the first and second specific configurations.

According to the third specific configuration described above, the same effects as the first specific configuration can be obtained by making the frequency of the alternating current signals outputted from the oscillator variable, while making the reactance of the reactance unit constant.

Next, the fourth specific configuration of the transceiver according to the second embodiment will be described.

The transceiver in the fourth specific configuration has a feature that the phase of the output signal of the signal processing circuit is adjusted in order to carry out the control with respect to the variable frequency oscillator.

Figure 20:
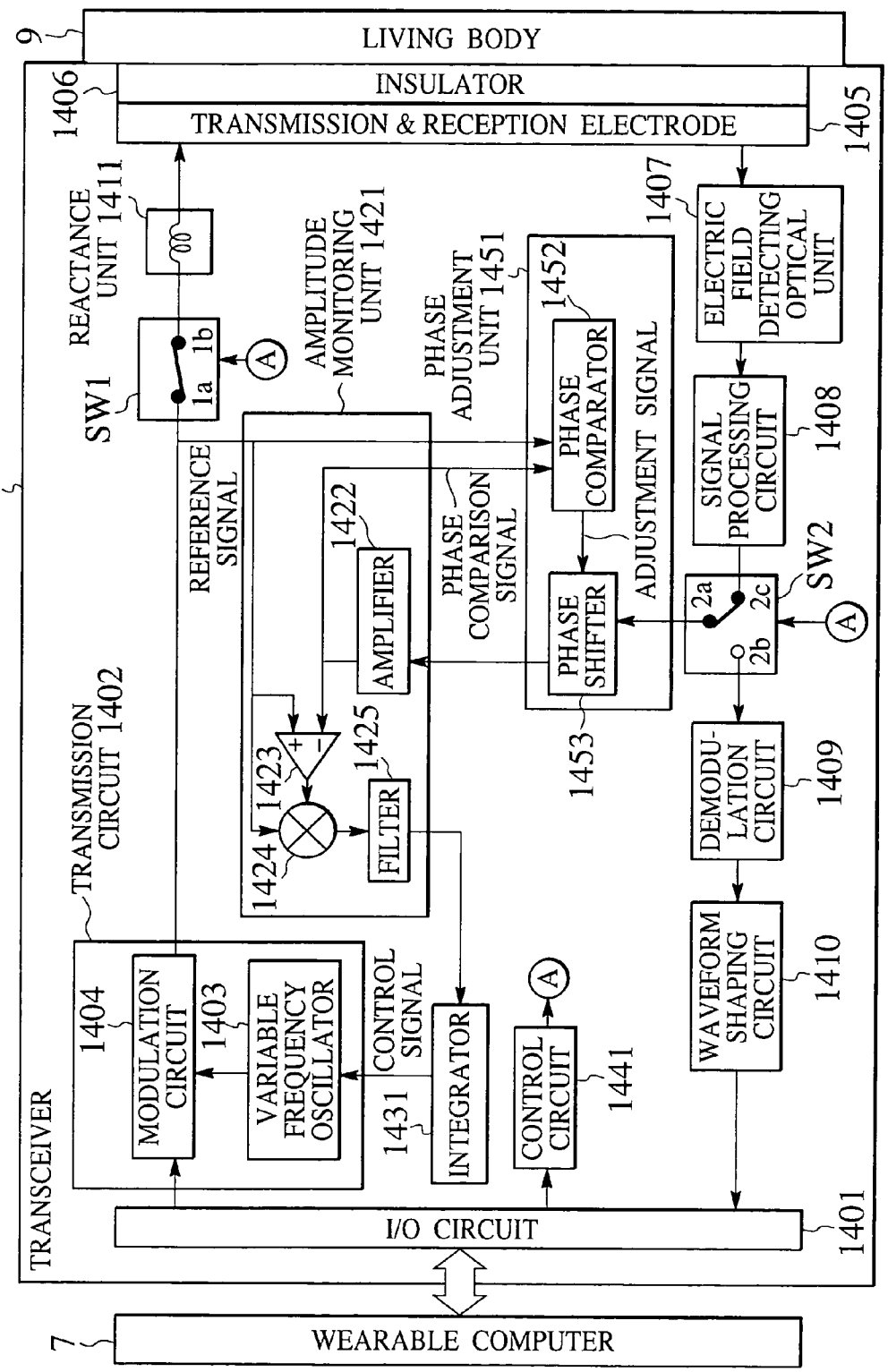
FIG. 20 is a block diagram showing a fourth specific configuration of a transceiver according to the second embodiment of the present invention at a data transmission time.

FIG. 20 shows the fourth specific configuration of the transceiver 1004 according to the second embodiment at the data transmission time. In the transceiver 1004 of FIG. 20, the phase adjustment unit 1451 is provided between the switch SW2 and the amplitude monitoring unit 1421, and similarly as in the second specific configuration described above, the phase of the output signal outputted to the amplifier 1422 provided in the amplitude monitoring unit 1421 is adjusted to coincide with the phase of the reference signal generated from the modulation circuit 1404, and the phase adjustment is not applied to the reference signal.

The output signal of the amplifier 1422 and the reference signal are inputted into the differential amplifier 1423, and after a difference between these signals is extracted, this difference extraction result and the reference signal are multiplied together at the multiplier 1424 and then smoothed at the filter 1425, and outputted to the integrator 1431. This integrator 1431 generates the control signal for controlling the frequency f of the variable frequency oscillator 1403 such that the resonance with the reactance unit 1411 occurs.

In this fourth specific configuration, the signal waveforms outputted from individual constituent units of the amplitude monitoring unit 1421 and the integrator 1431 which constitute the control mechanism as a whole are the same as those shown in FIG. 21A (for the case where there is no change in the voltage applied to the living body 9 due to the change of the parasitic capacitance 43) and FIGS. 22A and 22B (for the case of generating the control signal when the voltage applied to the living body 9 changes after the phase adjustment). In this fourth specific configuration, however, the control signal controls the oscillation frequency of the variable frequency oscillator 1403, similarly as in the third specific configuration.

Also, the connection states of the switch SW1 and the switch SW2 at the data reception time are the same as in the first to third specific configurations described above. The switching of these two switches is carried out through the switching control signal from the control circuit 1441, similarly as in the first to third specific configurations described above.

The configuration and the operation of the remaining portion of the transceiver 1004 are the same as the corresponding portion in the third specific configuration.

It should be obvious that this fourth specific configuration has the same effects as the first to third specific configurations described above.

In the first to fourth specific configurations described above, it is assumed that the amplification (gain) of the amplifier provided in the transceiver is already adjusted in advance, but it is also possible to make this amplification of the amplifier variable, and add a function for automatically adjusting the amplification.

It is also possible to form the electric field detecting optical unit provided in the transceiver by using two electrode plates that are connected to become a short-circuit by a lead wire, laser lights and the magneto-optic crystal.

Note that the second embodiment has been described above for an exemplary case of using the living body as the electric field propagating medium, but the electric field propagating medium for generating and propagating the electric fields according to the data at a time of the transmission or the reception by the transceiver according to the second embodiment is not necessarily limited to the living body.

According to the second embodiment described above, it is possible to provide a transceiver capable of preventing the decrease of the voltage applied to the electric field propagating medium and thereby maintaining the good communication quality, even in the case of using carriers with a high frequency.

As a consequence, this transceiver can make the realization of the wearable computer more plausible.

Referring now to FIG. 23 to FIGS. 30A and 30B, the third embodiment of a transceiver according to the present invention will be described in detail.

In the transceiver of the first embodiment, the instantaneous values of the output voltage Vs of the transmission circuit and the voltage Vb applied to the living body are compared in order to be capable of applying any modulation scheme, but this comparison method has a problem that it is vulnerable to the delay or the signal distortion that may occur in the circuit. For this reason, in order to carry out the processing without the signal delay or the waveform distortion, the wide bandwidth and the high linearity are required not only to the amplitude monitoring unit but also to the amplifier, etc. used in the signal processing circuit, and these circuits in turn require expensive components.

For this reason, this third embodiment provides a transceiver capable of preventing the decrease of the voltage applied to the electric field propagating medium and thereby improving the communication quality, that can be realized inexpensively.

FIG. 23 shows a first specific configuration of a transceiver 2001 according to the third embodiment. The transceiver 2001 shown in FIG. 23 has an I/O circuit 2101 for outputting data received from the wearable computer 7 and receiving signals through the living body 9 which is the electric field propagating medium, a transmission circuit 2102 for transmitting signals by modulating data outputted from the I/O circuit 2101, a transmission and reception electrode 2105 formed by a conductive material for inducing electric fields in the living body 9 which is an electric field propagating medium, and an insulator 2106 provided between the transmission and reception electrode 2105 and the living body 9 for preventing currents to flow through the living body 9 and eliminating a possibility of the metal allergy by the living body 9 due to the transmission and reception electrode 2105.

Here, the transmission circuit 2102 comprises an oscillator 2103 for generating alternate current signals of a prescribed frequency, and a modulation circuit 2104 for modulating signals from the I/O circuit 2101 by using the alternate current signals generated by the oscillator 2103 as carriers.

The frequency of the alternating current signals generated from the oscillator 2103 is expected to take a value in a range of about 10 kHz to 100 MHz, and it is more preferable to take a value of about 10 MHz. However, this is only an example, and it is also possible to generate signals in a high frequency higher than 100 MHz or ultra high frequency higher than 3 GHz, for example. Here, 1 kHz=$10^3$ Hz, 1 MHz=$10^6$ Hz, and 1 GHz=$10^9$ Hz.

A variable reactance unit 2111 which causes resonance is provided between the transmission circuit 2102 and the transmission and reception electrode 2105. Here the variable reactance unit 2111 is a circuit network formed by connecting a plurality of circuit elements such as inductors (coils), capacitors and so on, which is designed to maintain the series resonance of the parasitic capacitance Cg and the reactance X at the oscillation frequency f even when the parasitic capacitance Cg changes.

A switch SW11 is provided between the variable reactance unit 2111 and the transmission circuit 2102, and a connection state between terminals is changed at the data transmission time and the data reception time. More specifically, two terminals 11a and 11b are connected at the data transmission time shown in FIG. 23, whereas the connection between terminals is disconnected at the data reception time in order to prevent the signals from the living body 9 to be introduced into the transmission circuit 2102.

Note that it is also possible to divide the transmission and reception electrode 2105 into a transmission electrode and a reception electrode. In such a case, two insulators will be provided in correspondence to the respective electrodes.

In addition, the transceiver 2001 has an electric field detecting optical unit 2107 for optically detecting the electric fields received from the living body 9 through the insulator 2106 and the transmission and reception electrode 2105, and converting them into electric signals, and a signal processing circuit 2109 for carrying out processing such as a low noise amplification, a noise reduction, and a waveform shaping. These units constitute an electric field detection unit. This point that the electric field detection unit is formed by the electric field detecting optical unit and the signal processing circuit also applies to the other specific configurations to be described below.

The electric field detecting optical unit 2107 detects the electric fields by the electro-optic method using the laser lights and the electro-optic crystal, for example. In this case, the electric field detecting optical unit 2107 is formed by a laser diode that constitutes a laser light source, an electro-optic crystal such as $LiNbO_3$, $LiTaO_3$, etc., and it can be formed by using at leas an electro-optic element whose birefringence changes according to the received electric field strength, a wave plate for adjusting the polarization state of the laser light whose polarization state is changed as it passed through the electro-optic element, and a photo-diode for converting the intensity of the laser light that passed through the wave plate into the electric signal.

The signal processing circuit 2108 is connected to the electric field detecting optical unit 2107 on one side, and to the switch SW12 on the other side. In this switch SW12, terminals 12b and 12c are connected at the data reception time. In this case, the signal outputted from the signal processing circuit 2108 is demodulated at the demodulation circuit 2109, and applied with the waveform shaping at the waveform shaping circuit 2110. Then it reaches to the I/O circuit 2101 from which the data is sent to the wearable computer 7. On the other hand, at the data transmission time, terminals 12a and 12c are connected in the switch SW12 as shown in FIG. 23.

In addition, the transceiver 2001 in the first specific configuration also has an amplitude monitoring unit 2121 for extracting a difference between the signal outputted from the signal processing circuit 2108 and the internally generated reference signal, an integrator 2131 as a control signal generation unit for generating the control signal for controlling the reactance X of the variable reactance unit 2111 according to the output signal from the amplitude monitoring unit 2121.

The amplitude monitoring unit 2121 comprises by an envelope detector 2122 formed by using a diode, an electric resistor, etc., for detecting an amplitude of the signal from the signal processing circuit 2108, a filter 2123 for the output signal of the envelope detector 2122 by eliminating higher harmonic components from the output signal of the envelope detector 2122, a constant voltage source 2124 for generating a constant reference signal, a differential amplifier 2125 for obtaining a difference between the output signal of the filter 2123 and the reference signal, and amplifying this difference.

Here, it is assumed that the reference signal outputted from the constant voltage source 2124 is adjusted in advance to become equal to the amplitude of the signal outputted from the filter 2123 when the output voltage Vs of the transmission circuit 2102 and the voltage Vb applied to the living body 9 are equal.

The integrator 2131 generates the control signal for controlling the reactance X of the variable reactance unit 2111 by integrating the output signal from the filter 1125 of (the differential amplifier 2125 in) the amplitude monitoring unit 2121. More specifically, as a changed part due to the change of the parasitic capacitance Cg 43 appearing between the ground for transmission circuit 41 and the Earth ground 51 is compensated by the control signal to the variable reactance unit 2111, it is possible to maintain the series resonance of the reactance X and the parasitic capacitance Cg 43 appearing between the ground for transmission circuit 41 and the Earth ground 51 at the oscillation frequency f.

By using a configuration in which these amplitude monitoring unit 2121 and integrator 2131 form a negative feedback circuit at the data transmission time, there is provided a mechanism for controlling a value of the reactance X which is the characteristic possessed by the variable reactance unit 2111.

Note that the connections between terminals in the switches SW11 and SW12 are switched in coordination. FIG. 23 shows a configuration in which a control circuit 2141 for controlling this switching is connected to the I/O circuit 2101 such that the control signal is sent to each switch. In FIG. 23, positions indicated by encircled A are connected together by wirings. The control signal for the switching issued from the control circuit 2141 may be transmitted from the wearable computer 7 or may be transmitted from an input unit provided at the transceiver 2001, but it should be noted that the configuration of the switches and the control circuit is not necessarily limited to that described here.

Note also that the detailed configuration of the amplitude monitoring unit 2121 and the envelope detector 2122 to be provided therein is not necessarily limited to that shown in FIG. 23.

Next, the operation of the transceiver 2001 having the configuration as described above will be described.

Figure 30A:
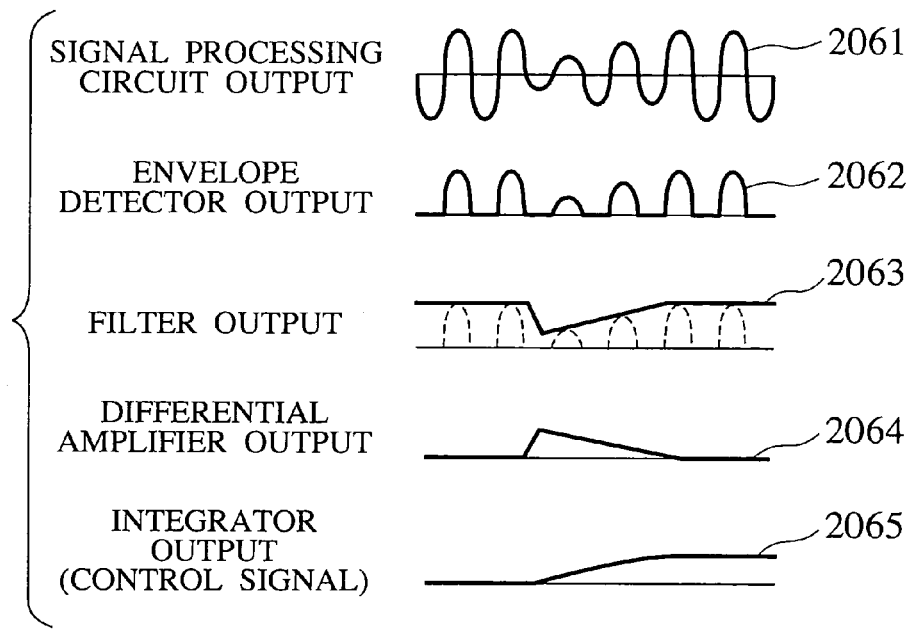
FIGS. 30A and 30B are diagrams showing signal waveforms of signals outputted from a signal processing circuit, individual constituent units of an amplitude monitoring unit and an integrator in a transceiver according to the third embodiment of the present invention.
Figure 30B:
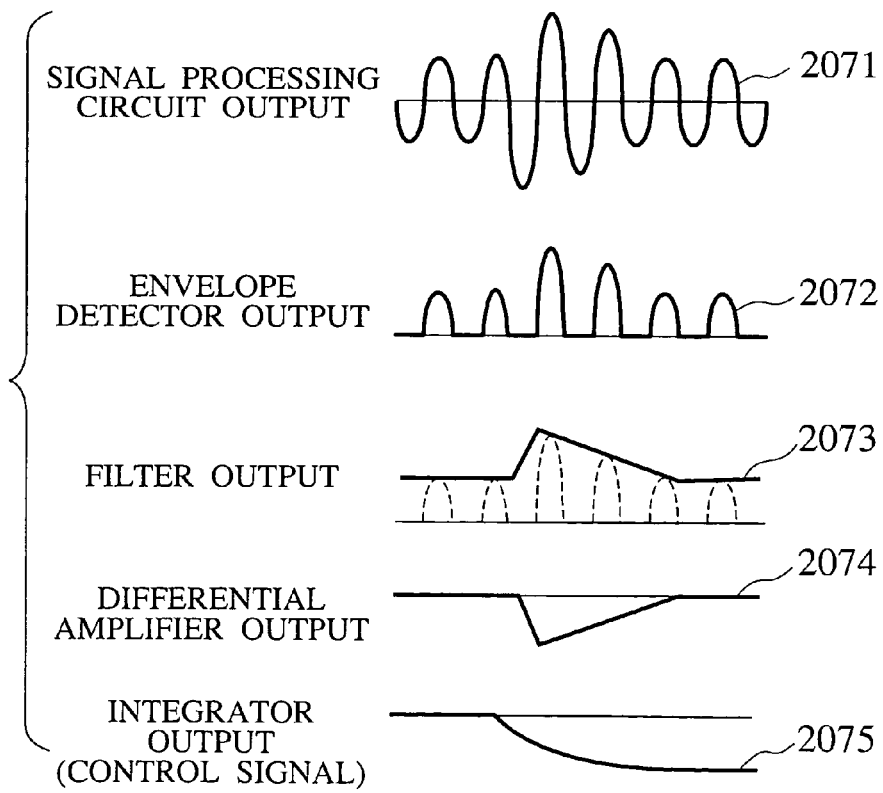

FIGS. 30A and 30B show exemplary signal waveforms outputted from each one of individual constituent units until the control signal is generated from the integrator 2131 according to the signal outputted from the signal processing circuit 2108.

FIG. 30A shows the signal waveforms outputted from individual constituent units in the case where the amplitude of the voltage Vb applied to the living body 9 becomes instantaneously small as the parasitic capacitance Cg 43 is changed (waveform 2061). In this case, only the components in a positive direction are extracted at the envelope detector 2122 (waveform 2062), and then the signal (waveform 2063) with the higher harmonic components smoothed at the filter 2123 is inputted into the differential amplifier 2125. The output signal of the filter 2123 is inputted into the differential amplifier 2125 as a negative input signal, so that the output signal (waveform 2064) from the differential amplifier 2125 obtained by extracting a difference with a constant signal from the constant voltage source 2124 is a signal waveform that makes a positive output at a timing where the amplitude of the voltage Vb becomes small.

At the integrator 2131, the control signal continues to increase (waveform 2065) until the output signal of the differential amplifier 2125 becomes zero, that is until the output voltage of the transmission circuit 2102 and the voltage applied to the living body 9 become equal, and as a result, the reactance X of the variable reactance unit 2111 is controlled to take an optimum value.

FIG. 30B shows the signal waveforms outputted from individual constituent units in the case where the amplitude of the voltage Vb applied to the living body 9 becomes instantaneously large as the parasitic capacitance Cg 43 is changed (waveform 2071). In this case, only the components in a positive direction are extracted at the envelope detector 2122 (waveform 2072), and then the signal (waveform 2073) with the higher harmonic components smoothed at the filter 2123 is inputted into the differential amplifier 2125. The output signal of the filter 2123 is inputted into the differential amplifier 2125 as a negative input signal, so that the output signal (waveform 2074) from the differential amplifier 2125 obtained by extracting a difference with a constant signal from the constant voltage source 2124 is a signal waveform that makes a negative output at a timing where the amplitude of the voltage Vb becomes large.

At the integrator 2131, the control signal continues to decrease (waveform 2075) until the output signal of the differential amplifier 2125 becomes zero, that is until the output voltage of the transmission circuit 2102 and the voltage applied to the living body 9 become equal, and as a result, the reactance X of the variable reactance unit 2111 is controlled to take an optimum value.

According to the first specific configuration described above, it suffices to detect only the amplitude value by the envelope detector provided in the amplitude monitoring unit, so that the signal delay does not cause any problem, and the required precision regarding the waveform distortion can be relaxed.

Consequently, by using such an asynchronous detection, it becomes possible to construct the transceiver by using relatively inexpensive components for the amplitude monitoring unit and the signal processing circuit.

Note that the scheme capable of executing the control using the asynchronous detection includes PSK (Phase Shift Keying), FSK (Frequency Shift Keying), etc., for example. This point also commonly applies to all the specific configurations of this embodiment.

It should be obvious that the transceiver 2001 according to this embodiment can be utilized in practice, in a similar way as the conventional transceiver described above with reference to FIG. 2. This point also commonly applies to all the specific configurations of this embodiment.

Next, the second specific configuration of the transceiver according to the third embodiment will be described.

The transceiver in the second specific configuration has a feature that the decrease of the voltage applied to the living body 9 is prevented by making the oscillation frequency f of the oscillator variable, while making the reactance X of the reactance unit provided between the transmission circuit and the transmission and reception electrode constant.

As should be apparent from the equation (2), the voltage Vb applied to the living body 9 that changes according to the change of the parasitic capacitance Cg 43 can also be set equal to the output voltage Vs from the transmission circuit by changing the oscillation frequency f of the oscillator that generates the alternating current signals, instead of making the reactance X of the reactance unit variable as in the first and second specific configurations described above.

Figure 24:
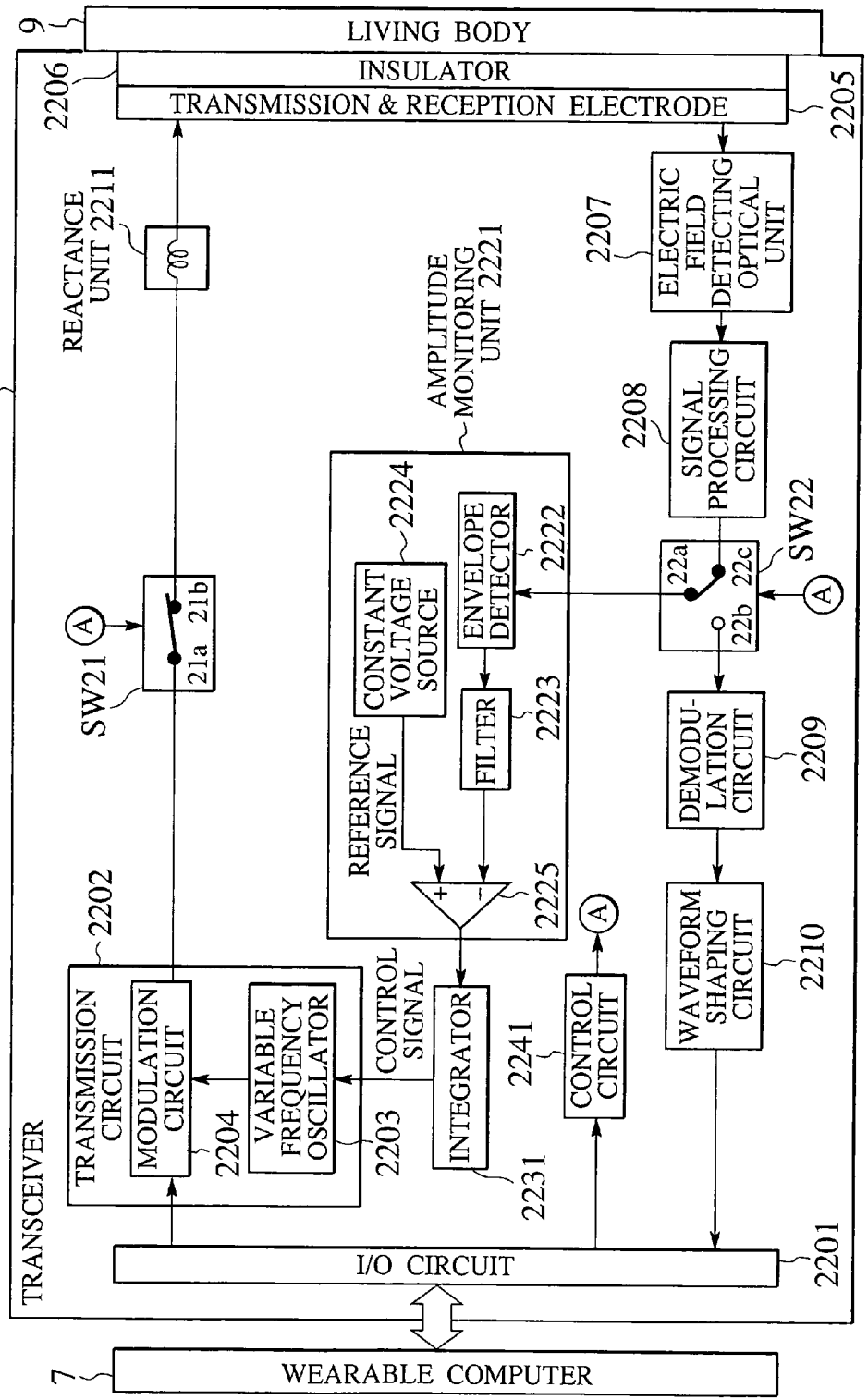
FIG. 24 is a block diagram showing a second specific configuration of a transceiver according to the third embodiment of the present invention at a data transmission time.

FIG. 24 shows the second specific configuration of the transceiver 2002 according to the third embodiment. In the transceiver 2002 of FIG. 24, a reactance unit 2211 having a constant reactance X is provided between the transmission circuit 2202 and the transmission and reception electrode 2205, while a variable frequency oscillator 2203 capable of changing the frequency of the alternating current signals to be generated is connected to the modulation circuit 2204.

Also, in the transceiver 2002 of FIG. 24, an integrator 2231 is provided between the amplitude monitoring unit 2221 and the variable frequency oscillator 2203 capable of changing the oscillation frequency f, and the oscillation frequency f of the alternating current signals generated from the variable frequency oscillator 2202 is controlled according to the control signal from this integrator 2231 while the reactance of the reactance unit 2211 takes a constant value, such that the change of the voltage applied to the living body 9 is prevented.

In the differential amplifier 2225, the reference signal that takes a constant value is inputted from the constant voltage source 2224, and a difference between this reference signal and the output signal from the filter 2223 is extracted and outputted to the integrator 2231.

Here, it is also assumed that the reference signal outputted from the constant voltage source 2124 is adjusted in advance to become equal to the amplitude of the signal outputted from the filter 2123 when the output voltage Vs of the transmission circuit 2102 and the voltage Vb applied to the living body 9 are equal.

The integrator 2231 generates the control signal for controlling the variable frequency oscillator 2203, by integrating the output signal of the amplitude monitoring unit 2221. These amplitude monitoring unit 2221 and the integrator 2231 constitute the control mechanism.

As a result, when the amplitude of the voltage Vb applied to the living body 9 is changed due to the change of the parasitic capacitance 43, the signal waveforms at individual constituent units until the control signal is outputted from the integrator 2231 to the variable frequency oscillator 2203, which pass through individual constituent units of the amplitude monitoring unit 2221 according to the signal outputted from the signal processing unit 2208, are essentially the same as those shown in FIGS. 30A and 30B. In this second specific configuration, however, the control signal generated by the integrator 2231 is outputted to the variable frequency oscillator 2203 such that a frequency is changed to the frequency f in which the series resonance with the reactance unit 2211 occurs.

The connection states of the switches at the data transmission time shown in FIG. 24 are such that terminals 21a and 21b are connected in the switch SW21 and terminals 22a and 22c are connected in the switch SW22.

Although not shown in the figure, the connection states at the data reception time are such that the connection between terminals 21a and 21b is disconnected in the switch SW21 while the connection in the switch SW22 is switched to the connection between terminals 22b and 22c. The switching of these two switches is carried out through the switching control signal from the control circuit 2241, similarly as in the first specific configuration described above.

The configuration and the operation of the remaining portion of the transceiver 2002 are the same as the corresponding portion in the first specific configuration.

It should be obvious that this second specific configuration has the same effects as the first specific configuration described above.

Next, the third specific configuration of the transceiver according to the third embodiment will be described.

The transceiver in the third specific configuration has a feature of having a function for automatically adjusting the reference signal outputted from the constant voltage source provided, in the amplitude monitoring unit.

Figure 25:
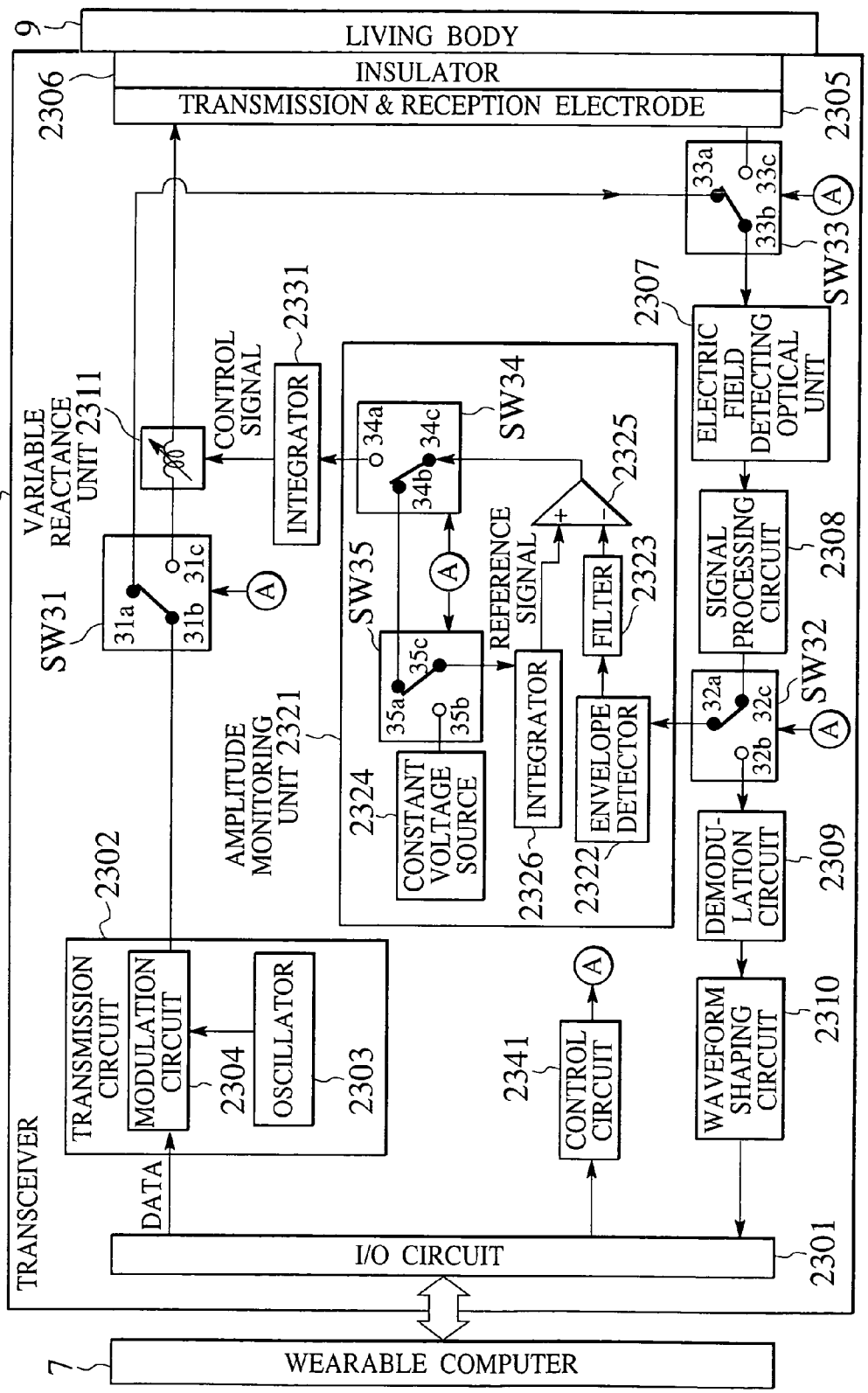
FIG. 25 is a block diagram showing a third specific configuration of a transceiver according to the third embodiment of the present invention at a reference signal adjustment time.

FIG. 25 shows the third specific configuration of the transceiver 2003 according to the third embodiment at a time of the reference signal adjustment. The transceiver 2003 of FIG. 25 is similar to that of FIG. 23 except that a detailed configuration of the amplitude monitoring unit 2321 is modified, that a wiring for directly connecting the modulation circuit 2304 and the electric field detecting optical unit 2307 without passing through the variable reactance unit 2311 at a time of the reference signal adjustment is provided, and that a new switch SW33 is provided on this wiring. Namely, at a time of the reference signal adjustment, a terminal 33a and a terminal 33b of the switch SW33 are connected such that the modulation circuit 2304 and the electric field detecting optical unit 2307 are directly connected, such that the output voltage Vs of the modulation circuit 2304 can be applied to the electric field detecting optical unit 2307 without any attenuation.

By using the size of the electric signal outputted from the filter 2323 in this case, the reactance value can be controlled such that the output voltage Vs of the modulation circuit 2304 and the voltage Vb applied to the living body 9 become equal at a time of controlling the reactance value of the variable reactance unit 2311. At this reference signal adjustment time, terminals 31a and 31b are connected in the switch SW31, and terminals 32a and 32c are connected in the switch SW32.

In addition to the envelope detector 2322, the filter 2323, the constant voltage source 2324 and the differential amplifier 2325, the amplitude monitoring unit 2321 has a switch SW34 provided between the differential amplifier 2325 and the integrator 2331, a switch W35 provided between the switch SW34 and the constant voltage source 2324, and an integrator 2326 provided between the switch SW35 and the differential amplifier 2325.

Two switches SW34 and SW35 provided in the amplitude monitoring unit 2321 constitute the fourth connection. At a time of the reference signal adjustment shown in FIG. 25, terminals 34b and 34c are connected in the switch SW34 and terminals 35a and 35c are connected in the switch SW35. As a result, the output signal from the differential amplifier 2325 is integrated at the integrator 2326. Then, the control signal that becomes equal to the output signal from the filter 2323 is outputted from the integrator 2326, such that the adjustment to eventually make the output signal from the differential amplifier 2325 equal to zero is carried out.

Next, the operation at the data transmission or reception time after the reference signal adjustment will be described.

Figure 26:
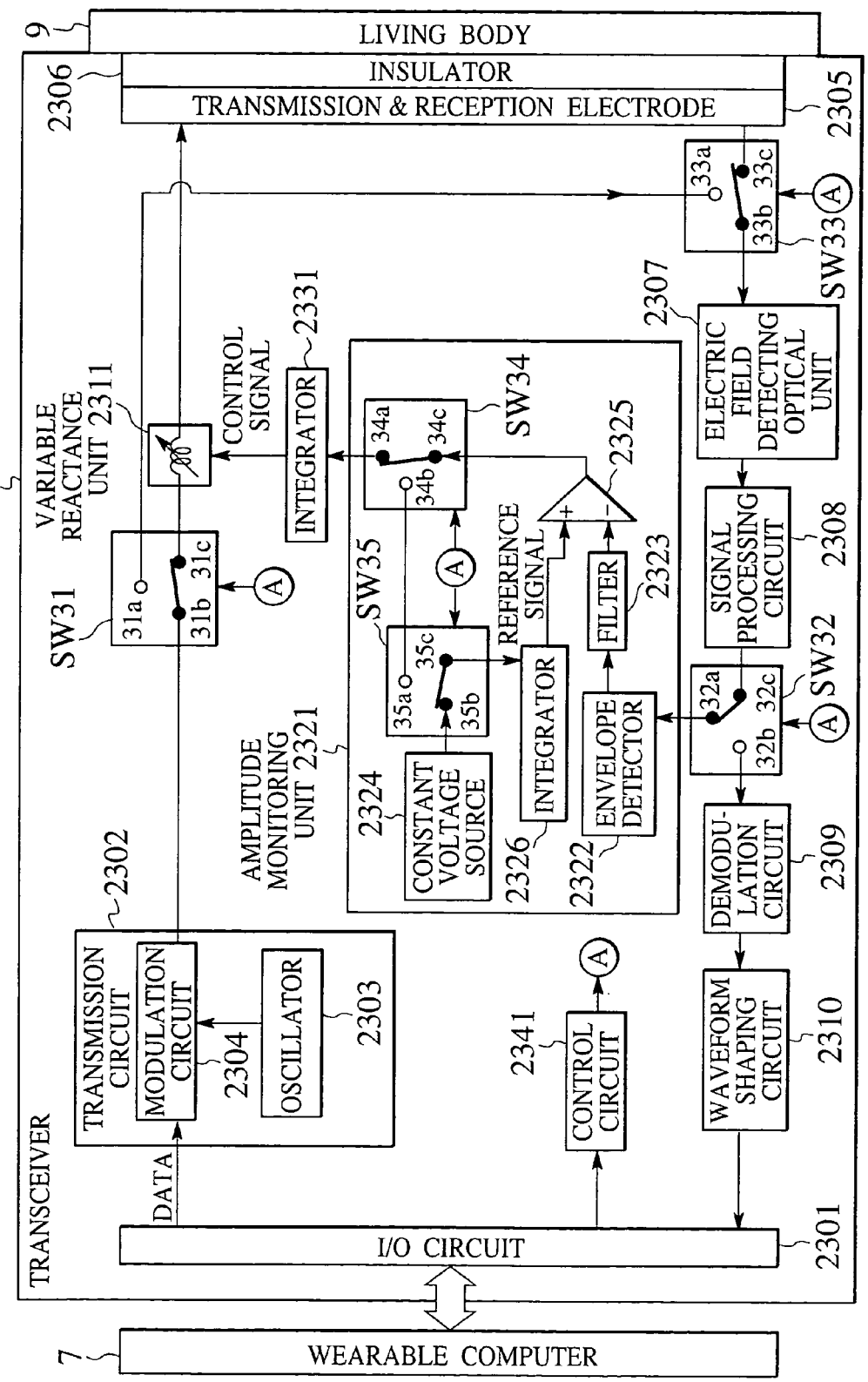
FIG. 26 is a block diagram showing a third specific configuration of a transceiver according to the third embodiment of the present invention at a data transmission time.

FIG. 26 shows the connection states of the switches at the data transmission time after the reference signal adjustment. As shown in FIG. 26, in the switch SW31, terminals 31b and 31c are connected such that the output from the transmission circuit 2302 is applied to the living body 9 through the variable reactance unit 2311. The switch SW32 is connected to the amplitude monitoring unit 2321 side by connecting terminals 32a and 32c, similarly as the reference signal adjustment time, to form a negative feedback circuit. The switch SW33 is connected to the transmission and reception electrode 2305 side by connecting terminals 33b and 33c in order to receive signals from the living body 9. The switch SW34 is connected to the integrator 2331 side by connecting terminals 34a and 34c in order to control the reactance X of the variable reactance unit 2311 by integrating the output signal from the differential amplifier 2325. The switch SW35 connects the integrator 2326 and the constant voltage source 2324 by connecting terminals 35b and 35c in order to maintain the reference signal at the adjusted value.

Then, when the amplitude of the voltage Vb applied to the living body 9 is changed due to the change of the parasitic capacitance 43, the change of the voltage applied to the living body 9 is prevented as the reactance X which is the characteristic of the variable reactance unit 2311 is controlled by the control signal from the integrator 2331. In this case, the signal waveforms outputted from individual constituent units from the signal processing circuit 2308 through the amplitude monitoring unit 2321 to the integrator 2331 are essentially the same as those shown in FIGS. 30A and 30B.

Figure 27:
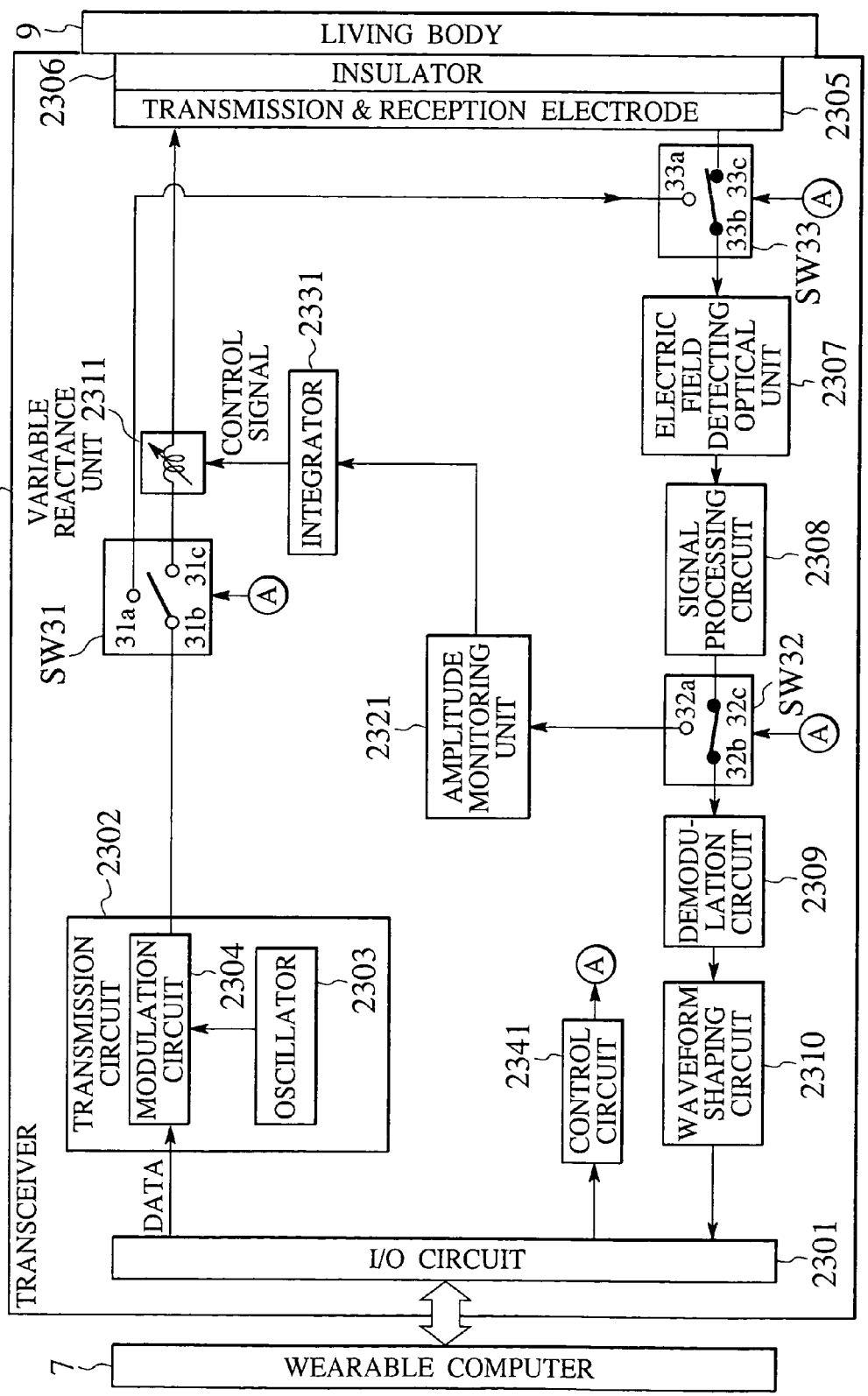
FIG. 27 is a block diagram showing a third specific configuration of a transceiver according to the third embodiment of the present invention at a data reception time.

FIG. 27 shows the connection states of the switches at the data reception time after the reference signal adjustment. As shown in FIG. 27, the connection between terminals in the switch SW31 is disconnected in order to prevent the back flow to the transmission circuit 2302. In the switch SW32, terminals 32b and 32c are connected such that the signal outputted from the signal processing circuit 2308 is transmitted to the demodulation circuit 2309. At the data reception time, the amplitude monitoring unit 2321 is meaningless from a viewpoint of the circuit so that the connections in the switches SW34 and SW35 are arbitrary.

Note that the connections of the switches are switched in coordination by the switching control signal from the control circuit 2341 depending on whether it is the reference signal adjustment time, the data transmission time or the data reception time, similarly as in the first and second specific configurations described above.

The configuration and the operation of the remaining portion of the transceiver 2003 are the same as the corresponding portion in the first and second specific configurations described above.

It should be obvious that this third specific configuration has the same effects as the first and second specific configuration described above. In addition, in the third specific configuration, the optimum reference signal according to the situation is set by automatically adjusting the reference signal by using the integrator 2326 provided in the amplitude monitoring unit 2321, so that it is possible carry out the more stable application of the voltage to the living body 9.

Next, the fourth specific configuration of the transceiver according to the third embodiment will be described.

The transceiver in the fourth specific configuration has a feature of making the oscillation frequency f of the alternating current signals outputted from the oscillator provided in the transmission circuit variable, while making the reactance X of the reactance unit provided constant, and having a function for automatically adjusting the reference signal outputted from the constant voltage source provided in the amplitude monitoring unit.

Figure 28:
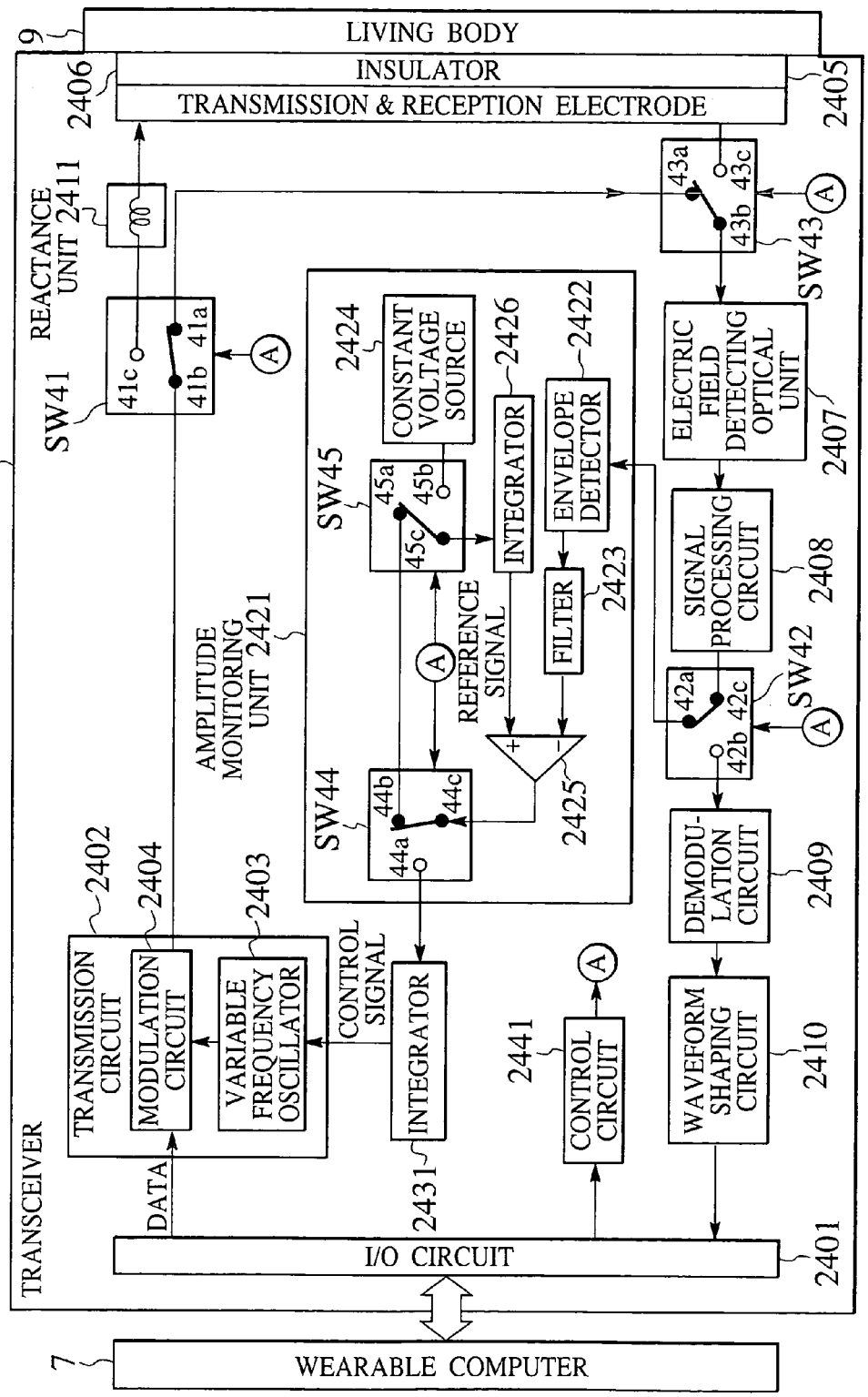
FIG. 28 is a block diagram showing a fourth specific configuration of a transceiver according to the third embodiment of the present invention at a reference signal adjustment time.

FIG. 28 shows the fourth specific configuration of the transceiver 2004 according to the third embodiment at a time of the reference signal adjustment. In the transceiver 2004 of FIG. 28, a detailed configuration of the amplitude monitoring unit 2421 and the feature of providing a wiring for directly connecting the transmission circuit 2402 and the electric field detecting optical unit 2407 without passing through the variable reactance unit 2411 are the same as in the third specific configuration.

Similarly as in the above described specific configurations, the connection states of the switches which are switched by the control circuit 2441 will be described. Terminals 41a and 41b are connected in the switch SW41 while terminals 43a and 43b are connected in the switch SW43 such that the output signal from the transmission circuit 2402 is outputted directly to the electric field detecting optical unit 2407 without passing through the reactance unit 2411. In the switch SW42, terminals 42a and 42c are connected in order to send the output from the signal processing circuit 2408 to the amplitude monitoring unit 2421. In the switches SW44 and SW45, terminals 44b and 44c are connected and terminals 45a and 45c are connected in order to output the output from the differential amplifier 2425 to the integrator 2426.

By these connections, the reference signal is adjusted as the control signal for making the output signal from the differential amplifier 2425 zero is outputted from the integrator 2425.

Figure 29:
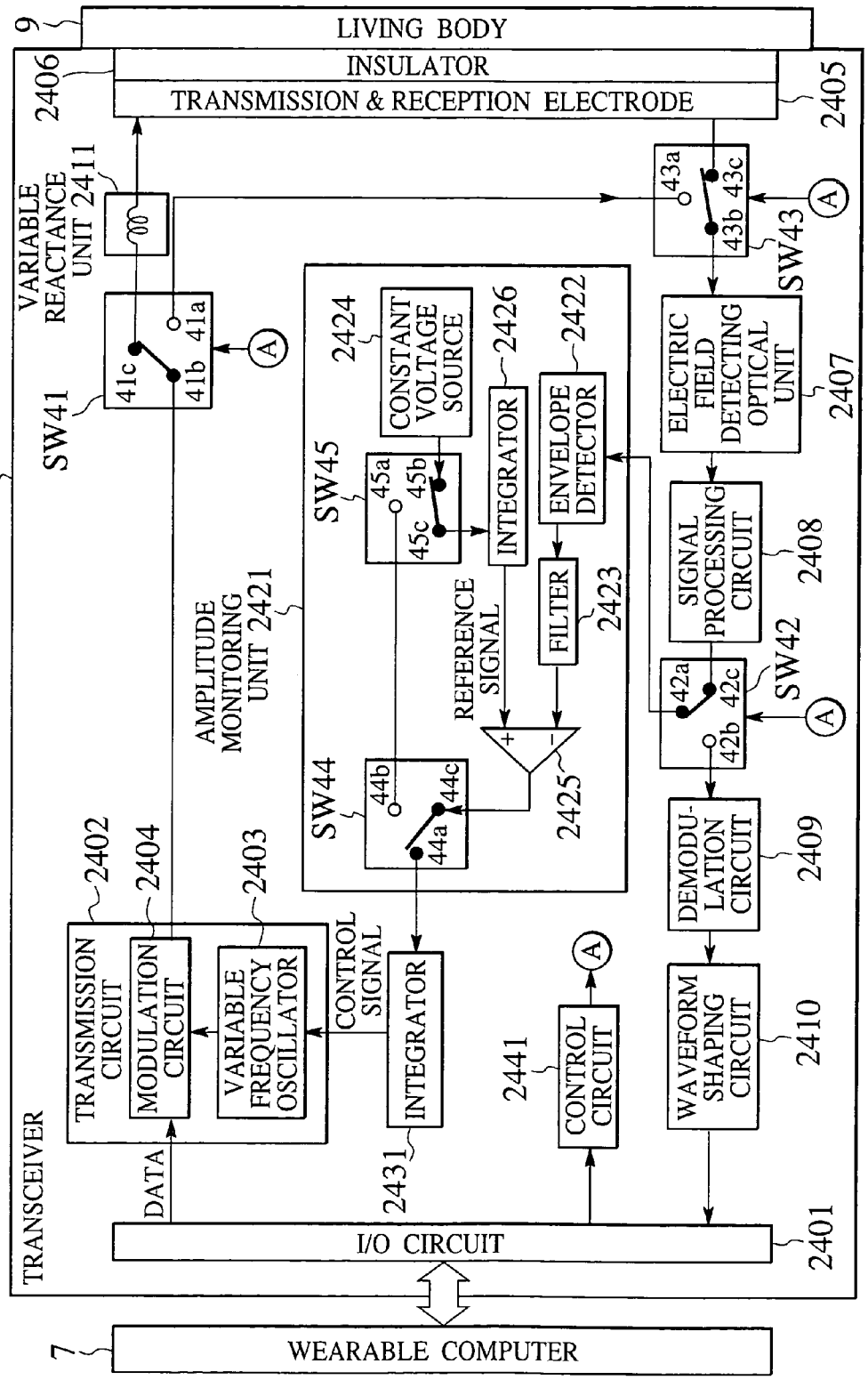
FIG. 29 is a block diagram showing a fourth specific configuration of a transceiver according to the third embodiment of the present invention at a data transmission time.

FIG. 29 shows the connection states of the switches at the data transmission time after the reference signal adjustment. As shown in FIG. 29, in the switch SW41, terminals 41b and 41c are connected such that the output from the transmission circuit 2402 is transmitted to the reactance unit 2411. In the switch SW42, terminals 42a and 42c are connected similarly as the reference signal adjustment time. In the switch SW43, terminals 43b and 43c are connected in order to receive signals from the transmission and reception electrode 2405. In the switch SW44, terminals 44a and 44c are connected in order to send the output from the differential amplifier 2425 to the integrator 2431. The switch SW35 connects the integrator 2426 and the constant voltage source 2424 by connecting terminals 45b and 45c in order to maintain the reference signal at the adjusted value.

Then, the change of the voltage applied to the living body 9 is prevented as the oscillation frequency f of the alternating current signals outputted from the variable frequency oscillator 2403 is controlled by the control signal from the integrator 2431 that is provided between the amplitude monitoring unit 2421 and the variable frequency oscillator 2403 capable of changing the oscillation frequency f, while the reactance of the reactance unit 2411 takes a constant value.

In this fourth specific configuration, when the instantaneous value of the voltage Vb applied to the living body 9 changes as the parasitic capacitance 43 changes, the signal waveforms outputted from individual constituent units from the signal processing circuit 2408 through the amplitude monitoring unit 2421 to the integrator 2431 are essentially the same as those shown in FIGS. 30A and 30B.

At the data reception time, the connection between terminals in the switch SW41 is disconnected in order to prevent the back flow, similarly as in the specific configurations described above. At the data reception time, in the switches SW42 and SW43, terminals 42b and 42c are connected and terminals 43b and 43 are connected in order to transmit the electric signals converted from the electric fields induced in the living body 9 to the wearable computer 7 as the received data. In this case, the amplitude monitoring unit 2421 is meaningless from a viewpoint of the circuit so that the connections in the switches SW44 and SW45 are arbitrary.

The configuration and the operation of the remaining portion of the transceiver 2004 are the same as the corresponding portion in the first to third specific configurations described above.

It should be obvious that this fourth specific configuration has the same effects as the first to third specific configuration described above, especially the third specific configuration.

Note that it is possible to provide an amplifier for amplifying the signal outputted from the signal processing circuit in the amplitude monitoring unit of the first to fourth specific configurations described above, and output the signal amplified by this amplifier to the envelope detector, for example the amplification (gain) of this amplifier can be adjusted in advance, but it is also possible to make this amplification of the amplifier variable, and add a function for automatically adjusting the amplification to the transceiver.

It is also possible to form the electric field detecting optical unit provided in the transceiver by using two electrode plates that are connected to become a short-circuit by a lead wire, laser lights and the magneto-optic crystal.

Note that the third embodiment has been described above for an exemplary case of using the living body as the electric field propagating medium, but the electric field propagating medium for generating and propagating the electric fields according to the data at a time of the transmission or the reception by the transceiver according to the second embodiment is not necessarily limited to the living body.

According to the third embodiment described above, it is possible to provide a transceiver capable of preventing the decrease of the voltage applied to the electric field propagating medium and thereby maintaining the good communication quality, that can be realized inexpensively.

As a consequence, this transceiver can make the realization of the wearable computer more plausible.

Referring now to FIG. 31 to FIG. 42, the fourth embodiment of a transceiver according to the present invention will be described in detail.

This fourth embodiment provides a transceiver capable of preventing the decrease of the voltage applied to the electric field propagating medium and thereby maintaining the good communication quality.

FIG. 31 shows a configuration of a main part of a transceiver according to the fourth embodiment. Note that FIG. 31 only shows a configuration common to all implementations of the transceiver according to the fourth embodiment, and further detailed configurations of the entire transceiver in various implementations will be described below.

The transceiver shown in FIG. 31 has at least an I/O circuit 11 for outputting data received from the wearable computer 7 while receiving received signals, a transmission circuit 13 for transmitting data outputted from the I/O circuit 11 by modulating data, a transmission and reception electrode 21 formed by a conductive material for inducing electric fields in the living body 9 which is an example of an electric field propagating medium, and an insulator 23 provided between the transmission and reception electrode 21 and the living body 9 for preventing currents to flow through the living body 9 and eliminating a possibility of the metal allergy by the living body 9 due to the transmission and reception electrode 21.

Here, the transmission circuit 13 comprises an oscillator 17 for generating alternate current signals of a prescribed frequency, a modulation circuit 15 for modulating signals from the I/O circuit 11 by using the alternate current signals generated by the oscillator 17 as carriers, and an output resistance 18 which takes a value Rs from a viewpoint of the transmission and reception electrode 21.

One of the features of the transceiver according to this embodiment is that a reactance unit 19 which causes resonance is inserted between the transmission circuit 13 and the transmission and reception electrode 21. Note that the "reactance unit" here indicates a circuit network formed by connecting a plurality of circuit elements such as inductors (coils), capacitors and so on, which can be formed only by an inductor in the simplest case.

Next, the operation of the transceiver according to this embodiment will be described. The data transmitted from the wearable computer 7 and outputted from the I/O circuit 11 modulates the alternating current signals generated by the oscillator 17 as carriers in the modulation circuit 15 and supplied to the transmission and reception electrode 21 through the reactance unit 19, and propagated as the electric fields induced in the living body 9 through the insulator 23.

Since the reactance unit 19, the parasitic capacitance Cg 43 appearing between the Earth ground 51 and the ground for transmission circuit 41, and the parasitic capacitance Cb 53 appearing between the living body 9 and the Earth ground 51 are connected in series from a viewpoint of the modulation circuit 15, by denoting an output voltage of the modulation circuit 15 as Vs, a reactance of the reactance unit 19 which is an imaginary component of the impedance of the reactance unit 19 as X, and an oscillation frequency of the oscillator 17 as f($=(2\pi)^{-1}\omega$, where $\pi$ is a circumferential ratio and $\omega$ is an angular frequency of the applied voltage), a voltage Vb applied to the living body 9 can be expressed by the following equation (16):

$$Vb = Vs \cdot \frac{\frac{1}{j(2\pi f)Cb}}{\frac{1}{j(2\pi f)Cb} + \frac{1}{j(2\pi f)Cg} + jX + Rs} = \quad (16)$$

$$Vs \cdot \frac{\frac{Cg}{Cb}}{\frac{Cg}{Cb} + 1 - 2\pi fXCg + j(2\pi f)RsCg}$$

In the case where $(Cg/Cb) > 2\pi fXCg$ in this equation (16), when the relationship expressed by:

$$2\pi fXCg = \frac{Cg}{Cb} + 1 \qquad (17)$$

is satisfied, the absolute value (voltage amplitude) of the voltage Vb applied to the living body 9 takes the maximum value expressed by the following equation (18).

$$|Vb|\max = \left|\frac{Vs}{2\pi fRsCb}\right| \qquad (18)$$

This maximum value |vb|max changes according to the change of the parasitic capacitance Cb, but it becomes larger than |Vs| if $1 > |2\pi fRsCb|$. Consequently, in the case where the parasitic capacitance Cb is small and its change is gentle, by adjusting the reactance X or the oscillation frequency f such that the relationship of the equation (17) is satisfied, it is possible to improve a communication quality, i.e., it is possible to prevent the decrease of the voltage applied to the living body 9. Here, the "case where the change of the parasitic capacitance is gentle" implies the case where a rough frequency of the change of the parasitic capacitance is sufficiently smaller than the frequency of the data to be transmitted or received, such that it is possible to discriminate them, for example.

Figure 32:
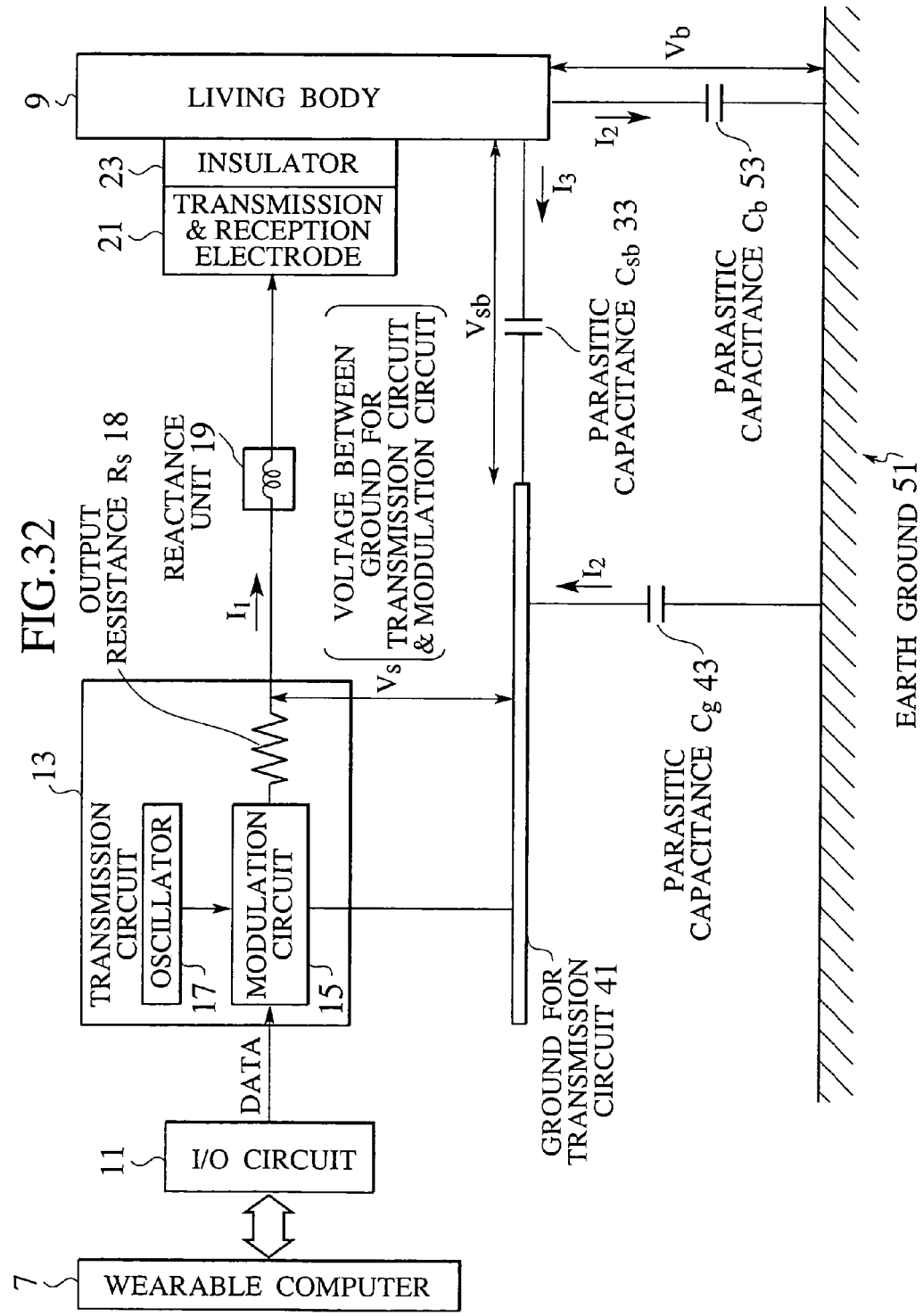
FIG. 32 is a schematic block diagram showing a~basic configuration of a transceiver according to the fourth embodiment of the present invention in further detail.

In further detail, as shown in FIG. 32, since the reactance unit 19, the parasitic capacitance Cg 43 and the parasitic capacitance Cb 53 appearing between the living body 9 and the Earth ground 51 are connected in series from a viewpoint of the modulation circuit 15, by denoting a voltage applied to the living body 9 as Vb, an output voltage of the modulation circuit 15 as Vs, a reactance of the reactance unit 19 which is an imaginary component of the impedance of the reactance unit 19 as X, a current flowing through the reactance unit 19 as I1 and a current flowing through the parasitic capacitance Cb 53 as I2, the relationship of the following equation (19) holds.

$$Vs = (Rs + jX)I1 + Vb + \frac{1}{j\omega Cg}I2 \qquad (19)$$

Because the current $I2 = j\omega CbVb$, by substituting it into the equation (19), the relationship of the following equation (20) can be obtained.

$$Vs = (Rs + jX)I1 + Vb + \frac{j\omega Cb}{j\omega Cg}Vb = (Rs + jX)I1 + \left(1 + \frac{Cb}{Cg}\right)Vb \qquad (20)$$

Also, because the total voltage applied to the parasitic capacitance Cg 43 and the parasitic capacitance Cb 53 is equal to the voltage applied to the parasitic capacitance Csb 33 between the ground for transmission circuit 41 and the living body 9, by denoting a current flowing through the parasitic capacitance Csb 33 as I3, the relationship of the following equations (21) and (22) can be obtained.

$$\frac{1}{j\omega Csb}I3 = \left(\frac{1}{j\omega Cb} + \frac{1}{j\omega Cg}\right)I2 \qquad (21)$$

$$\frac{1}{Csb}I3 = \left(\frac{1}{Cb} + \frac{1}{Cg}\right)I2 \qquad (22)$$

Also, because the current I1 is equal to the total of the currents I2 and I3, the current I1 can be expressed by the following equation (23).

$$\begin{aligned} I1 &= I2 + I3 \\ &= I2 + Csb\left(\frac{1}{Cb} + \frac{1}{Cg}\right)I2 \\ &= j\omega CbVb\left(1 + Csb\left(\frac{1}{Cb} + \frac{1}{Cg}\right)\right) \end{aligned} \qquad (23)$$

By substituting the equation (23) into the equation (20), the relationship of the following equation (24) can be obtained.

$$Vs = (j\omega RsCb - X\omega Cb)Vb\left(1 + Csb\left(\frac{1}{Cb} + \frac{1}{Cg}\right)\right) + \left(1 + \frac{Cb}{Cg}\right)Vb \qquad (24)$$

From this equation (24), the voltage Vb applied to the living body 9 can be expressed by the following equation (25).

$$Vb = \frac{1}{1 + \frac{Cb}{Cg} - \omega XCb\left(1 + Csb\left(\frac{1}{Cb} + \frac{1}{Cg}\right)\right) + j\omega RsCb\left(1 + Csb\left(\frac{1}{Cb} + \frac{1}{Cg}\right)\right)}Vs \qquad (25)$$

$$= \frac{\frac{Cg}{Cb}}{\frac{Cg}{Cb} + 1 - \omega XCg\left(1 + Csb\left(\frac{1}{Cb} + \frac{1}{Cg}\right)\right) + j\omega RsCg\left(1 + Csb\left(\frac{1}{Cb} + \frac{1}{Cg}\right)\right)}Vs$$

From this equation (25), in the case where $Cg/Cb > \omega RsCg\{1+Csb[(1/Cb)+(1/Cg)]\}$, the voltage Vb applied to the living body 9 takes the maximum value when the relationship expressed by the following equation (26) is satisfied.

$$1 + \frac{Cg}{Cb} = \omega X Cg \left(1 + Csb\left(\frac{1}{Cb} + \frac{1}{Cg}\right)\right) \quad (26)$$
$$= 2\pi f X Cg \left(1 + Csb\left(\frac{1}{Cb} + \frac{1}{Cg}\right)\right)$$

The absolute value (amplitude) of the maximum value in that case is given by the following equation (27).

$$|Vb|\max = \left|\frac{Vs}{2\pi f R s C b}\right| \quad (27)$$

This maximum value |vb|max changes according to the change of the parasitic capacitance Cb, but it becomes larger than |Vs| if $1 > |2\pi f RsCb|$. Consequently, in the case where the parasitic capacitance Cb is small and its change is gentle, by adjusting the reactance X or the oscillation frequency f such that the relationship of the equation (26) is satisfied, it is possible to improve a communication quality, i.e., it is possible to prevent the decrease of the voltage applied to the living body 9. Here, the "case where the change of the parasitic capacitance is gentle" implies the case where a rough frequency of the change of the parasitic capacitance is sufficiently smaller than the frequency of the data to be transmitted or received, such that it is possible to discriminate them, for example.

By making the oscillation frequency f or the reactance X variable in the basic configuration according to this embodiment as described above, it becomes possible to carry out the appropriate control such that the series resonance of the reactance unit 19 and the parasitic capacitances Cg and Cb occurs, and thereby improve the communication quality by preventing the decrease of the voltage applied to the living body 9.

Next, the first specific configuration of the transceiver according to the fourth embodiment will be described.

Figure 33:
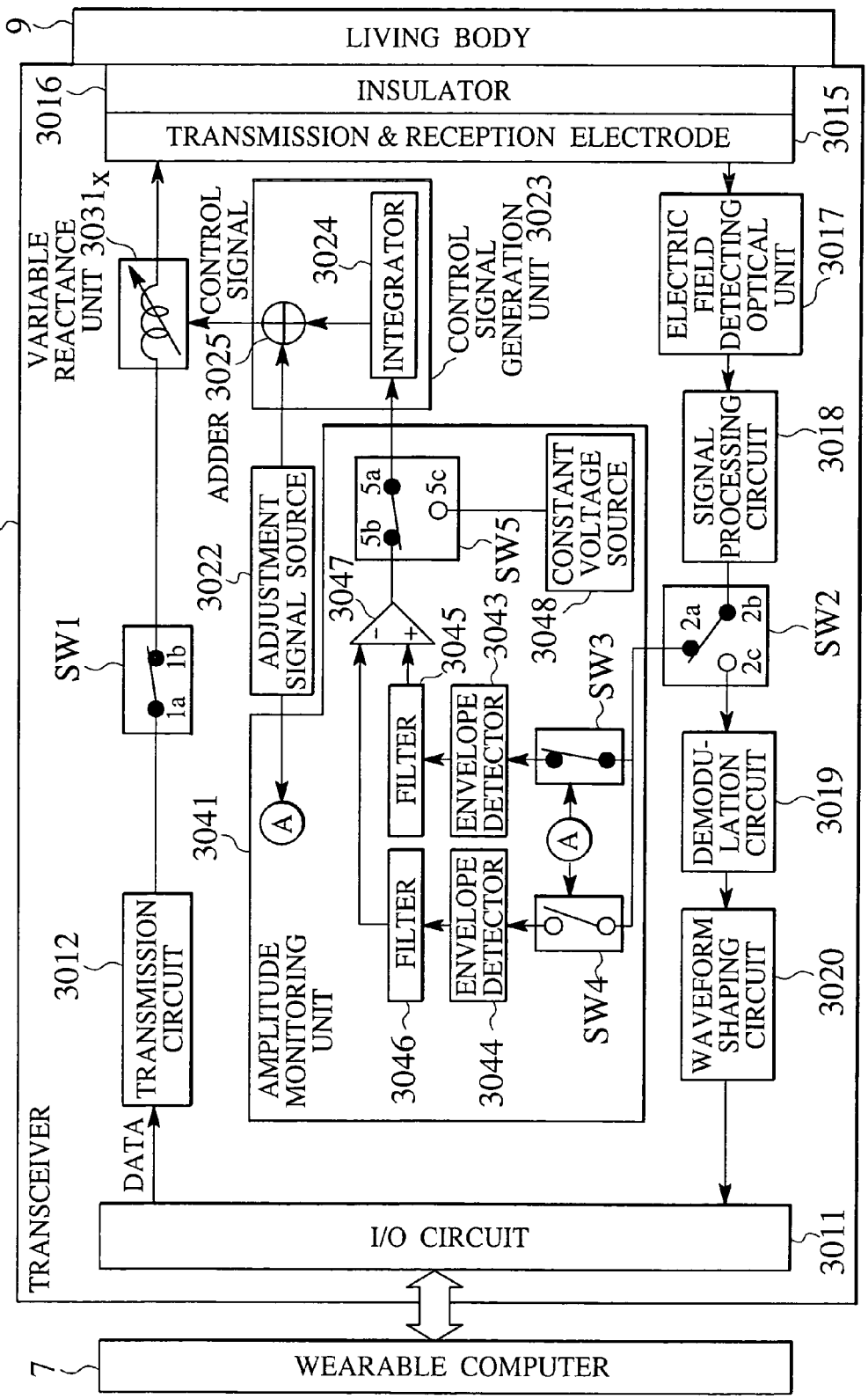
FIG. 33 is a block diagram showing a first specific configuration of a transceiver according to the fourth embodiment of the present invention at a reactance adjustment time.

FIG. 33 shows the first specific configuration of the transceiver according to the fourth embodiment. In the transceiver 3001 of FIG. 33, the I/O circuit 3011, the transmission circuit 3012 (formed by the oscillator, the modulation circuit and the output resistance similarly as in FIG. 31), the transmission and reception electrode 3015 and the insulator 3016 have the same functions as the corresponding elements described above with reference to FIG. 31. Note that it is also possible to divide the transmission and reception electrode into a transmission electrode and a reception electrode. In such a case, two insulators will be provided in correspondence to the respective electrodes. Also, the frequency of the alternating current signals generated from the oscillator in the transmission circuit 3012 is expected to take a value in a range of about 10 kHz to 100 MHz, and it is more preferable to take a value of about 10 MHz, where 1 kHz=$10^3$ Hz and 1 MHz=$10^6$ Hz.

The reactance unit for causing resonance that is provided in the transceiver 3001 is a variable reactance unit 3031x which can change the reactance in order to maintain the series resonance with the parasitic capacitances Cg and Cb at the constant oscillation frequency. FIG. 33 shows the configuration of the transceiver 3001 in the case of adjusting the reactance of this variable reactance unit 3031x (at the reactance adjustment time).

Between the variable reactance unit 3031x and the transmission circuit 3012, a switch SW1 for preventing the introduction of signals to the transmission side circuits at a time of the data reception through the living body 9, In the reactance adjustment time shown in FIG. 33, the switch SW1 has two terminals 1*a* and 1*b* connected together.

In addition, the transceiver 3001 has an electric field detecting optical unit 3017 for receiving the electric fields induced in the living body 9, optically detecting these electric fields, and converting them into electric signals, and a signal processing circuit 3018 for carrying out processing such as a low noise amplification, a noise reduction, and a waveform shaping. These units constitute an electric field detection unit.

The electric field detecting optical unit 3017 detects the electric fields by the electro-optic method using the laser lights and the electro-optic crystal, and at least has a laser diode (not shown) that constitutes a laser light source and an electro-optic element (not shown) formed by the electro-optic crystal such as $LiNbO_3$, $LiTaO_3$, etc. This electro-optic element can be such that it has a sensitivity only for the electric field component in a direction perpendicular to a propagation direction of the laser light emitted from the laser diode, and it has its optical characteristics, i.e. its birefringence, changed by the electric field strength such that the polarization of the laser light is changed by the change of the birefringence. The polarization change may also contain the polarization change due to the inverse piezo-electric effect by which the electro-optic crystal of the electro-optic element is distorted by the electric fields, in some cases.

The laser light with its polarization changed as it passes through such an electro-optic element is subjected to an adjustment of the polarization state by using a wave plate, and then injected into a polarization beam splitter such that it is separated into P wave and S wave such that it is converted into the light intensity change. The separated laser lights are collimated by a collimator (condenser lens), and then supplied to two photo-diodes respectively provided in order to convert lights into electric signals. Then, a difference between them is amplified by a differential amplifier and outputted as an electric signal related to the received electric field, for example.

Note that the configuration and the operation of the electric field detecting optical unit 3017 described above are only an example, and it is not necessary true that the electric field detecting optical unit used in the transceiver 3001 according to this embodiment can have the special effects only in this exemplary case. The same remark also applies to the other specific configurations to be described below.

In the transceiver 3001, the signal outputted from the signal processing circuit 3018 are sent to different circuits according to the connection state of a switch SW2 which is provided next to the signal processing circuit 3018. In the case of the reactance adjustment time shown in FIG. 33, a terminal 2*a* and a terminal 2*b* among three terminals of the switch SW2 are connected together, so that the output signal from the signal processing circuit 3018 are sent to an amplitude monitoring unit 3041 for monitoring the output signal and detecting the amplitude of the output signal.

At the amplitude monitoring unit 3041, the signal obtained according to the output signal of the signal processing circuit 3018 an the adjustment signal outputted from the adjustment signal source 3022 is outputted to the control signal generation unit 3023 which generates the control signal for controlling the reactance X that is a characteristic possessed by the variable reactance unit 3031x.

Next, the detailed configuration of the amplitude monitoring unit 3041 will be described. In the amplitude monitoring unit 3041, the adjustment signal outputted from the adjustment signal source 3022 can be transmitted to two switches SW3 and SW4.

Each of the switches SW3 and SW4 is formed by two terminals (3a and 3b, 4a and 4b respectively), and they are controlled such that when terminals are connected in one of them terminals in the other one of them are disconnected, and the connection time by which terminals are connected is the same for both switches. These switches SW3 and SW4 are respectively connected to envelope detectors 3043 and 3044 formed by diodes, etc. In this sense, FIG. 33 only depicts a state at one moment in the reactance adjustment time, such that terminals are connected in the switch SW4 while terminals are disconnected in the switch SW3 at another moment. These two switches SW3 and SW4 constitute the third connection as a whole.

The envelope detectors 3043 and 3044 are respectively connected to filters 3045 and 3046 for eliminating higher harmonic components. Then, the outputs from these two filters are outputted to the differential amplifier 3047 where a difference between these outputs is obtained.

Between the differential amplifier 3047 and the control signal generation unit 3023, a switch SW5 having three terminals is provided, where the output signal from the differential amplifier 3047 is outputted to the control signal generation unit 3023 when terminals 5a and 5b are connected.

The control signal generation unit 3023 has an integrator 3024 for outputting the signal obtained by integrating the output signal of the amplitude monitoring unit 3041, and an adder 3025 for adding the signal outputted from this integrator 3024 and the adjustment signal generated from the adjustment signal source 3022, and outputting the obtained signal. At this control signal generation unit 3023, the signal obtained by integrating the output signal of the amplitude monitoring unit 3041 at the integrator 3024 and adding the adjustment signal outputted from the adjustment signal source 3022 as the control signal. By adding the adjustment signal in this way, the control signal of nearly constant size for periodically causing only minute changes will be outputted to the variable reactance unit 3031x after the voltage amplitude has reached the maximum value |vb|max.

Figure 34:
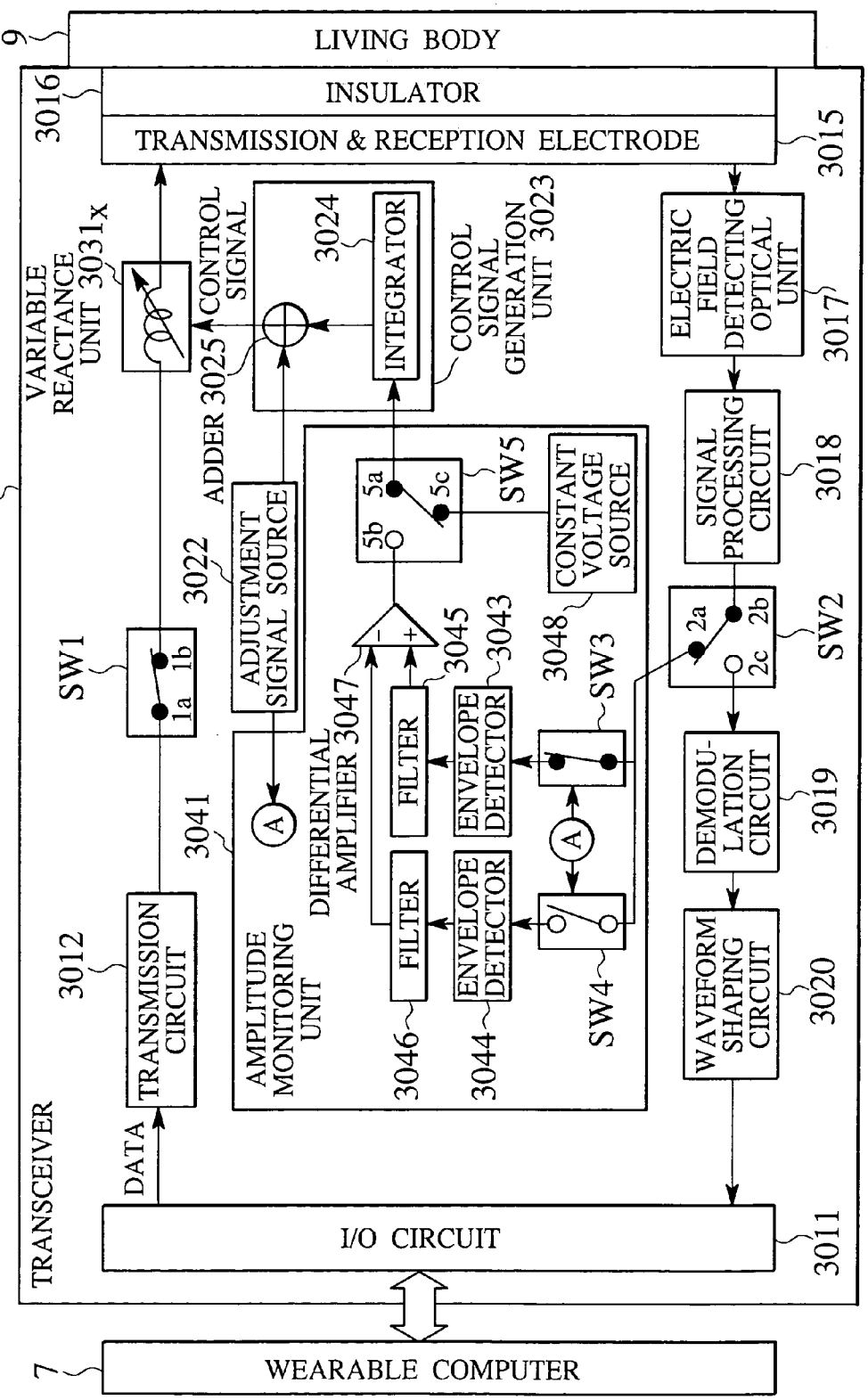
FIG. 34 is a block diagram showing a first specific configuration of a transceiver according to the fourth embodiment of the present invention at a data transmission time.

FIG. 34 shows the configuration of the transceiver 3001 at the data transmission time after the reactance adjustment. FIG. 34 differs from the reactance adjustment time shown in FIG. 33 in that terminals 5a and 5c are connected in the switch SW5 such that the integrator 3024 is connected with a constant voltage source 3048 for outputting a constant voltage in order to maintain the constant control signal after the reactance adjustment. By using the constant voltage source 3048 in this way, it is possible to eliminate the influence of the adjustment signal.

Note that, in the case of using the phase modulation or the frequency modulation in which the amplitude of the carrier does not change, the amplitude does not carry any information, so that the value of the amplitude may be changed. Consequently, in such a case, it is possible to carry out the reactance adjustment and the data transmission simultaneously.

Figure 35:
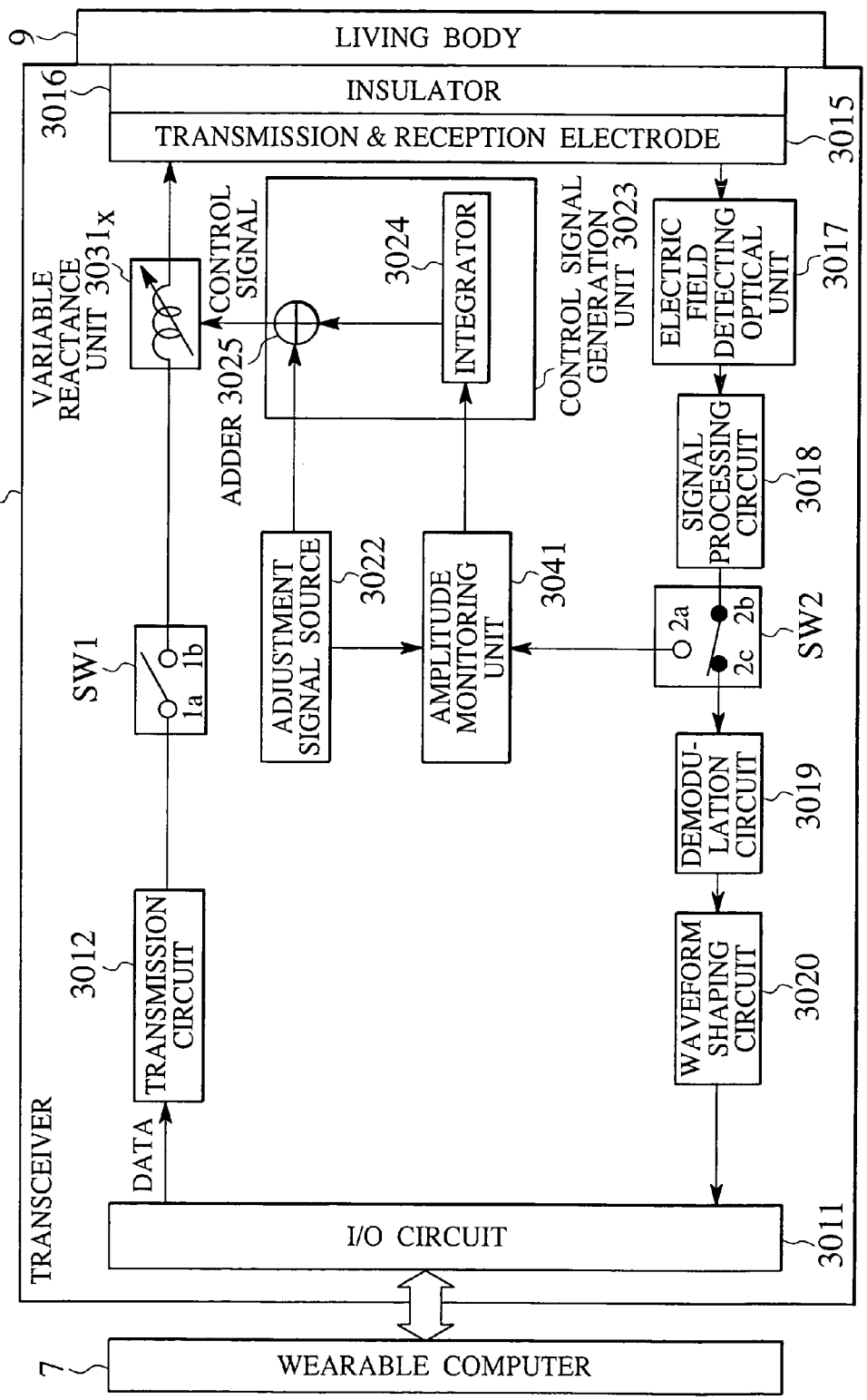
FIG. 35 is a block diagram showing a first specific configuration of a transceiver according to the fourth embodiment of the present invention at a data reception time.

FIG. 35 shows the configuration of the transceiver 3001 at the data reception time. At the data reception time, a terminal 2b and a terminal 2c are connected in the switch SW2, and the output signal from the signal processing circuit 3018 is demodulated at a demodulation circuit 3019, and applied with the waveform shaping at a waveform shaping circuit 3020. Then it reaches to the I/O circuit 3011 from which the data is sent to the wearable computer 7. Also, the connection between terminals 1a and 1b in the switch SW1 is disconnected, so as to prevent the introduction of the data into the transmission circuit 3012.

Note that the connections between terminals in the five switches are switched in coordination according to the operation state of the transceiver 3001. As a mechanism for controlling this switching, it is possible to use a configuration in which a control circuit (not shown) connected to the I/O circuit 3011 is provided inside the transceiver 3001 and the control signal is transmitted to each switch from there, for example. The control signal for the switching issued from such a control circuit may be transmitted from the wearable computer 7 or may be transmitted from an input unit provided at the transceiver 3001.

Next, the operation of the transceiver 3001 with the configuration as described above at the reactance adjustment time will be described in detail.

Figure 36:
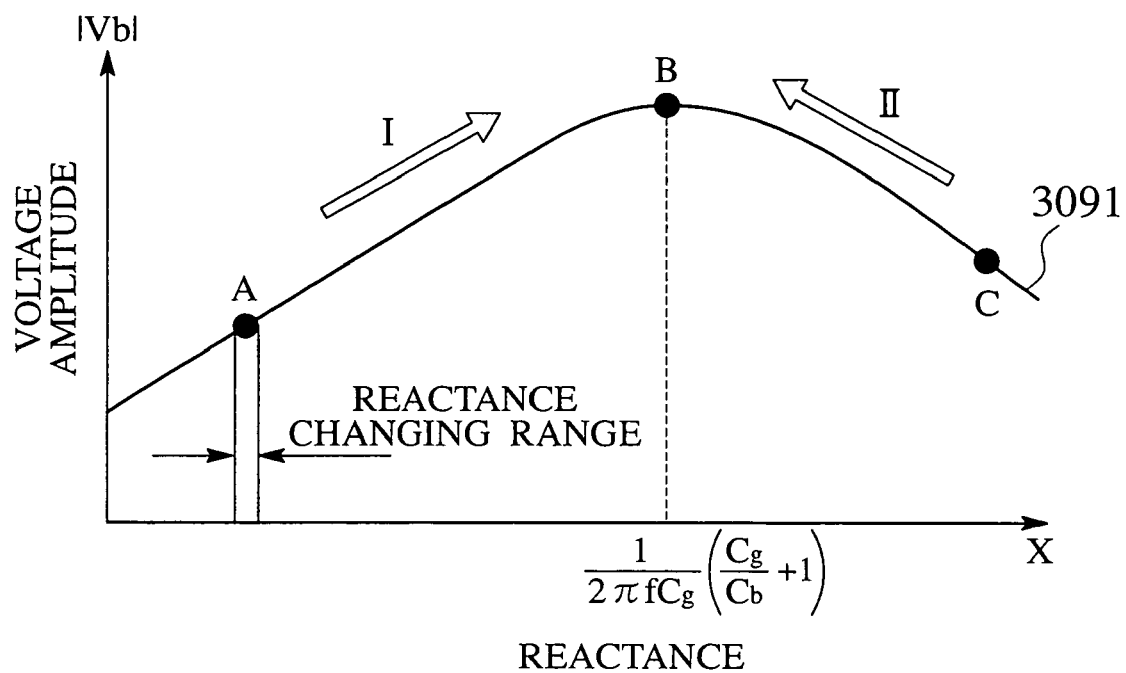
FIG. 36 is a graph showing a voltage amplitude as a function of reactance, for explaining an adjustment of a reactance value of a variable reactance unit in a transceiver in the first specific configuration according to the fourth embodiment of the present invention.

FIG. 36 conceptually shows the adjustment of the reactance X of the variable reactance unit 3031x. FIG. 36 is a graph showing a curve 3091 that indicates a voltage amplitude |vb| (vertical axis) obtained from the equation (16) as a function of the reactance X (horizontal axis). In the equation (16) described above, the value of the reactance at which the voltage amplitude |vb| becomes maximum (a point B) satisfies the equation (17), and this value $X_B$ is given by the following equation (28).

$$X_B = \frac{1}{2\pi f Cg}\left(\frac{Cg}{Cb} + 1\right) \tag{28}$$

Figure 37:
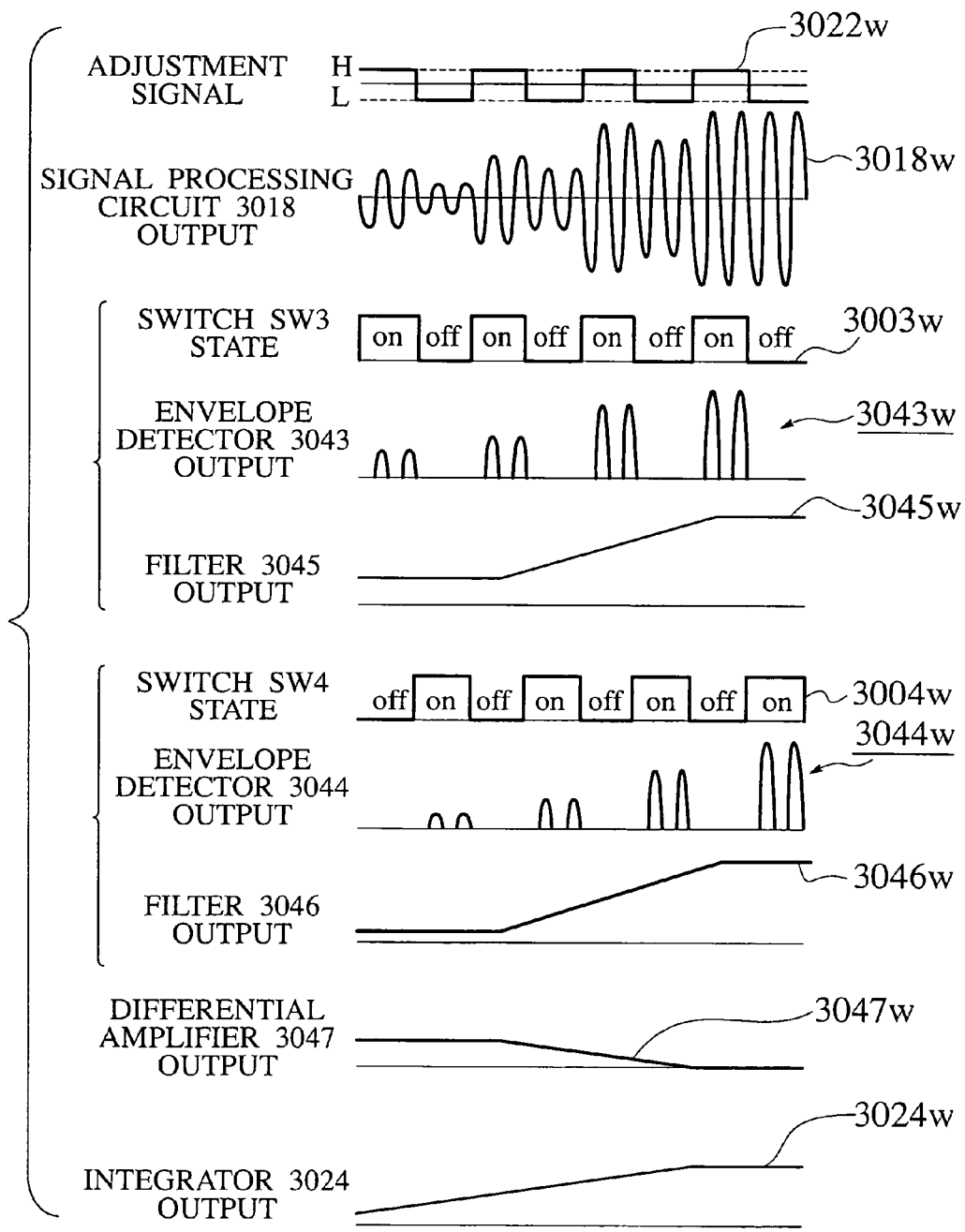
FIG. 37 is a diagram showing one example of signal waveforms of signals outputted from individual constituent units of an amplitude monitoring unit and a control signal generation unit in a transceiver according to the fourth embodiment of the present invention at a reactance adjustment time.

FIG. 37 shows the exemplary signal waveforms outputted from the adjustment signal source 3022, individual constituent units of the amplitude monitoring unit 3041, and the integrator 3024 at the reactance adjustment time. In the case shown in FIG. 37, a rectangular wave 3022z with a frequency less than the oscillation frequency f is used as the adjustment signal. Also, the connection (ON) and disconnection (OFF) of the switches SW3 and SW4 in the amplitude monitoring unit 3041 are such that the ON/OFF is a repeated at equal time interval and alternately in time at a constant period, as should be apparent from a waveform 3003w that indicates the connection state between terminals 3a and 3b in the switch SW3 and a waveform 3004w that indicates the connection state between terminals 4a and 4b in the switch SW4. The period of this ON/OFF operation is set such that the switch SW3 is connected when the rectangular wave 3022w is at H level (maximum) and the switch SW4 is connected when the rectangular wave 3022w is at L level, but this setting is only an expedient one and it is also possible to interchange the correspondence between H and L levels of the rectangular wave 3022w and the connection states of the two switches.

FIG. 37 shows the case where the initial state is at a point A and the control signal for increasing the value of the reactance X up to the value given by the equation (28) is generated.

Note that a "reactance changing range" is depicted in a vicinity of the point A on the curve 3091 shown in FIG. 36, and this implies that, in a vicinity of the point A, the signal actually sent to the variable reactance unit 3031x is what is obtained at the adder 3025 by adding the adjustment signal 3022w. Namely, a right end of the reactance changing range corresponds to a timing at which the adjustment signal 3022w is at H level and a left end corresponds to a timing at which the adjustment signal 3022w is at L level. A differential coefficient of the curve 3091 in a vicinity of such a point A with respect to X is positive, so that the voltage amplitude is larger when the instantaneous value of the reactance is larger. Consequently, within an identical period, the amplitude of the output signal 3018w from the signal processing circuit 3018 while the rectangular wave 3022w is at H level becomes larger than the amplitude of the output signal 3018w while the rectangular wave 3022w is at L level.

When the amplitude monitoring unit 3041 receives the output signal 3018w from the signal processing circuit 3018, the output signal 3043w of the envelope detector 3043 connected to the switch SW3 has values while terminals 3a and 3b are connected in the switch SW3 and becomes zero while the connection between terminals is disconnected. Similarly, the output signal 3044w of the envelope detector 3044 connected to the switch SW4 has values while terminals 4a and 4b are connected in the switch SW4 and becomes zero while the connection between terminals is disconnected.

The output signals 3043w and 3044w from the envelope detectors 3043 and 3044 are smoothed by eliminating the higher harmonic components at the filters 3045 and 3046 respectively, and outputted to the differential amplifier 3047 (signals 3045w and 3046w). Then, a different between these signals is extracted at the differential amplifier 3047 (signal 3047w), and sent to the integrator 3024. In the case where the initial state is at the point A, as described above, the output signal 3018w while the rectangular wave 3022w is at H level is larger, so that the signal 3024w for increasing the reactance X in a direction indicated by an arrow I on the curve 3091 shown in FIG. 36 is outputted from the integrator 3024. In the case where the rectangular wave 3022w is added to the output signal 3024w and outputted at the adder 3025, the output of the differential amplifier 3047 becomes zero when the changing of the value due to the minute change of the rectangular wave 3022w stops and the value of the reactance reaches to the point B shown in FIG. 36. Thereafter the value of the reactance will not be changed (except for the minute change). The control of the reactance X is carried out until it becomes such a state, that is the state at which the voltage amplitude |vb| becomes maximum.

Note that the control signal which is the output of the control signal generation unit 3023 is obtained by adding the adjustment signal that periodically repeats the minute change to the output signal from the integrator 3024 at the adder 3025, and an outline of the waveform of this control signal is almost the same as the output signal of the integrator 3024 except for the minute change. For this reason, this waveform is not depicted in FIG. 37.

Figure 38:
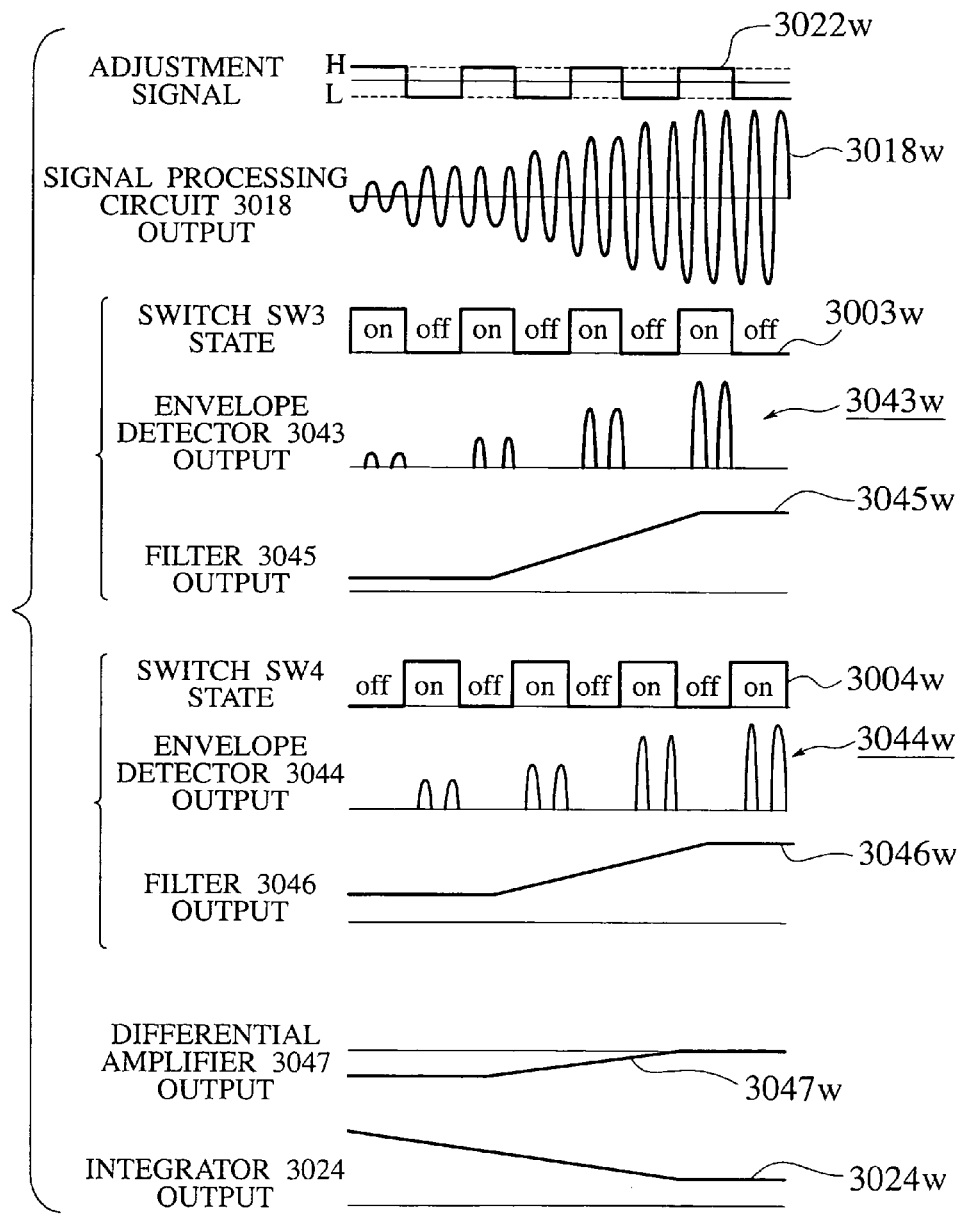
FIG. 38 is a diagram showing another example of signal waveforms of signals outputted from individual constituent units of an amplitude monitoring unit and a control signal generation unit in a transceiver according to the fourth embodiment of the present invention at a reactance adjustment time.

FIG. 38 shows the case where the initial state is at a point C. In FIG. 38, the rectangular wave 3022w which is the adjustment signal and the correlation between the vibrating state of this rectangular wave 3022w with the timings of connection between terminals in the switches SW3 and SW4 are the same as in the case where the initial state is at the point A. In the case shown in FIG. 38, a differential coefficient of the curve 3091 of FIG. 36 in a vicinity of the point C with respect to X is negative, so that the voltage amplitude is smaller when the instantaneous value of the reactance is larger. Consequently, the amplitude of the output signal 3018w from the signal processing circuit 3018 while the rectangular wave 3022w is at L level becomes larger than the amplitude of the output signal 3018w while the rectangular wave 3022w is at H level. Thus, the signal 3024w outputted from the integrator 3024 is the control signal for decreasing the reactance X in a direction indicated by an arrow II on the curve 3091 shown in FIG. 36. In the case, the reactance X is decreased until the output of the differential amplifier 3047 becomes zero and the reactance X becomes a value according to the equation (28), that is until the voltage amplitude |vb| becomes maximum.

In FIG. 38, the waveform of the control signal itself is not depicted for the same reason as explained in relation to FIG. 37 described above.

According to the first specific configuration described above, the reactance value is adjusted such that the change of the voltage amplitude applied to the living body becomes zero while the reactance value of the reactance unit provided between the transmission circuit and the transmission and reception electrode is minutely changed, so that it becomes possible to prevent the decrease of the voltage applied to the living body and thereby improve the communication quality, It should be obvious that the transceiver 3001 according to this embodiment can be utilized in practice, in a similar way as the conventional transceiver described above with reference to FIG. 2. This point commonly applies to all the specific configurations of this embodiment.

Next, the second specific configuration of the transceiver according to the fourth embodiment will be described.

The second specific configuration of the transceiver prevents the decrease of the voltage applied to the living body 9 by making the oscillation frequency of the oscillator in the transmission circuit variable, instead of making the reactance of the reactance unit provided between the transmission circuit and the transmission and reception electrode variable.

As should be apparent from the equation (17), the voltage amplitude of the voltage Vb applied to the living body 9 that changes according to the change of the parasitic capacitances Cg and Cb can also be made maximum by changing the oscillation frequency f of the alternating current signals generated from the oscillator.

Figure 39:
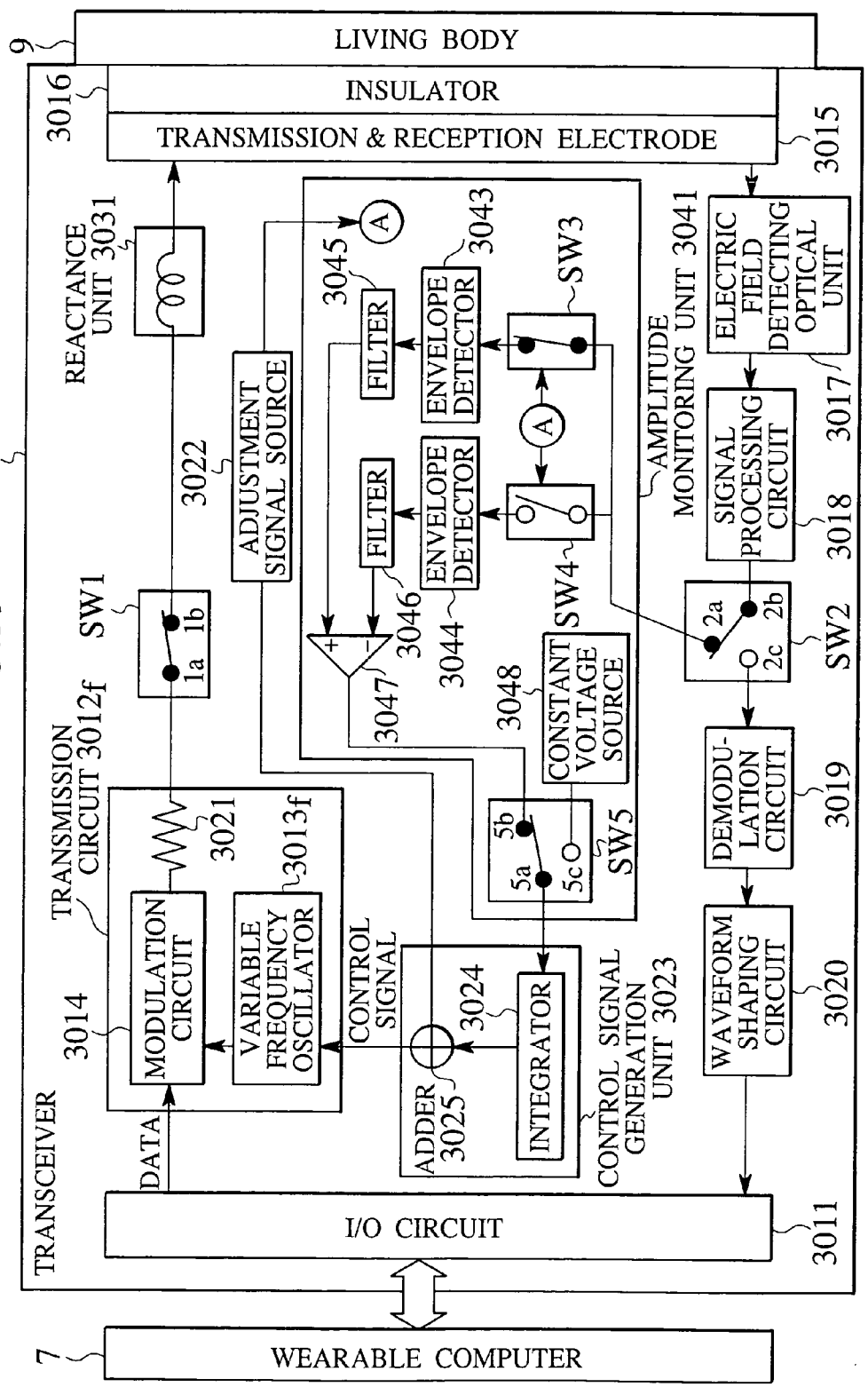
FIG. 39 is a block diagram showing a second specific configuration of a transceiver according to the fourth embodiment of the present invention at an oscillation frequency adjustment time.

FIG. 39 shows the second specific configuration of the transceiver according to the fourth embodiment. In FIG. 39, those elements that have the same functions as the corresponding elements in the first specific configuration described above are given the same reference numerals. In the transceiver 3002 shown in FIG. 39, a reactance unit 3031 having a constant reactance is provided between the transmission circuit 3012f and the transmission and reception electrode 3015, while a variable frequency oscillator 3013f capable of changing the frequency of the alternating current signals to be generated is provided in the transmission circuit 3012f. In conjunction with these, a control signal generation unit 3023 for generating the control signal for controlling the frequency of the alternating current signals to be outputted from the transmission circuit 3012f according to the signal outputted from the amplitude monitoring unit 3041 is connected to the variable frequency oscillator 3013f. Namely, the control signal here is for controlling the frequency f of the variable frequency oscillator 3013f. The functional configuration of the remaining portion is the same as the corresponding portion in the first specific configuration described above.

Note that the connection states of the switches at the data transmission or reception time after the oscillation frequency adjustment in the transceiver 3002 are the same as in the first specific configuration shown in FIG. 34 and FIG. 35, so that their description will be omitted here.

Figure 40:
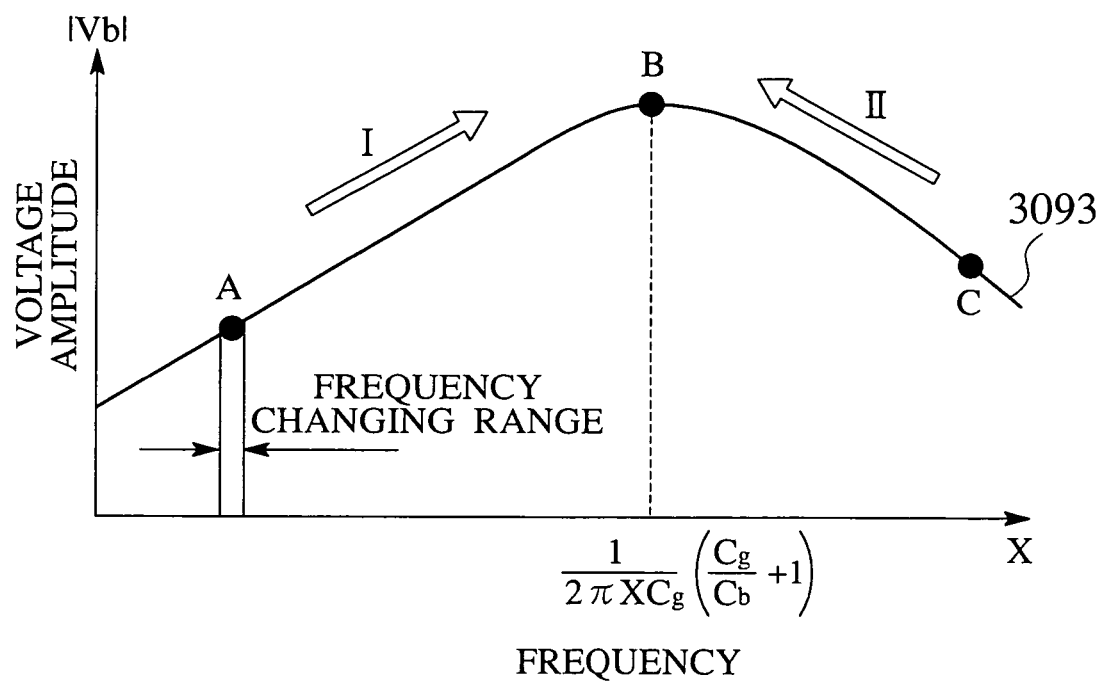
FIG. 40 is a graph showing a voltage amplitude as a function of oscillation frequency, for explaining an adjustment of an oscillation frequency of a variable frequency oscillator in a transceiver in the second specific configuration according to the fourth embodiment of the present invention.

FIG. 40 conceptually shows the adjustment of the oscillation frequency f of the variable frequency oscillator 3013f. FIG. 40 is a graph showing a curve 3093 that indicates a voltage amplitude |vb| (vertical axis) obtained from the equation (16) as a function of the oscillation frequency f (horizontal axis). From the equation (17) described above, the value $f_B$ of the oscillation frequency at which the voltage amplitude |vb| becomes maximum (a point B) is given by the following equation (29).

$$f_B = \frac{1}{2\pi X C g}\left(\frac{Cg}{Cb} + 1\right) \quad (29)$$

As a result, the signal waveforms outputted from the adjustment signal source 3022, individual constituent units of the amplitude monitoring unit 3041, and the integrator 3024 are similar to those shown in FIG. 37 (in the case where the initial state is at the point A in FIG. 40) and FIG. 38 (in the case where the initial state is at the point C ain FIG. 40). However, in the second specific configuration, the output signal 3024w from the integrator 3024 is outputted to the variable frequency oscillator 3013f, and the frequency is changed to the frequency given by the equation (29). Consequently, the "frequency changing range" shown in FIG. 40 indicates a range of the minute change due to (the rectangular wave of) the adjustment signal, similarly as the "reactance changing range" of FIG. 36.

According to the second specific configuration described above, it is possible to obtain the same effects as the first specific configuration by making the oscillation frequency of the oscillator variable, instead of making the reactance of the reactance unit variable as in the first specific configuration.

Next, the third specific configuration of the transceiver according to the fourth embodiment will be described.

The third specific configuration of the transceiver has a feature that it makes the amplitude of the voltage applied to the living body maximum by controlling the variable reactance unit capable of changing the reactance value as in the first specific configuration, but in addition the values of the voltage amplitudes corresponding to all reactance values that can be taken are checked and stored, and the maximum value of the voltage amplitude is derived from the stored result, prior to the controlling, and then the controlling to the reactance value for which the voltage amplitude becomes maximum is carried out.

Figure 41:
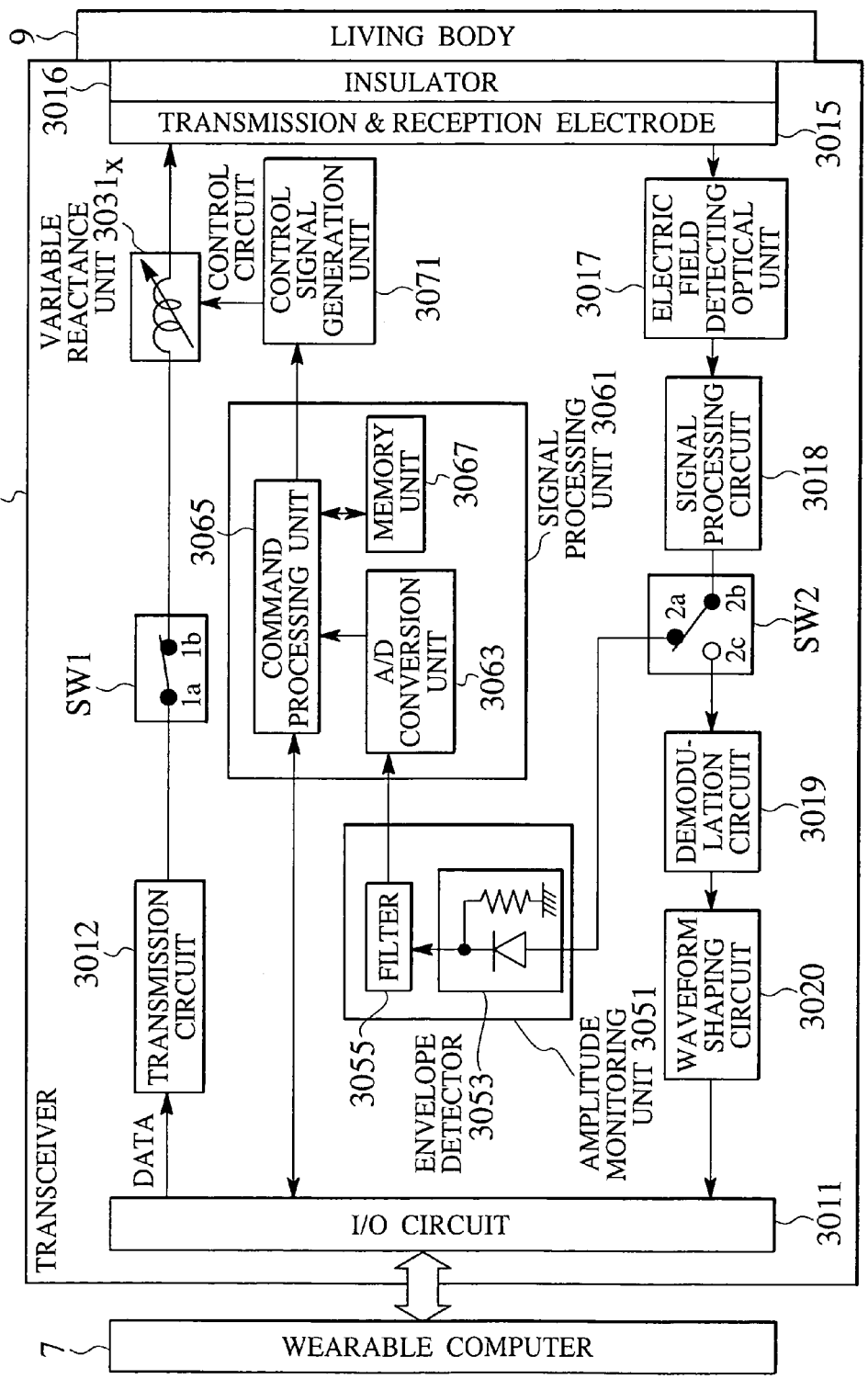
FIG. 41 is a block diagram showing a third specific configuration of a transceiver according to the fourth embodiment of the present invention at a reactance adjustment time.

FIG. 41 shows the third specific configuration of the transceiver according to the fourth embodiment. The transceiver 3003 shown in FIG. 41 has an amplitude monitoring unit 3051 for monitoring the amplitude of the signal outputted from the signal processing circuit 3018, a signal processing unit 3061 for processing the output signal from this amplitude monitoring unit 3051 which is capable of transmitting or receiving signals with respect to the wearable computer 7, and a control signal generation unit 3071 for generating the control signal to the variable reactance unit 3031x according to a command signal from this signal processing unit 3061. The other constituent elements are the same as the transceiver 3001 in the first specific configuration.

The amplitude monitoring unit 3051 comprises an envelope detector 3053 formed by diodes, resistors, etc., and a filter 3055 for eliminating the higher harmonic components of the output signal from this envelope detector 3053. However, this configuration is only an example.

The signal processing unit 3061 has an analog/digital (A/D) conversion unit 3063 for converting the output (analog signal) of the amplitude monitoring unit 3051 into a digital signal, a command processing unit 3065 for carrying out a processing by receiving commands for control and signal processing from the wearable computer 7, and sending a command signal regarding the control signal that should be generated by the control signal generation unit 3071, and a memory unit 3067 for storing the output of the amplitude monitoring unit 3051 in a memory region corresponding to each reactance value at a time of finding the optimum reactance value X.

The command processing unit 3065 is connected with the wearable computer 7 through the I/O circuit 3011, and capable of executing various types of processing according to the command transmitted from the wearable computer 7. The command processing unit 3065 has a function of the control information transmission unit for transmitting information (control information) necessary in generating the control signal to be generated from the control signal generation unit 3071, to the control signal generation unit 3071. The command processing unit 3065 and the A/D conversion unit 3063 constitute the maximum value related information extraction unit for extracting the reactance X (maximum value related information) which is the characteristic of the variable reactance unit 3031x that is set in relation to the maximum value of the amplitude stored in the memory unit 3067.

Next. the operation of the transceiver 3003 at the reactance adjustment time will be described.

First, all possible amplitudes of the output signal from the amplitude monitoring unit 3051 are detected for the values that can be taken by the reactance value (variable range). To this end, all possible reactance values X are realized at the variable reactance unit 3031x by sending the control signals from the control signal generation unit 3071 according to the command signal from the command processing unit 3065, and the amplitudes of the output signals obtained as a result of monitoring the signal received through the living body 9 at the amplitude monitoring unit 3051 by using each realized reactance value. In this detection, the output signal of the amplitude monitoring unit 3051 is converted into the digital signal at the A/D conversion unit 3063 first, and then the digital signal is stored as data into the memory unit 3067 through the command processing unit 3065. The memory unit 3067 secures a memory region (address) for each reactance value, and stores and manages the reactance values by setting in correspondence to the output signals of the amplitude monitoring unit 3051.

It is also possible to output the detection result to an output device of the wearable computer 7 when the above processing is finished. As the detection result in this case, the curve 3091 shown in FIG. 36 can be displayed, for example.

Then, the command processing unit 3065 obtains the maximum value of the amplitude of the output signal of the amplitude monitoring unit 3051 by referring to the data stored in the memory unit 3067, reads out this value from the memory unit 3067, determines the optimum reactance value $X_B$ of the equation (28) to be reached by the controlling, and transmits the command signal (control information) according to that data to the control signal generation unit 3071. In addition, it is also possible to transmits that data itself to the wearable computer 7.

The control signal generation unit 3071 transmits the control signal for setting the reactance X to the optimum value, according to the command signal, to the variable reactance unit 3031x.

After the reactance X is set to the optimum value by the above processing, the control signal generation unit 3071 transmits the signal for maintaining this reactance value constant, and a transition to the state of the data transmission is made. Consequently, in this third specific configuration, the connection states of the two switches SW1 and SW2 are the same at both the reactance adjustment time and the subsequent data transmission time.

Also, at the data reception time, terminals 2*b* and 2*c* are connected in the switch SW2 such that the output signal of the signal processing circuit 3018 is sent to the demodulation circuit 3019, while the connection between terminals 1*a* and 1*b* is disconnected in the switch SW1.

According to the third specific configuration described above, it is possible to obtain the same effects as in the first and second specific configurations described above.

Next, the fourth specific configuration of the transceiver according to the fourth embodiment will be described.

The fourth specific configuration of the transceiver has a feature that it makes the amplitude of the voltage applied to the living body maximum by controlling the variable frequency oscillator capable of changing the oscillation frequency value as in the second specific configuration, but in addition the values of the voltage amplitudes corresponding to all oscillation frequency values that can be taken are checked and stored, and the maximum value of the voltage amplitude is derived from the stored result, prior to the controlling, and then the controlling to the oscillation frequency value for which the voltage amplitude becomes maximum is carried out.

Figure 42:
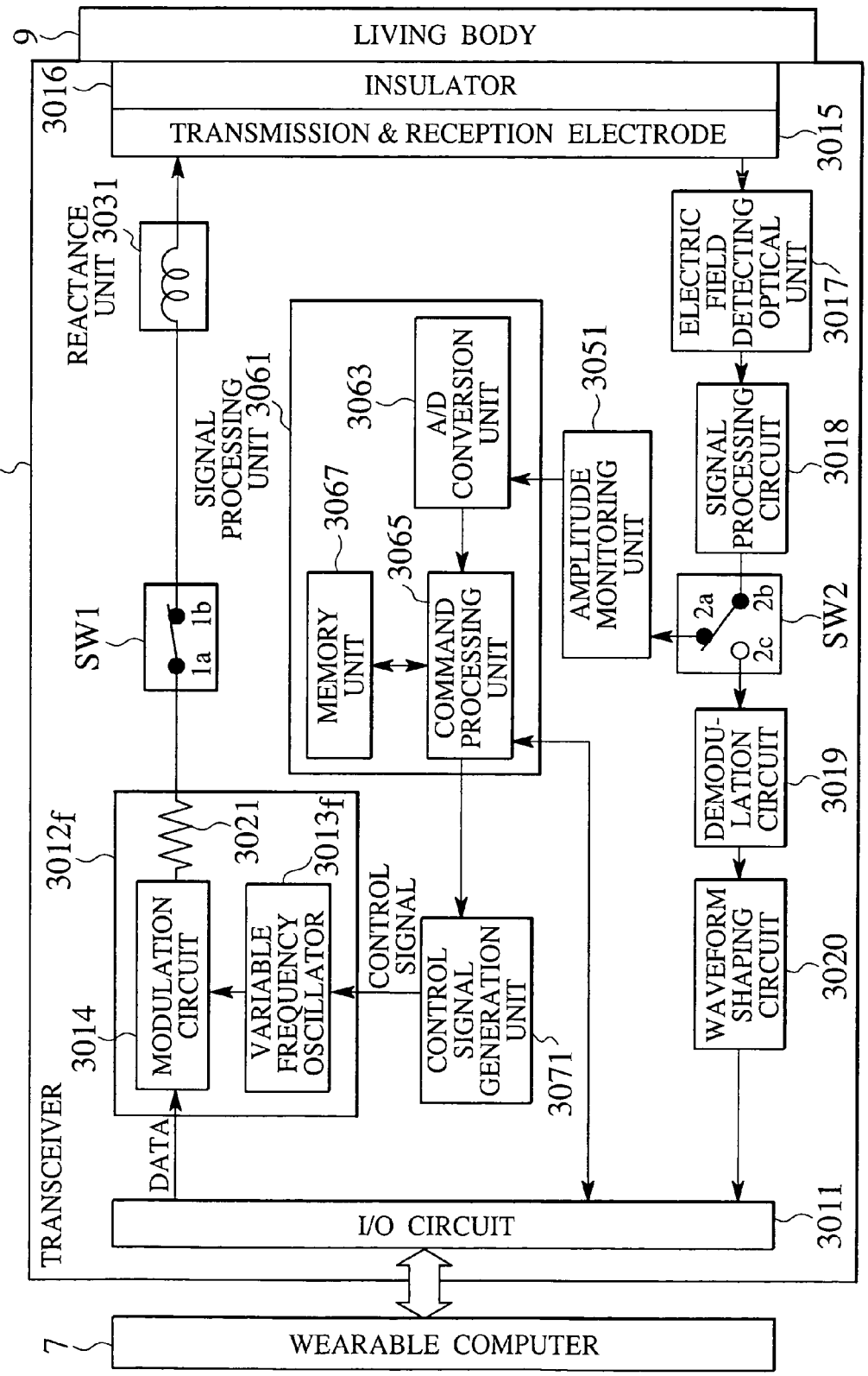
FIG. 42 is a block diagram showing a fourth specific configuration of a transceiver according to the fourth embodiment of the present invention at an oscillation frequency adjustment time.

FIG. 42 shows the fourth specific configuration of the transceiver according to the fourth embodiment. The transceiver 3004 shown in FIG. 42 has the variable frequency oscillator 3013*f* provided in the transmission circuit 3012*f*, and the control signal generation unit 3071 for generating the control signal for controlling the frequency is connected to this variable frequency oscillator 3013*f*. In conjunction with these, similarly as in the second specific configuration, the reactance unit 3031 has the constant reactance, Consequently, FIG. 42 shows the transceiver 3004 at the frequency adjustment time. The remaining portion of the transceiver 3004 is the same as the corresponding portion of the transceiver 3003 of the third specific configuration.

In the fourth specific configuration, the output signal from the amplitude monitoring unit 3051 is detected for each one of the oscillation frequencies within the variable range, and the adjustment is carried out by outputting the control signal for setting the frequency which causes the output signal with the maximum amplitude among the detected output signals, from the control signal generation unit 3071. The value of the frequency $f_B$ for which the amplitude becomes maximum is given by the equation (29). The remaining configuration and operation of the transceiver 3004 is the same as in the transceiver 3003 of the third specific configuration. The corresponding constituent elements are given the same reference numerals in FIG. 41 and FIG. 42 and their description will be omitted here.

Note that the connection states of the two switches SW1 and SW2 at the data transmission time after the frequency adjustment is as those shown in FIG. 42 (at the frequency adjustment time), and at the data reception time, terminals 2*b* and 2*c* are connected in the switch SW2 while the connection between terminals 1*a* and 1*b* is disconnected in the switch SW1.

According to the fourth specific configuration described above, it is possible to obtain the same effects as in the third specific configuration described above.

It is also possible to form the electric field detecting optical unit provided in the transceiver by using two electrode plates that are connected to become a short-circuit by a lead wire, laser lights and the magneto-optic crystal.

Note that the fourth embodiment has been described above for an exemplary case of using the living body as the electric field propagating medium, but the electric field propagating medium for generating and propagating the electric fields according to the data at a time of the transmission or the reception by the transceiver according to the second embodiment is not necessarily limited to the living body.

According to the fourth embodiment described above, it is possible to provide a transceiver capable of preventing the decrease of the voltage applied to the electric field propagating medium and thereby maintaining the good communication quality.

As a consequence, this transceiver can make the realization of the wearable computer more plausible.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A transceiver for inducing electric fields according to data to be transmitted in an electric field propagating medium, and carrying out at least data transmission by using induced electric fields, comprising:

a transmission unit configured to modulate the data to be transmitted by generating alternating current signals having a prescribed frequency, and transmit modulated signals obtained by modulating the data to be transmitted; and a resonance causing unit configured to cause a series resonance with a parasitic capacitance appearing between a ground for the transmission unit and an Earth ground and a parasitic capacitance appearing between the electric field propagating medium and the Earth Ground, thereby reducing attenuation of the modulated signals transmitted to the electric field propagating medium.

2. The transceiver of claim 1, wherein the transceiver also carries out data reception by receiving electric fields according to data to be received which are induced in the electric field propagating medium, and further comprises:

a transmission and reception electrode configured to induce the electric fields according to the data to be transmitted and receive the electric fields according to the data to be received, the resonance causing unit being connected in series with the transmission unit and the transmission and reception electrode;

an electric field detection unit configured to detect the electric the electric fields according to the data to be received, and convert each detected electric field into an electric signal;

a control unit configured to output a control signal for controlling a characteristic of the resonace causing unit by using the electric signal converted by the electric field detection unit and a reference signal according to the modulated signals; and a demodulation unit configured to demodulate the electric signal converted by the electric field detection unit.

3. The transceiver of claim 2, wherein the control unit includes:
an amplifier configured to amplify the electric signal;
a differential amplifier configured to obtain a difference between the reference signal and an output signal of the amplifier, and amplify the difference;
a multiplier configured to obtain a product of an output signal of the differential amplifier and the reference signal;
a filter configured to eliminate higher harmonic components of a signal indicating the product obtained by the multiplier; and
an integrator configured to generate the control signal according to a result of integrating an output signal from the filter.

4. The transceiver of claim 3, further comprising:
a first connection unit configured to connect the transmission unit and the resonance causing unit at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode; and
a second connection unit configured to connect the electric field detection unit and the amplifier at a time of carrying out the data transmission, and connect the electric field detection unit and the demodulation unit at a time of carrying out the data reception by receiving the electric fields induced in the electric field propagating medium.

5. The transceiver of claim 3, wherein the control unit also includes:
an additional integrator configured to generate a gain control signal for controlling a gain of the amplifier; and
a constant voltage source capable of applying a constant voltage to the amplifier in order to maintain the gain of the amplifier as controlled by the gain control signal generated from the additional integrator.

6. The transceiver of claim 5, further comprising:
a first connection unit configured to connect the transmission unit and the resonance causing unit at a time of carrying out the data transmission by inducing the electric fields in the electric field propagating medium, connect the transmission unit and the electric field detection unit without passing through the resonance causing unit at a time of adjusting the gain of the amplifier, and makes no connection at a time of carrying out the data reception by receiving the electric fields induced in the electric field propagating medium through the transmission and reception electrode;
a second connection unit configured to connect the electric field detection unit and the control unit at a time of carrying out the data transmission and at a time of adjusting the gain of the amplifier, and connect the electric field detection unit and the demodulation unit at a time of carrying out the data reception by receiving the electric fields induced in the electric field propagating medium;
a third connection unit configured to connect the transmission unit and the electric field detection unit at a time of adjusting the gain of the amplifier, and connect the transmission and reception electrode and the electric field detection unit at a time of carrying out the data transmission and at a time of carrying out the data reception; and
a fourth connection unit configured to connect the filter and the integrator while connecting the additional integrator and the constant voltage source at a time of carrying out the data transmission and at a time of carrying out the data reception, and connect the filter and the additional integrator at a time of adjusting the gain of the amplifier.

7. The transceiver of claim 1, wherein the transceiver also carries out data reception by receiving electric fields according to data to be received which are induced in the electric field propagating medium, and further comprises:
a transmission and reception electrode configured to induce the electric fields according to the data to be transmitted and receive the electric fields according to the data to be received, the resonance causing unit being connected in series with the transmission unit and the transmission and reception electrode;
an electric field detection unit configured to detect the electric the electric fields according to the data to be received through the transmission and reception electrode, and convert each detected electric field into an electric signal;
a control unit configured to output a control signal for controlling a frequency of the alternating current signals generated by the transmission unit by using the electric signal converted by the electric field detection unit and a reference signal according to the modulated signals; and
a demodulation unit configured to demodulate the electric signal converted by the electric field detection unit.

8. The transceiver of claim 7, wherein the control unit includes:
an amplifier configured to amplify the electric signal;
a differential amplifier configured to obtain a difference between the reference signal and an output signal of the amplifier, and amplify the difference;
a multiplier configured to obtain a product of an output signal of the differential amplifier and the reference signal;
a filter configured to eliminate higher harmonic components of a signal indicating the product obtained by the multiplier; and
an integrator configured to generate the control signal according to a result of integrating an output signal from the filter.

9. The transceiver of claim 8, further comprising:
a first connection unit configured to connect the transmission unit and the resonance causing unit at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode; and
a second connection unit configured to connect the electric field detection unit and the amplifier at a time of carrying out the data transmission, and connect the electric field detection unit and the demodulation unit at a time of carrying out the data reception by receiving the electric fields induced in the electric field propagating medium.

10. The transceiver of claim 8, wherein the control unit also includes:

an additional integrator configured to generate a gain control signal for controlling a gain of the amplifier; and a constant voltage source capable of applying a constant voltage to the amplifier in order to maintain the gain of the amplifier as controlled by the gain control signal generated from the additional integrator.

11. The transceiver of claim 10, further comprising:

a first connection unit configured to connect the transmission unit and the resonance causing unit at a time of carrying out the data transmission by inducing the electric fields in the electric field propagating medium, connect the transmission unit and the electric field detection unit without passing through the resonance causing unit at a time of adjusting the gain of the amplifier, and makes no connection at a time of carrying out the data reception by receiving the electric fields induced in the electric field propagating medium through the transmission and reception electrode;

a second connection unit configured to connect the electric field detection unit and the control unit at a time of carrying out the data transmission and at a time of adjusting the gain of the amplifier, and connect the electric field detection unit and the demodulation unit at a time of carrying out the data reception by receiving the electric fields induced in the electric field propagating medium;

a third connection unit configured to connect the transmission unit and the electric field detection unit at a time of adjusting the gain of the amplifier, and connect the transmission and reception electrode and the electric field detection unit at a time of carrying out the data transmission and at a time of carrying out the data reception; and a fourth connection unit configured to connect the filter and the integrator while connecting the additional integrator and the constant voltage source at a time of carrying out the data transmission and at a time of carrying out the data reception, and connect the filter and the additional integrator at a time of adjusting the gain of the amplifier.

12. The transceiver of claim 1, wherein the transceiver also carries out data reception by receiving electric fields according to data to be received which are induced in the electric field propagating medium, and further comprises:

a transmission and reception electrode configured to induce the electric fields according to the data to be transmitted and receive the electric fields according to the data to be received;

a transformer connected in series with the transmission unit and the transmission and reception electrode, the resonance causing unit being connected in parallel to the transformer;

an electric field detection unit configured to detect the electric the electric fields according to the data to be received, and convert each detected electric field into an electric signal;

a control unit configured to output a control signal for controlling a characteristic of the resonace causing unit by using the electric signal converted by the electric field detection unit and a reference signal according to the modulated signals; and a demodulation unit configured to demodulate the electric signal converted by the electric field detection unit.

13. The transceiver of claim 12, wherein the control unit includes:

a multiplier configured to obtain a product of the reference signal and the electric signal;

a filter configured to eliminate higher harmonic components of a signal indicating the product obtained by the multiplier; and an integrator configured to generate the control signal according to a result of integrating an output signal from the filter.

14. The transceiver of claim 13, further comprising:

a first connection unit configured to connect the transmission unit and the transformer at a time of carrying out the data transmission by inducing the electric fields in the electric field propagating medium, and disconnect a connection between the transmission unit and the transformer at a time of carrying out the data reception by receiving the electric fields induced in the electric field propagating medium through the transmission and reception electrode;

a second connection unit configured to connect the electric field detection unit and the multiplier at a time of carrying out the data transmission, and connect the electric field detection unit and the demodulation unit at a time of carrying out the data reception by receiving the electric fields induced in the electric field propagating medium; and a third connection unit configured to connect the resonance causing unit and the electric field detection unit at a time of carrying out the data transmission, and connect the transmission and reception electrode and the electric field detection unit at a time of carrying out the data reception by receiving the electric fields induced in the lectric field propagating medium.

15. The transceiver of claim 1, wherein the transceiver also carries out data reception by receiving electric fields according to data to be received which are induced in the electric field propagating medium, and further comprises:

a transmission and reception electrode configured to induce the electric fields according to the data to be transmitted and receive the electric fields according to the data to be received;

a transformer connected in series with the transmission unit and the transmission and reception electrode, the resonance causing unit being connected in parallel to the transformer;

an electric field detection unit configured to detect the electric the electric fields according to the data to be received, and convert each detected electric field into an electric signal;

a control unit configured to output a control signal for controlling a frequency of the alternating current signals generated by the transmission unit by using the electric signal converted by the electric field detection unit and a reference signal according to the modulated signals; and a demodulation unit configured to demodulate the electric signal converted by the electric field detection unit.

16. The transceiver of claim 15, wherein the control unit includes:

a multiplier configured to obtain a product of the reference signal and the electric signal;

a filter configured to eliminate higher harmonic components of a signal indicating the product obtained by the multiplier; and an integrator configured to generate the control signal according to a result of integrating an output signal from the filter.

17. The transceiver of claim 16, further comprising:

a first connection unit configured to connect the transmission unit and the transformer at a time of carrying out the data transmission by inducing the electric fields in the electric field propagating medium, and disconnect a connection between the transmission unit and the transformer at a time of carrying out the data reception by receiving the electric fields induced in the electric field propagating medium through the transmission and reception electrode;

a second connection unit configured to connect the electric field detection unit and the multiplier at a time of carrying out the data transmission, and connect the electric field detection unit and the demodulation unit at a time of carrying out the data reception by receiving the electric fields induced in the electric field propagating medium; and a third connection unit configured to connect the resonance causing unit and the electric field detection unit at a time of carrying out the data transmission, and connect the transmission and reception electrode and the electric field detection unit at a time of carrying out the data reception by receiving the electric fields induced in the lectric field propagating medium.

18. The transceiver of claim 1, wherein the transceiver also carries out data reception by receiving electric fields according to data to be received which are induced in the electric field propagating medium, and further comprises:

a transmission and reception electrode configured to induce the electric fields according to the data to be transmitted and receive the electric fields according to the data to be received, the resonance causing unit being connected in series with the transmission unit and the transmission and reception electrode;

an electric field detection unit configured to detect the electric the electric fields according to the data to be received, and convert each detected electric field into an electric signal;

a phase adjustment unit configured to adjust a phase of one of the electric signal converted by the electric field detection unit and a reference signal according to the modulated signals, to coincide with a phase of another one of the electric signal and the reference signal;

a control unit configured to output a control signal for controlling a characteristic of the resonace causing unit by using the electric signal and the reference signal whose phases are made to coincide by the phase adjustment unit; and a demodulation unit configured to demodulate the electric signal converted by the electric field detection unit.

19. The transceiver of claim 18, wherein the phase adjustment unit includes:

a phase comparator configured to generate an adjustment signal for adjusting a phase difference when the phase difference exists between the electric signal and the reference signal as a result of comparing phases of the electric signal converted by the electric field detection unit and the reference signal according to the modulated signals; and a phase shifter configured to receive the adjustment signal generated by the phase comparator, and adjust a phase of one of the electric signal and the reference signal.

20. The transceiver of claim 18, wherein the control unit includes:

an amplifier configured to amplify the electric signal;

a differential amplifier configured to obtain a difference between the reference signal and an output signal of the amplifier, and amplify the difference;

a multiplier configured to obtain a product of an output signal of the differential amplifier and the reference signal;

a filter configured to eliminate higher harmonic components of a signal indicating the product obtained by the multiplier; and an integrator configured to generate the control signal according to a result of integrating an output signal from the filter.

21. The transceiver of claim 18, further comprising:

a first connection unit configured to connect the transmission unit and the resonance causing unit at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode; and a second connection unit configured to connect the electric field detection unit and the phase adjustment unit or the control unit at a time of carrying out the data transmission, and connect the electric field detection unit and the demodulation unit at a time of carrying out the data reception by receiving the electric fields induced in the electric field propagating medium.

22. The transceiver of claim 1, wherein the transceiver also carries out data reception by receiving electric fields according to data to be received which are induced in the electric field propagating medium, and further comprises:

a transmission and reception electrode configured to induce the electric fields according to the data to be transmitted and receive the electric fields according to the data to be received, the resonance causing unit being connected in series with the transmission unit and the transmission and reception electrode;

an electric field detection unit configured to detect the electric the electric fields according to the data to be received through the transmission and reception electrode, and convert each detected electric field into an electric signal;

a phase adjustment unit configured to adjust a phase of one of the electric signal converted by the electric field detection unit and a reference signal according to the modulated signals, to coincide with a phase of another one of the electric signal and the reference signal;

a control unit configured to output a control signal for controlling a frequency of the alternating current signals generated by the transmission unit by using the electric signal and the reference signal whose phases are made to coincide by the phase adjustment unit; and a demodulation unit configured to demodulate the electric signal converted by the electric field detection unit.

23. The transceiver of claim 22, wherein the phase adjustment unit includes:

a phase comparator configured to generate an adjustment signal for adjusting a phase difference when the phase difference exists between the electric signal and the reference signal as a result of comparing phases of the electric signal converted by the electric field detection unit and the reference signal according to the modulated signals; and a phase shifter configured to receive the adjustment signal generated by the phase comparator, and adjust a phase of one of the electric signal and the reference signal.

24. The transceiver of claim 22, wherein the control unit includes:
an amplifier configured to amplify the electric signal;
a differential amplifier configured to obtain a difference between the reference signal and an output signal of the amplifier, and amplify the difference;
a multiplier configured to obtain a product of an output signal of the differential amplifier and the reference signal;
a filter configured to eliminate higher harmonic components of a signal indicating the product obtained by the multiplier; and
an integrator configured to generate the control signal according to a result of integrating an output signal from the filter.

25. The transceiver of claim 22, further comprising:
a first connection unit configured to connect the transmission unit and the resonance causing unit at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode; and
a second connection unit configured to connect the electric field detection unit and the phase adjustment unit or the control unit at a time of carrying out the data transmission, and connect the electric field detection unit and the demodulation unit at a time of carrying out the data reception by receiving the electric fields induced in the electric field propagating medium.

26. The transceiver of claim 1, wherein the transceiver also carries out data reception by receiving electric fields according to data to be received which are induced in the electric field propagating medium, and further comprises:
a transmission and reception electrode configured to induce the electric fields according to the data to be transmitted and receive the electric fields according to the data to be received, the resonance causing unit being connected in series with the transmission unit and the transmission and reception electrode;
an electric field detection unit configured to detect the electric the electric fields according to the data to be received, and convert each detected electric field into an electric signal;
a control unit configured to generate a reference signal having a constant amplitude, and output a control signal for controlling a characteristic of the resonace causing unit by using the reference signal and the electric signal converted by the electric field detection unit; and
a demodulation unit configured to demodulate the electric signal converted by the electric field detection unit.

27. The transceiver of claim 26, wherein the control unit includes:
an envelope detector configured to detect an amplitude of the electric signal converted by the electric field detection unit;
a filter configured to eliminate higher harmonic components of an output signal of the envelope detector;

a constant voltage source configured to generate the reference signal;
a differential amplifier configured to obtain a difference between the reference signal generated by the constant voltage source and an output signal of the filter, and amplify the difference; and
an integrator configured to generate the control signal according to a result of integrating an output signal from the differential amplifier.

28. The transceiver of claim 27, further comprising:
a first connection unit configured to connect the transmission unit and the resonance causing unit at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode; and
a second connection unit configured to connect the electric field detection unit and the control unit at a time of carrying out the data transmission, and connect the electric field detection unit and the demodulation unit at a time of carrying out the data reception by receiving the electric fields induced in the electric field propagating medium.

29. The transceiver of claim 27, wherein the control unit also includes:
an additional integrator configured to generate another control signal for adjusting the reference signal.

30. The transceiver of claim 29, further comprising:
a first connection unit configured to connect the transmission unit and the resonance causing unit at a time of carrying out the data transmission by inducing the electric fields in the electric field propagating medium, connect the transmission unit and the electric field detection unit without passing through the resonance causing unit at a time of adjusting the reference signal, and makes no connection at a time of carrying out the data reception by receiving the electric fields induced in the electric field propagating medium through the transmission and reception electrode;
a second connection unit configured to connect the electric field detection unit and the control unit at a time of carrying out the data transmission and at a time of adjusting the reference signal, and connect the electric field detection unit and the demodulation unit at a time of carrying out the data reception by receiving the electric fields induced in the electric field propagating medium;
a third connection unit configured to connect the transmission unit and the electric field detection unit at a time of adjusting the reference signal, and connect the transmission and reception electrode and the electric field detection unit at a time of carrying out the data transmission and at a time of carrying out the data reception; and
a fourth connection unit configured to connect the differential amplifier and the integrator while connecting the constant voltage source and the additional integrator at a time of carrying out the data transmission and at a time of carrying out the data reception, and connect the differential amplifier and the additional integrator at a time of adjusting the reference signal.

31. The transceiver of claim 1, wherein the transceiver also carries out data reception by receiving electric fields according to data to be received which are induced in the electric field propagating medium, and further comprises:
- a transmission and reception electrode configured to induce the electric fields according to the data to be transmitted and receive the electric fields according to the data to be received, the resonance causing unit being connected in series with the transmission unit and the transmission and reception electrode;
- an electric field detection unit configured to detect the electric the electric fields according to the data to be received through the transmission and reception electrode, and convert each detected electric field into an electric signal;
- a control unit configured to generate a reference signal having a constant amplitude, and output a control signal for controlling a frequency of the alternating current signals generated by the transmission unit by using the reference signal and the electric signal converted by the electric field detection unit; and
- a demodulation unit configured to demodulate the electric signal converted by the electric field detection unit.

32. The transceiver of claim 31, wherein the control unit includes:
- an envelope detector configured to detect an amplitude of the electric signal converted by the electric field detection unit;
- a filter configured to eliminate higher harmonic components of an output signal of the envelope detector;
- a constant voltage source configured to generate the reference signal;
- a differential amplifier configured to obtain a difference between the reference signal generated by the constant voltage source and an output signal of the filter, and amplify the difference; and
- an integrator configured to generate the control signal according to a result of integrating an output signal from the differential amplifier.

33. The transceiver of claim 32, further comprising:
- a first connection unit configured to connect the transmission unit and the resonance causing unit at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode; and
- a second connection unit configured to connect the electric field detection unit and the control unit at a time of carrying out the data transmission, and connect the electric field detection unit and the demodulation unit at a time of carrying out the data reception by receiving the electric fields induced in the electric field propagating medium.

34. The transceiver of claim 32, wherein the control unit also includes:
- an additional integrator configured to generate another control signal for adjusting the reference signal.

35. The transceiver of claim 34, further comprising:
- a first connection unit configured to connect the transmission unit and the resonance causing unit at a time of carrying out the data transmission by inducing the electric fields in the electric field propagating medium, connect the transmission unit and the electric field detection unit without passing through the resonance causing unit at a time of adjusting the reference signal, and makes no connection at a time of carrying out the data reception by receiving the electric fields induced in the electric field propagating medium through the transmission and reception electrode;
- a second connection unit configured to connect the electric field detection unit and the control unit at a time of carrying out the data transmission and at a time of adjusting the reference signal, and connect the electric field detection unit and the demodulation unit at a time of carrying out the data reception by receiving the electric fields induced in the electric field propagating medium;
- a third connection unit configured to connect the transmission unit and the electric field detection unit at a time of adjusting the reference signal, and connect the transmission and reception electrode and the electric field detection unit at a time of carrying out the data transmission and at a time of carrying out the data reception; and
- a fourth connection unit configured to connect the differential amplifier and the integrator while connecting the constant voltage source and the additional integrator at a time of carrying out the data transmission and at a time of carrying out the data reception, and connect the differential amplifier and the additional integrator at a time of adjusting the reference signal.

36. The transceiver of claim 1, wherein the transceiver also carries out data reception by receiving electric fields according to data to be received which are induced in the electric field propagating medium, and further comprises:
- a transmission and reception electrode configured to induce the electric fields according to the data to be transmitted and receive the electric fields according to the data to be received, the resonance causing unit being connected in series with the transmission unit and the transmission and reception electrode;
- an electric field detection unit configured to detect the electric the electric fields according to the data to be received, and convert each detected electric field into an electric signal;
- an adjustment signal generation unit configured to output an adjustment signal for periodically changing an amplitude of the electric signal outputted from the electric field detection unit;
- an amplitude detection unit configured to detect the amplitude of the electric signal outputted from the electric field detection unit by using the adjustment signal outputted from the adjustment signal generation unit;
- a control signal generation unit configured to generate a control signal for controlling a characteristic of the resonance causing unit according to the amplitude detected by the amplitude detection unit; and
- a demodulation unit configured to demodulate the electric signal converted by the electric field detection unit.

37. The transceiver of claim 36, wherein the amplitude detection unit includes:
- first and second envelope detectors configured to alternately detect the electric signal at a prescribed time interval;
- first and second filters configured to eliminate higher harmonic components of signals outputted from the first and second envelope detectors, respectively;
- a differential amplifier configured to obtain a different between output signals from the first and second filters, and amplify the difference; and
- a constant voltage source configured to generate a constant voltage signal.

38. The transceiver of claim 37, wherein the control signal generation unit includes:

an integrator configured to generate a signal by integrating an output signal from the differential amplifier; and an adder configured to add the signal generated by the integrator and the adjustment signal outputted from the adjustment signal generation unit.

39. The transceiver of claim 38, further comprising:

a first connection unit configured to connect the transmission unit and the resonance causing unit at a time of controlling the characteristic of the resonance causing unit and at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode;

a second connection unit configured to connect the electric field detection unit and the amplitude detection unit at a time of controlling the characteristic of the resonance causing unit and at a time of carrying out the data transmission by inducing the electric fields in the electric field propagating medium, and connect the electric field detection unit and the demodulation unit at a time of carrying out the data reception by receiving the electric fields induced in the electric field propagating medium;

a third connection unit configured to connect one of the first and second envelope detectors and the electric field detection unit alternately at a time of controlling the characteristic of the resonance causing unit; and a fourth connection unit configured to connect the differential amplifier and the integrator at a time of controlling the characteristic of the resonance causing unit, and connect the constant voltage source and the integrator at a time of carrying out the data transmission by inducing the electric fields in the electric field propagating medium.

40. The transceiver of claim 1, wherein the transceiver also carries out data reception by receiving electric fields according to data to be received which are induced in the electric field propagating medium, and further comprises:

a transmission and reception electrode configured to induce the electric fields according to the data to be transmitted and receive the electric fields according to the data to be received, the resonance causing unit being connected in series with the transmission unit and the transmission and reception electrode;

an electric field detection unit configured to detect the electric the electric fields according to the data to be received, and convert each detected electric field into an electric signal;

an adjustment signal generation unit configured to output an adjustment signal for periodically changing an amplitude of the electric signal outputted from the electric field detection unit;

an amplitude detection unit configured to detect the amplitude of the electric signal outputted from the electric field detection unit by using the adjustment signal outputted from the adjustment signal generation unit;

a control signal generation unit configured to generate a control signal for controlling a frequency of the alternating current signals generated by the transmission unit according to the amplitude detected by the amplitude detection unit; and a demodulation unit configured to demodulate the electric signal converted by the electric field detection unit.

41. The transceiver of claim 40, wherein the amplitude detection unit includes:

first and second envelope detectors configured to alternately detect the electric signal at a prescribed time interval;

first and second filters configured to eliminate higher harmonic components of signals outputted from the first and second envelope detectors, respectively;

a differential amplifier configured to obtain a different between output signals from the first and second filters, and amplify the difference; and a constant voltage source configured to generate a constant voltage signal.

42. The transceiver of claim 41, wherein the control signal generation unit includes:

an integrator configured to generate a signal by integrating an output signal from the differential amplifier; and an adder configured to add the signal generated by the integrator and the adjustment signal outputted from the adjustment signal generation unit.

43. The transceiver of claim 42, further comprising:

a first connection unit configured to connect the transmission unit and the resonance causing unit at a time of controlling the frequency of the alternating current signals generated by the transmission unit and at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode;

a second connection unit configured to connect the electric field detection unit and the amplitude detection unit at a time of controlling the frequency of the alternating current signals generated by the transmission unit and at a time of carrying out the data transmission by inducing the electric fields in the electric field propagating medium, and connect the electric field detection unit and the demodulation unit at a time of carrying out the data reception by receiving the electric fields induced in the electric field propagating medium;

a third connection unit configured to connect one of the first and second envelope detectors and the electric field detection unit alternately at a time of controlling the frequency of the alternating current signals generated by the transmission unit; and a fourth connection unit configured to connect the differential amplifier and the integrator at a time of controlling the frequency of the alternating current signals generated by the transmission unit, and connect the constant voltage source and the integrator at a time of carrying out the data transmission by inducing the electric fields in the electric field propagating medium.

44. The transceiver of claim 1, wherein the transceiver also carries out data reception by receiving electric fields according to data to be received which are induced in the electric field propagating medium, and further comprises:

a transmission and reception electrode configured to induce the electric fields according to the data to be transmitted and receive the electric fields according to the data to be received, the resonance causing unit being connected in series with the transmission unit and the transmission and reception electrode;

an electric field detection unit configured to detect the electric the electric fields according to the data to be received, and convert each detected electric field into an electric signal;

an amplitude detection unit configured to detect the amplitude of the electric signal outputted from the electric field detection unit;

a memory unit configured to store the amplitude detected by the amplitude detection unit in relation to a characteristic of the resonance causing unit;

a maximum value related information extraction unit configured to extract the characteristic set in relation to a maximum value of the amplitude stored in the memory unit;

a control signal generation unit configured to generate a control signal for controlling the resonance causing unit to maintain the characteristic extracted by the maximum value related information extraction unit; and a demodulation unit configured to demodulate the electric signal converted by the electric field detection unit.

45. The transceiver of claim 44, wherein the maximum value related information extraction unit includes:

an analog/digital conversion unit configured to convert the amplitude outputted from the amplitude detection unit into a digital signal; and a control information sending unit configured to store the digital signal related to the amplitude converted by the analog/digital conversion unit into the memory unit, reads out the characteristic set in relation to the maximum value of the amplitude stored in the memory unit, and send a control information necessary in carrying a control according to a read out characteristic to the control signal generation unit.

46. The transceiver of claim 44, further comprising:

a first connection unit configured to connect the transmission unit and the resonance causing unit at a time of controlling the characteristic of the resonance causing unit and at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode; and a second connection unit configured to connect the electric field detection unit and the amplitude detection unit at a time of controlling the characteristic of the resonance causing unit and at a time of carrying out the data transmission by inducing the electric fields in the electric field propagating medium, and connect the electric field detection unit and the demodulation unit at a time of carrying out the data reception by receiving the electric fields induced in the electric field propagating medium.

47. The transceiver of claim 1, wherein the transceiver also carries out data reception by receiving electric fields according to data to be received which are induced in the electric field propagating medium, and further comprises:

a transmission and reception electrode configured to induce the electric fields according to the data to be transmitted and receive the electric fields according to the data to be received, the resonance causing unit being connected in series with the transmission unit and the transmission and reception electrode;

an electric field detection unit configured to detect the electric the electric fields according to the data to be received, and convert each detected electric field into an electric signal;

an amplitude detection unit configured to detect the amplitude of the electric signal outputted from the electric field detection unit;

a memory unit configured to store the amplitude detected by the amplitude detection unit in relation to a frequency of the alternating current signals generated by the transmission unit;

a maximum value related information extraction unit configured to extract the frequency set in relation to a maximum value of the amplitude stored in the memory unit;

a control signal generation unit configured to generate a control signal for controlling the transmission unit to generate the alternating current signals with the frequency extracted by the maximum value related information extraction unit; and a demodulation unit configured to demodulate the electric signal converted by the electric field detection unit.

48. The transceiver of claim 47, wherein the maximum value related information extraction unit includes:

an analog/digital conversion unit configured to convert the amplitude outputted from the amplitude detection unit into a digital signal; and a control information sending unit configured to store the digital signal related to the amplitude converted by the analog/digital conversion unit into the memory unit, reads out the frequency set in relation to the maximum value of the amplitude stored in the memory unit, and send a control information necessary in carrying a control according to a read out frequency to the control signal generation unit.

49. The transceiver of claim 47, further comprising:

a first connection unit configured to connect the transmission unit and the resonance causing unit at a time of controlling the frequency of the alternating current signals generated by the transmission unit and at a time of carrying out the data transmission by inducing the electric fields in the electric field propagating medium, and disconnect a connection between the transmission unit and the resonance causing unit at a time of carrying out the data reception by receiving the electric fields induced in the electric field propagating medium through the transmission and reception electrode; and a second connection unit configured to connect the electric field detection unit and the amplitude detection unit at a time of controlling the frequency of the alternating current signals generated by the transmission unit and at a time of carrying out the data transmission by inducing the electric fields in the electric field propagating medium, and connect the electric field detection unit and the demodulation unit at a time of carrying out the data reception by receiving the electric fields induced in the electric field propagating medium.

* * * * *